US007450064B2

(12) United States Patent
Rowitch et al.

(10) Patent No.: US 7,450,064 B2
(45) Date of Patent: Nov. 11, 2008

(54) METHODS AND SYSTEMS FOR DERIVING SEED POSITION OF A SUBSCRIBER STATION IN SUPPORT OF UNASSISTED GPS-TYPE POSITION DETERMINATION IN A WIRELESS COMMUNICATION SYSTEM

(75) Inventors: Douglas N. Rowitch, Del Mar, CA (US); Chang S Row, Los Altos, CA (US); Ann Yun-En Tien, Los Gatos, CA (US); Sanjeev Khushu, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 146 days.

(21) Appl. No.: 11/244,529

(22) Filed: Oct. 5, 2005

(65) Prior Publication Data

US 2006/0217130 A1 Sep. 28, 2006

Related U.S. Application Data

(60) Provisional application No. 60/664,444, filed on Mar. 22, 2005.

(51) Int. Cl.
*G01S 1/00* (2006.01)
*H04B 7/185* (2006.01)

(52) U.S. Cl. .................................................. 342/357.15

(58) Field of Classification Search ............ 342/357.15, 342/357.09, 357.1, 387, 463–465
See application file for complete search history.

(56) References Cited

U.S. PATENT DOCUMENTS 6,075,987 A 6/2000 Camp, Jr. et al.
6,148,202 A * 11/2000 Wortham .................... 455/434
6,222,483 B1 * 4/2001 Twitchell et al. ....... 342/357.09
6,289,280 B1 * 9/2001 Fernandez-Corbaton et al. ....... 342/357.08
6,891,500 B2 * 5/2005 Hall et al. .................. 342/465
2002/0149515 A1 * 10/2002 Alanen et al. ........... 342/357.1
2003/0016170 A1 * 1/2003 Jandrell ................ 342/357.12
2003/0125046 A1 7/2003 Riley et al.
2004/0104841 A1 6/2004 Syrjarinne et al.
2005/0185610 A1 * 8/2005 Cheon ........................ 370/328
2005/0206559 A1 * 9/2005 Diggelen et al. ....... 342/357.06
2005/0228589 A1 * 10/2005 Diggelen et al. ............... 702/1

FOREIGN PATENT DOCUMENTS

EP 1237009 A 9/2002

OTHER PUBLICATIONS

International Search Report—PCT/US2006/010588—International Search Authority—08/16/2006 (3 pages).

* cited by examiner

*Primary Examiner*—Thomas H. Tarcza
*Assistant Examiner*—Fred H. Mull
(74) *Attorney, Agent, or Firm*—Andrea L. Mays; James D. McFarland; Thomas R. Rouse

(57) ABSTRACT

In a method and system for deriving a seed position of a subscriber station in a wireless communications system in supporting unassisted GPS-type position determination is provided, the subscriber station receives overhead messages from the wireless communications system, and derives the seed position from the parameter values. The subscriber station may use a data structure in its memory and map possible parameter values to corresponding positions that may serve as the seed positions.

28 Claims, 69 Drawing Sheets

| **Field** | **Length (bits)** |
|---|---|
| PILOT_PN | 9 |
| CONFIG_MSG_SEQ | 6 |
| SID | 15 |
| NID | 16 |
| REG_ZONE | 12 |
| TOTAL_ZONES | 3 |
| ZONE_TIMER | 3 |
| MULT_SIDS | 1 |
| MULT_NIDS | 1 |
| BASE_ID | 16 |
| BASE_CLASS | 4 |
| PAGE_CHAN | 3 |
| MAX_SLOT_CYCLE_INDEX | 3 |
| HOME_REG | 1 |
| FOR_SID_REG | 1 |
| FOR_NID_REG | 1 |
| POWER_UP_REG | 1 |
| POWER_DOWN_REG | 1 |
| PARAMETER_REG | 1 |
| REG_PRD | 7 |
| BASE_LAT | 22 |
| BASE_LONG | 23 |
| REG_DIST | 11 |
| SRCH_WIN_A | 4 |

(continues on next page)

FIGURE 3A

| Field | Length (bits) |
|---|---|
| SRCH_WIN_N | 4 |
| SRCH_WIN_R | 4 |
| NGHBR_MAX_AGE | 4 |
| PWR_REP_THRESH | 5 |
| PWR_REP_FRAMES | 4 |
| PWR_THRESH_ENABLE | 1 |
| PWR_PERIOD_ENABLE | 1 |
| PWR_REP_DELAY | 5 |
| RESCAN | 1 |
| T_ADD | 6 |
| T_DROP | 6 |
| T_COMP | 4 |
| T_TDROP | 4 |
| EXT_SYS_PARAMETER | 1 |
| EXT_NGHBR_LST | 1 |
| GEN_NGHBR_LST | 1 |
| GLOBAL_REDIRECT | 1 |
| PRI_NGHBR_LST | 1 |
| USER_ZONE_ID | 1 |
| EXT_GLOBAL_REDIRECT | 1 |
| EXT_CHAN_LST | 1 |
| T_TDROP_RANGE_INCL | 1 |
| T_TDROP_RANGE | 0 or 4 |
| NEG_SLOT_CYCLE_INDEX_SUP | 1 |

FIGURE 3B

| Field | Length (bits) |
|---|---|
| PILOT_PN | 9 |
| CONFIG_MSG_SEQ | 6 |
| DELETE_FOR_TMSI | 1 |
| USE_TMSI | 1 |
| PREF_MSID_TYPE | 2 |
| MCC | 10 |
| IMSI_11_12 | 7 |
| TMSI_ZONE_LEN | 4 |
| TMSI_ZONE | 8 × TMSI_ZONE_LEN |
| BCAST_INDEX | 3 |
| IMSI_T_SUPPORTED | 1 |
| P_REV | 8 |
| MIN_P_REV | 8 |
| SOFT_SLOPE | 6 |
| ADD_INTERCEPT | 6 |
| DROP_INTERCEPT | 6 |
| PACKET_ZONE_ID | 8 |
| MAX_NUM_ALT_SO | 3 |
| RESELECT_INCLUDED | 1 |
| EC_THRESH | 0 or 5 |
| EC_IO_THRESH | 0 or 5 |
| PILOT_REPORT | 1 |
| NGHBR_SET_ENTRY_INFO | 1 |
| ACC_ENT_HO_ORDER | 0 or 1 |
| NGHBR_SET_ACCESS_INFO | 1 |
| ACCESS_HO | 0 or 1 |
| ACCESS_HO_MSG_RSP | 0 or 1 |

(continues on next page)

FIGURE 4A

| Field | Length (bits) |
|---|---|
| ACCESS_PROBE_HO | 0 or 1 |
| ACC_HO_LIST_UPD | 0 or 1 |
| ACC_PROBE_HO_OTHER_MSG | 0 or 1 |
| MAX_NUM_PROBE_HO | 0 or 3 |
| NGHBR_SET_SIZE | 0 or 6 |
| If NGHBR_SET_ENTRY_INFO = 1, NGHBR_SET_SIZE occurrences of the following record: | |
| *{ (NGHBR_SET_SIZE)* | |
| ACCESS_ENTRY_HO | 1 |
| *} (NGHBR_SET_SIZE)* | |
| If NGHBR_SET_ACCESS_INFO = 1, NGHBR_SET_SIZE occurrences of the following record: | |
| *{ (NGHBR_SET_SIZE)* | |
| ACCESS_HO_ALLOWED | 1 |
| *} (NGHBR_SET_SIZE)* | |
| BROADCAST_GPS_ASST | 1 |
| QPCH_SUPPORTED | 1 |
| NUM_QPCH | 0 or 2 |
| QPCH_RATE | 0 or 1 |
| QPCH_POWER_LEVEL_PAGE | 0 or 3 |
| QPCH_CCI_SUPPORTED | 0 or 1 |
| QPCH_POWER_LEVEL_CONFIG | 0 or 3 |
| SDB_SUPPORTED | 1 |
| RLGAIN_TRAFFIC_PILOT | 6 |
| REV_PWR_CNTL_DELAY_INCL | 1 |
| REV_PWR_CNTL_DELAY | 0 or 2 |
| AUTO_MSG_SUPPORTED | 1 |
| AUTO_MSG_INTERVAL | 0 or 3 |

(continues on next page)

FIGURE 4B

| Field | Length (bits) |
|---|---|
| MOB_QOS | 1 |
| ENC_SUPPORTED | 1 |
| SIG_ENCRYPT_SUP | 0 or 8 |
| UI_ENCRYPT_SUP | 0 or 8 |
| USE_SYNC_ID | 1 |
| CS_SUPPORTED | 1 |
| BCCH_SUPPORTED | 1 |
| MS_INIT_POS_LOC_SUP_IND | 1 |
| PILOT_INFO_REQ_SUPPORTED | 1 |
| QPCH_BI_SUPPORTED | 0 or 1 |
| QPCH_POWER_LEVEL_BCAST | 0 or 3 |
| BAND_CLASS_INFO_REQ | 1 |
| ALT_BAND_CLASS | 0 or 5 |
| CDMA_OFF_TIME_REP_SUP_IND | 1 |
| CDMA_OFF_TIME_REP_THRESHOLD_UNIT | 0 or 1 |
| CDMA_OFF_TIME_REP_THRESHOLD | 0 or 3 |
| CHM_SUPPORTED | 1 |
| RELEASE_TO_IDLE_IND | 1 |
| RECONNECT_MSG_IND | 1 |
| MSG_INTEGRITY_SUP | 1 |
| SIG_INTEGRITY_SUP_INCL | 0 or 1 |
| SIG_INTEGRITY_SUP | 0 or 8 |
| FOR_PDCH_SUPPORTED | 1 |
| PDCH_CHM_SUPPORTED | 0 or 1 |
| PDCH_PARMS_INCL | 0 or 1 |
| FOR_PDCH_RLGAIN_INCL | 0 or 1 |
| RLGAIN_ACKCH_PILOT | 0 or 6 |
| RLGAIN_CQICH_PILOT | 0 or 6 |
| NUM_SOFT_SWITCHING_FRAMES | 0 or 4 |
| NUM_SOFTER_SWITCHING_FRAMES | 0 or 4 |

FIGURE 4C

| Field | Length (bits) |
|---|---|
| NUM_SOFT_SWITCHING_SLOTS | 0 or 2 |
| NUM_SOFTER_SWITCHING_SLOTS | 0 or 2 |
| PDCH_SOFT_SWITCHING_DELAY | 0 or 8 |
| PDCH_SOFTER_SWITCHING_DELAY | 0 or 8 |
| WALSH_TABLE_ID | 0 or 3 |
| NUM_PDCCH | 0 or 3 |

NUM_PDCCH+1 occurrences of the following record:

*{ (NUM_PDCCH+1)*

| | |
|---|---|
| FOR_PDCCH_WALSH | 0 or 6 |

*} (NUM_PDCCH+1)*

| | |
|---|---|
| IMSI_10_INCL | 1 |
| IMSI_10 | 0 or 4 |
| MAX_ADD_SERV_INSTANCE | 0 or 3 |
| RER_MODE_SUPPORTED | 1 |
| TKZ_MODE_SUPPORTED | 1 |
| TKZ_ID | 0 or 8 |
| PZ_HYST_ENABLED | 0 or 1 |
| PZ_HYST_INFO_INCL | 0 or 1 |
| PZ_HYST_LIST_LEN | 0 or 4 |
| PZ_HYST_ACT_TIMER | 0 or 8 |
| PZ_HYST_TIMER_MUL | 0 or 3 |
| PZ_HYST_TIMER_EXP | 0 or 5 |
| EXT_PREF_MSID_TYPE | 2 |
| MEID_REQD | 0 or 1 |
| AUTO_FCSO_ALLOWED | 1 |
| REV_PDCH_SUPPORTED | 0 or 1 |
| REV_PDCH_PARMS_INCL | 0 or 1 |
| REV_PDCH_RLGAIN_INCL | 0 or 1 |
| RLGAIN_SPICH_PILOT | 0 or 6 |
| RLGAIN_REQCH_PILOT | 0 or 6 |
| RLGAIN_PDCCH_PILOT | 0 or 6 |

FIGURE 4D

| | |
|---|---|
| REV_PDCH_PARMS_1_INCL | 0 or 1 |
| REV_PDCH_TABLE_SEL | 0 or 1 |
| REV_PDCH_MAX_AUTO_TPR | 0 or 8 |
| REV_PDCH_NUM_ARQ_ROUNDS_NORMAL | 0 or 2 |
| REV_PDCH_OPER_PARMS_INCL | 0 or 1 |
| REV_PDCH_MAX_SIZE_ALLOWED_ENCODER_PACKET | 0 or 4 |
| REV_PDCH_DEFAULT_PERSISTENCE | 0 or 1 |
| REV_PDCH_RESET_PERSISTENCE | 0 or 1 |
| REV_PDCH_MSIB_SUPPORTED | 0 or 1 |
| REV_PDCH_SOFT_HANDOFF_RESET_IND | 0 or 1 |
| SDB_IN_RCNM_IND | 0 or 1 |
| SENDING_BSPM | 1 |
| BSPM_PERIOD_INDEX | 0 or 4 |

FIGURE 4E

| **Field** | **Length (bits)** |
|---|---|
| PILOT_PN | 9 |
| CONFIG_MSG_SEQ | 6 |
| SID | 15 |
| NID | 16 |
| PACKET_ZONE_ID | 8 |
| REG_ZONE | 12 |
| TOTAL_ZONES | 3 |
| ZONE_TIMER | 3 |
| MULT_SIDS | 1 |
| MULT_NIDS | 1 |
| HOME_REG | 1 |
| FOR_SID_REG | 1 |
| FOR_NID_REG | 1 |
| POWER_UP_REG | 1 |
| POWER_DOWN_REG | 1 |
| PARAMETER_REG | 1 |
| REG_PRD | 7 |
| DIST_REG_INCL | 1 |
| REG_DIST | 0 or 11 |
| DELETE_FOR_TMSI | 1 |
| USE_TMSI | 1 |
| PREF_MSID_TYPE | 2 |

(continues on next page)

FIGURE 5A

| Field | Length (bits) |
|---|---|
| TMSI_ZONE_LEN | 4 |
| TMSI_ZONE | 8 × TMSI_ZONE_LEN |
| IMSI_T_SUPPORTED | 1 |
| MAX_NUM_ALT_SO | 3 |
| AUTO_MSG_SUPPORTED | 1 |
| AUTO_MSG_INTERVAL | 0 or 3 |
| OTHER_INFO_INCL | 1 |
| BASE_ID | 0 or 16 |
| MCC | 0 or 10 |
| IMSI_11_12 | 0 or 7 |
| BROADCAST_GPS_ASST | 0 or 1 |
| SIG_ENCRYPT_SUP | 0 or 8 |
| CS_SUPPORTED | 1 |
| MS_INIT_POS_LOC_SUP_IND | 1 |
| MSG_INTEGRITY_SUP | 1 |
| SIG_INTEGRITY_SUP_INCL | 0 or 1 |
| SIG_INTEGRITY_SUP | 0 or 8 |
| IMSI_10_INCL | 1 |
| IMSI_10 | 0 or 4 |
| MAX_ADD_SERV_INSTANCE | 0 or 3 |
| TKZ_MODE_SUPPORTED | 1 |
| TKZ_ID | 0 or 8 |
| PZ_HYST_ENABLED | 0 or 1 |
| PZ_HYST_INFO_INCL | 0 or 1 |
| PZ_HYST_LIST_LEN | 0 or 4 |
| PZ_HYST_ACT_TIMER | 0 or 8 |
| PZ_HYST_TIMER_MUL | 0 or 3 |
| PZ_HYST_TIMER_EXP | 0 or 5 |
| EXT_PREF_MSID_TYPE | 2 |
| MEID_REQD | 0 or 1 |

FIGURE 5B

| **Field** | **Length (bits)** |
|---|---|
| SID | 15 |
| NID | 16 |
| SRCH_WIN_A | 4 |
| SRCH_WIN_N | 4 |
| SRCH_WIN_R | 4 |
| T_ADD | 6 |
| T_DROP | 6 |
| T_COMP | 4 |
| T_TDROP | 4 |
| NGHBR_MAX_AGE | 4 |
| P_REV | 8 |
| SOFT_SLOPE | 6 |
| ADD_INTERCEPT | 6 |
| DROP_INTERCEPT | 6 |
| PACKET_ZONE_ID | 8 |
| EXTENSION | 1 |
| T_MULCHAN | 0 or 3 |
| BEGIN_PREAMBLE | 0 or 3 |
| RESUME_PREAMBLE | 0 or 3 |
| T_SLOTTED_INCL | 1 |
| T_SLOTTED | 0 or 8 |
| ENC_SUPPORTED | 1 |
| SIG_ENCRYPT_SUP | 0 or 8 |
| UI_ENCRYPT_SUP | 0 or 8 |

FIGURE 6A

| Field | Length (bits) |
|---|---|
| CS_SUPPORTED | 1 |
| CHM_SUPPORTED | 1 |
| CDMA_OFF_TIME_REP_SUP_IND | 1 |
| CDMA_OFF_TIME_REP_THRESHOLD_UNIT | 0 or 1 |
| CDMA_OFF_TIME_REP_THRESHOLD | 0 or 3 |
| T_TDROP_RANGE_INCL | 1 |
| T_TDROP_RANGE | 0 or 4 |
| FOR_PDCH_SUPPORTED | 1 |
| PDCH_CHM_SUPPORTED | 0 or 1 |
| SDB_SUPPORTED | 1 |
| MOB_QOS | 0 or 1 |
| MS_INIT_POS_LOC_SUP_IND | 1 |
| PZ_HYST_PARMS_INCL | 0 or 1 |
| PZ_HYST_ENABLED | 0 or 1 |
| PZ_HYST_INFO_INCL | 0 or 1 |
| PZ_HYST_LIST_LEN | 0 or 4 |
| PZ_HYST_ACT_TIMER | 0 or 8 |
| PZ_HYST_TIMER_MUL | 0 or 3 |
| PZ_HYST_TIMER_EXP | 0 or 5 |
| BCMC_ON_TRAFFIC_SUP | 1 |
| AUTO_REQ_TRAF_ALLOWED_IND | 0 or 1 |
| REV_PDCH_SUPPORTED | 0 or 1 |
| MAX_ADD_SERV_INSTANCE | 0 or 3 |
| USE_CH_CFG_RRM | 1 |

FIGURE 6B

| Field | Length (bits) |
|---|---|
| MessageID | 8 |
| CountryCode | 12 |
| SectorID | 128 |
| SubnetMask | 8 |
| SectorSignature | 16 |
| Latitude | 22 |
| Longitude | 23 |
| RouteUpdateRadius | 11 |
| LeapSeconds | 8 |
| LocalTimeOffset | 11 |
| ReverseLinkSilenceDuration | 2 |
| ReverseLinkSilencePeriod | 2 |
| ChannelCount | 5 |
| ChannelCount occurrences of the following field: | |
| Channel | 24 |
| NeighborCount | 5 |
| NeighborCount occurrences of the following field: | |
| NeighborPilotPN | 9 |
| NeighborCount occurrences of the following two fields: | |
| NeighborChannelIncluded | 1 |
| NeighborChannel | 0 or 24 |
| NeighborSearchWindowSizeIncluded | 1 |
| NeighborCount occurences of the following field | |
| NeighborSearchWindowSize | 0 or 4 |
| NeighborSearchWindowOffsetIncluded | 1 |
| NeighborCount occurrences of the following field | |
| NeighborSearchWindowOffset | 0 or 3 |
| RouteUpdateTriggerCodeIncluded | 0 or 1 |

FIGURE 7A

| Field | Length (bits) |
|---|---|
| RouteUpdateTriggerCode | 0 or 12 |
| RouteUpdateTriggerMaxAge | 0 or 4 |
| FPDCHSupportIncluded | 0 or 1 |
| *m*, 0 ≤ *m* ≤ NeighborCount occurrences of the following field: | |
| FPDCHSupported | 0 or 1 |
| Reserved | 0 – 7 (as needed) |

FIGURE 7B

IFAST SID Ranges (Sorted by SID Number)

In the following table, bold is used to indicate SID ranges for which information or status has changed within the last 6 months, and red indicates that a SID conflict exists.

| SID Range | Reserved | Country |
|---|---|---|
| 0 | 1 | Unassigned |
| 1 to 2175 | 2175 | USA |
| 2176 to 2303 | 128 | South Korea |
| 2304 to 4095 | 1792 | USA |
| 4096 to 7679 | 3584 | USA |
| 7680 to 7807 | 128 | Australia |
| 7808 to 7871 | 64 | Globalstar Mobile Satellite |
| 7872 to 7935 | 64 | ICO Mobile Satellite |
| 7936 to 7951 | 16 | Faroe Islands |
| 7952 to 7967 | 16 | Greenland |
| 7968 to 7983 | 16 | Falkland Islands |
| 7984 to 7999 | 16 | St. Pierre and Miquelon |
| 8000 to 8007 | 8 | Saint Vincent and the Grenadines |
| 8008 to 8015 | 8 | Unassigned |
| 8016 to 8031 | 16 | Saint Lucia |
| 8032 to 8047 | 16 | Saint Kitts and Nevis |
| 8048 to 8063 | 16 | Montserrat |
| 8064 to 8079 | 16 | Grenada |
| 8080 to 8095 | 16 | Bahamas |
| 8096 to 8111 | 16 | Bermuda |
| 8112 to 8127 | 16 | British Virgin Islands |
| 8128 to 8143 | 16 | Cayman Islands |
| 8144 to 8159 | 16 | Antigua and Barbuda |
| 8160 to 8175 | 16 | Barbados |
| 8176 to 8191 | 16 | Jamaica |
| 8192 to 8223 | 32 | Thailand |
| 8224 to 8255 | 32 | Egypt |
| 8256 to 8287 | 32 | Morocco |
| 8288 to 8319 | 32 | Algeria |
| 8320 to 8447 | 128 | Australia |
| 8448 to 8479 | 32 | Israel |
| 8480 to 8511 | 32 | Tunisia |

FIGURE 8A

| | | |
|---|---|---|
| 8512 to 8543 | 32 | Libya |
| 8544 to 8575 | 32 | Gambia |
| 8576 to 8703 | 128 | New Zealand |
| 8704 to 8735 | 32 | Senegal |
| 8736 to 8767 | 32 | Mauritania |
| 8768 to 8799 | 32 | Mali |
| 8800 to 8831 | 32 | Guinea |
| 8832 to 8847 | 16 | Dominican Republic |
| 8848 to 8863 | 16 | Cape Verde |
| 8864 to 8879 | 16 | Sao Tome and Principe |
| 8880 to 8895 | 16 | Diego Garcia |
| 8896 to 8911 | 16 | Seychelles |
| 8912 to 8927 | 16 | Djibouti |
| 8928 to 8943 | 16 | Kazakhstan |
| 8944 to 8959 | 16 | Reunion |
| 8960 to 8991 | 32 | Côte d'Ivoire |
| 8992 to 9023 | 32 | Burkina Faso |
| 9024 to 9055 | 32 | Niger |
| 9056 to 9087 | 32 | Togolese Republic |
| 9088 to 9119 | 32 | Benin |
| 9120 to 9151 | 32 | Mauritius |
| 9152 to 9183 | 32 | Liberia |
| 9184 to 9215 | 32 | Sierra Leone |
| 9216 to 9247 | 32 | Ghana |
| 9248 to 9279 | 32 | Nigeria |
| 9280 to 9311 | 32 | Chad |
| 9312 to 9343 | 32 | Central African Republic |
| 9344 to 9375 | 32 | Cameroon |
| 9376 to 9407 | 32 | Equatorial Guinea |
| 9408 to 9439 | 32 | Gabonese Republic |
| 9440 to 9471 | 32 | Congo |
| 9472 to 9503 | 32 | Zaire |
| 9504 to 9535 | 32 | Angola |
| 9536 to 9567 | 32 | Guinea - Bissau |
| 9568 to 9599 | 32 | Sudan |
| 9600 to 9615 | 16 | Lesotho |
| 9616 to 9631 | 16 | Dominica |
| | | |

FIGURE 8B

| | | |
|---|---|---|
| 9632 to 9647 | 16 | Swaziland |
| 9648 to 9663 | 16 | Aruba |
| 9664 to 9679 | 16 | Singapore |
| 9680 to 9695 | 16 | Northern Mariana Islands |
| 9696 to 9711 | 16 | Guam |
| 9712 to 9727 | 16 | Australian External Territories |
| 9728 to 9759 | 32 | Rwanda |
| 9760 to 9791 | 32 | Ethiopia |
| 9792 to 9823 | 32 | Somalia |
| 9824 to 9855 | 32 | Trinidad and Tobago |
| 9856 to 9887 | 32 | Kenya |
| 9888 to 9919 | 32 | Tanzania |
| 9920 to 9951 | 32 | Uganda |
| 9952 to 9983 | 32 | Burundi |
| 9984 to 10015 | 32 | Mozambique |
| 10016 to 10047 | 32 | Zambia |
| 10048 to 10079 | 32 | Madagascar |
| 10080 to 10111 | 32 | Zimbabwe |
| 10112 to 10143 | 32 | Namibia |
| 10144 to 10175 | 32 | Malawi |
| 10176 to 10207 | 32 | Botswana |
| 10208 to 10239 | 32 | Comoros |
| 10240 to 10367 | 128 | South Africa |
| 10368 to 10495 | 128 | Malaysia |
| 10496 to 10623 | 128 | Indonesia |
| 10624 to 10639 | 16 | Philippines |
| 10640 to 10655 | 16 | Hong Kong |
| 10656 to 10751 | 96 | Philippines |
| 10752 to 10767 | 16 | Monaco |
| 10768 to 10783 | 16 | San Marino |
| **10784 to 10785** | **2** | **Latvia** |
| 10786 to 10799 | 14 | Unassigned |
| 10800 to 10815 | 16 | Turks and Caicos Islands |
| 10816 to 10831 | 16 | St. Pierre and Miquelon |
| **10832 to 10855** | **24** | **Uzbekistan** |
| **10856 to 10879** | **24** | **Unassigned** |
| 10880 to 10895 | 16 | Brunei Darussalam |
| | | |

FIGURE 8C

| | | |
|---|---|---|
| 10896 to 10911 | 16 | Nauru |
| 10912 to 10927 | 16 | Tonga |
| 10928 to 10943 | 16 | Solomon Islands |
| 10944 to 10959 | 16 | Vanuatu |
| 10960 to 10975 | 16 | Fiji |
| 10976 to 10991 | 16 | Palau |
| 10992 to 11007 | 16 | Wallis and Futuna |
| 11008 to 11039 | 32 | Papua New Guinea |
| 11040 to 11071 | 32 | Micronesia |
| 11072 to 11103 | 32 | North Korea |
| 11104 to 11135 | 32 | Cambodia |
| 11136 to 11151 | 16 | Cook Islands |
| 11152 to 11167 | 16 | Niue Island |
| 11168 to 11183 | 16 | American Samoa |
| 11184 to 11199 | 16 | Western Samoa |
| 11200 to 11215 | 16 | Kiribati |
| 11216 to 11231 | 16 | New Caledonia |
| 11232 to 11247 | 16 | Tuvalu |
| 11248 to 11263 | 16 | French Polynesia |
| 11264 to 11279 | 16 | Tokelan |
| 11280 to 11295 | 16 | Marshall Islands |
| 11296 to 11311 | 16 | Macau |
| 11312 to 11327 | 16 | Kuwait |
| 11328 to 11343 | 16 | Yemen |
| 11344 to 11359 | 16 | Oman |
| 11360 to 11375 | 16 | Yemen |
| 11376 to 11391 | 16 | United Arab Emirates |
| 11392 to 11554 | 163 | Russia |
| 11555 | 1 | Uzbekistan |
| 11556 to 11599 | 44 | Russia |
| 11600 | 1 | Uzbekistan |
| 11601 to 12287 | 687 | Russia |
| 12288 to 13311 | 1024 | Japan |
| 13312 to 13439 | 128 | Viet Nam |
| 13440 to 13471 | 32 | Lao People's Democratic Republic |
| 13472 to 13503 | 32 | Bangladesh |
| 13504 to 13535 | 32 | Taiwan |

FIGURE 8D

| | | |
|---|---|---|
| 13536 to 13567 | 32 | Maldives |
| 13568 to 14335 | 768 | China |
| 14336 to 14463 | 128 | Turkey |
| 14464 to 14847 | 384 | India |
| 14848 to 14975 | 128 | Pakistan |
| 14976 to 15103 | 128 | Afghanistan |
| 15104 to 15231 | 128 | Sri Lanka |
| 15232 to 15359 | 128 | Burma |
| 15360 to 15391 | 32 | Lebanon |
| 15392 to 15423 | 32 | Jordan |
| 15424 to 15455 | 32 | Syria |
| 15456 to 15487 | 32 | Iraq |
| 15488 to 15519 | 32 | Saudi Arabia |
| 15520 to 15551 | 32 | Mongolia |
| 15552 to 15583 | 32 | Nepal |
| 15584 to 15615 | 32 | Bulgaria |
| 15616 to 15743 | 128 | Iran |
| 15744 to 15871 | 128 | Hungary |
| 15872 to 15903 | 32 | CDMA using GSM MAP |
| 15904 to 15905 | 2 | TIA-683 CDMA PRL Operator escape code 0 (15904)/1 (15905) |
| 15906 to 15999 | 94 | Unassigned |
| 16000 to 16127 | 128 | Romania |
| 16128 to 16255 | 128 | Czech Republic |
| 16256 to 16383 | 128 | Unassigned |
| 16384 to 18431 | 2048 | Canada |
| 18432 to 21549 | 3118 | Unassigned |
| 21550 to 21566 | 17 | Kyrgyz Republic |
| 21567 to 22015 | 449 | Unassigned |
| 22016 to 22271 | 256 | Germany |
| 22272 to 22399 | 128 | Norway |
| 22400 to 22527 | 128 | Unassigned |
| 22528 to 22543 | 16 | Denmark |
| 22544 to 22655 | 112 | Unassigned |
| 22656 to 22911 | 256 | United Kingdom |
| 22912 to 23039 | 128 | Austria |
| 23040 to 23167 | 128 | Switzerland |
| 23168 to 23423 | 256 | Italy |

FIGURE 8E

| | | |
|---|---|---|
| 23424 to 23551 | 128 | Yugoslavia |
| 23552 to 23679 | 128 | Spain |
| 23680 to 23935 | 256 | France |
| 23936 to 24063 | 128 | Belgium |
| 24064 to 24191 | 128 | Netherlands |
| 24192 to 24319 | 128 | Greece |
| 24320 to 24351 | 32 | Portugal |
| 24352 to 24383 | 32 | Luxembourg |
| 24384 to 24415 | 32 | Unassigned |
| 24416 to 24447 | 32 | Iceland |
| 24448 to 24575 | 128 | Unassigned |
| 24576 to 25075 | 500 | Mexico |
| 25076 to 25099 | 24 | Unassigned |
| 25100 to 25124 | 25 | Mexico |
| 25125 to 25599 | 475 | Unassigned |
| 25600 to 26111 | 512 | China |
| 26112 to 31103 | 4992 | CIBERNET BIDs |
| 31104 to 31135 | 32 | Paraguay |
| 31136 to 31167 | 32 | Suriname |
| 31168 to 31199 | 32 | Uruguay |
| 31200 to 31231 | 32 | Cyprus |
| 31232 to 31263 | 32 | Bolivia |
| 31264 to 31295 | 32 | Guyana |
| 31296 to 31327 | 32 | Ecuador |
| 31328 to 31359 | 32 | Guiana |
| 31360 to 31375 | 16 | Guadeloupe |
| 31376 to 31391 | 16 | Martinique |
| 31392 to 31407 | 16 | Netherlands Antilles |
| 31408 to 31423 | 16 | Bahrain |
| 31424 to 31439 | 16 | Qatar |
| 31440 to 31455 | 16 | Gibraltar |
| 31456 to 31471 | 16 | Albania |
| 31472 to 31487 | 16 | Unassigned |
| 31488 to 31615 | 128 | Venezuela |
| 31616 to 31743 | 128 | Colombia |
| 31744 to 31754 | 11 | Chile |
| 31755 to 31808 | 54 | Unassigned |

FIGURE 8F

| | | |
|---|---|---|
| 31809 to 31820 | 12 | Chile |
| 31821 to 31840 | 20 | Unassigned |
| 31841 to 31854 | 14 | Chile |
| 31855 to 31871 | 17 | Unassigned |
| 31872 to 32127 | 256 | Brazil |
| 32128 to 32255 | 128 | Argentina |
| 32256 to 32383 | 128 | Cuba |
| 32384 to 32511 | 128 | Peru |
| 32512 to 32543 | 32 | Nicaragua |
| 32544 to 32575 | 32 | Costa Rica |
| 32576 to 32607 | 32 | Panama |
| 32608 to 32639 | 32 | Haiti |
| 32640 to 32649 | 10 | Belize |
| 32650 to 32671 | 22 | Unassigned |
| 32672 to 32703 | 32 | Guatemala |
| 32704 to 32735 | 32 | El Salvador |
| 32736 to 32767 | 32 | Honduras |
| 32768 to 65535 | 32768 | Unassigned |

FIGURE 8G

| SID Range | Country/Carrier Using SID | Country/Carrier Allocated SID |
|---|---|---|
| **13** | **Hong Kong (Hutchison Telecom)** | **United States of America — Cingular (Washington/Baltimore)** |
| **136** | **Netherlands Antilles (St. Maarten Boatphone)** | **United States of America — Cingular (Jacksonville, FL)** |
| 700 | Cayman Islands (Cable and Wireless) | United States of America |
| **741** | **Conecel (Ecuador)** | **United States of America** |
| 1111 | Republic of Korea for AMPS system | United States of America |
| **1235** | **Piltel, Philippines** | **United States of America — US Cellular (Mitchel, IA)** |
| 1525 | Mexico (Mexico City) (IUSACEL) | United States of America |
| **1700** | **Republic of Korea (Shinsegi Telecom)** | **United States of America — (withheld by US Cellular)** |
| 1901 | Russia (Vimpelcom) | United States of America |
| 4100 | Movilnet/Venezuela | United States of America |
| **4101** | **Movilnet/Venezuela** | **United States of America — AT&T Wireless (Atlanta)** |

FIGURE 9A-1

| | | |
|---|---|---|
| 4110 | Movilnet/Venezuela | United States of America |
| **4120** | **Movilnet/Venezuela** | **United States of America — Sprint PCS (Dallas)** |
| 4130 | Movilnet/Venezuela | United States of America |
| 4140 | Movilnet/Venezuela | United States of America |
| 4150 | Movilnet/Venezuela | United States of America |
| 4369 | Republic of Korea | United States of America |
| 4370 | Republic of Korea | United States of America |
| 4371 | Republic of Korea | United States of America |
| 5732 | BellSouth Eastern Colombia Region | United States of America |
| 5734 | BellSouth San Andres Island (Colombia) | United States of America |
| 5772 | BellSouth Northern Colombia Region | United States of America |
| 6190 | British Virgin Islands | United States of America |

FIGURE 9A-2

| | | |
|---|---|---|
| 8002 | Grenada | Saint Vincent and the Grenadines |
| 8010 | Saint Lucia (Saint Lucia Boatphone) | Saint Vincent and the Grenadines |
| 8166 | Saint Kitts | Barbados |
| 8198 | Bermuda (Bermuda Telephone Co.) | Thailand |
| 12461 | Bangladesh (Pacific Bangladesh Telecom Ltd.) - Dhaka | Japan |
| 12463 | Bangladesh (Pacific Bangladesh Telecom Ltd.) - Chittagong | Japan |
| 12464 | Bangladesh (Pacific Bangladesh Telecom Ltd.) - Sylhet | Japan |
| 12561 | SingTel Mobile, Singapore | Japan |
| 12978 | SETAR - Aruba | Japan |
| 26883 | IUSACELL (formerly Portatel) | CIBERNET BIDs |
| 32752 | Bahamas (Bahamas Telecom) | Honduras (Republic of) |

| | 1002 → | SID₁ | POS₁ |
|---|---|---|---|
| | 1004 → | SID₂ | POS₂ |
| | | ⋮ | ⋮ |
| | 1006 → | SID_N | POS_N |

1050

| | 1052 → | SID Range₁ | POS₁ |
|---|---|---|---|
| | 1054 → | SID Range₂ | POS₂ |
| | | ⋮ | ⋮ |
| | 1056 → | SID Range_N | POS_N |

1100

| | 1102 → | SID₁ or SID Range₁ | POS₁ | UNC₁ |
|---|---|---|---|---|
| | 1104 → | SID₂ or SID Range₂ | POS₂ | UNC₂ |
| | | ⋮ | ⋮ | ⋮ |
| | 1106 → | SID_N or SID Range_N | POS_N | UNC_N |

| 8 | 7 | 6 | 5 | 4 | 3 | 2 | 1 | |
|---|---|---|---|---|---|---|---|---|
| | Location Area Identification IEI | | | | | | | octet 1 |
| MCC digit 2 | | | | MCC digit 1 | | | | octet 2 |
| MNC digit 3 | | | | MCC digit 3 | | | | octet 3 |
| MNC digit 2 | | | | MNC digit 1 | | | | octet 4 |
| LAC | | | | | | | | octet 5 |
| LAC (continued) | | | | | | | | octet 6 |

FIGURE 11

| 8 | 7 | 6 | 5 | 4 | 3 | 2 | 1 | |
|---|---|---|---|---|---|---|---|---|
| Routing Area Identification IEI | | | | | | | | octet 1 |
| MCC digit 2 | | | | MCC digit 1 | | | | octet 2 |
| MNC digit 3 | | | | MCC digit 3 | | | | octet 3 |
| MNC digit 2 | | | | MNC digit 1 | | | | octet 4 |
| LAC | | | | | | | | octet 5 |
| LAC cont'd | | | | | | | | octet 6 |
| RAC | | | | | | | | octet 7 |

FIGURE 12

| ormation Element/Group name | Need | Multi | Type and eference | [illegible] on |
|---|---|---|---|---|
| M[illegible] | MP | 3 | | [illegible] the [illegible] d [illegible] digit [illegible] |
| >MC digit | MP | | INTEGER(0..9) | |
| M[illegible] | MP | 2 to 3 | | [illegible] the [illegible] d [illegible] digit [illegible] |
| >MC digit | MP | | INTEGER(0..9) | |

FIGURE 13

| Inf m ion Element/Group name | Need | Multi | [illegible] | Semantics description |
|---|---|---|---|---|
| Cell ent y | MP | | bi ) | |

FIGURE 14

| | | | | |
|---|---|---|---|---|
| SID$_r$ - SID$_s$ | POS$_1$ | UNC$_1$ | ✗ | ✗ |
| SID$_r$ | POS$_2$ | UNC$_2$ | ✗ | |
| ⋮ | ⋮ | ⋮ | ⋮ | ⋮ |
| SID$_x$ - SID$_y$ | POS$_n$ | UNC$_n$ | | |

| | | | | |
|---|---|---|---|---|
| SID$_r$ - SID$_s$ | POS$_1$ | UNC$_1$ | ✗ | |
| SID$_r$ | POS$_2$ | UNC$_2$ | ✗ | ✗ |
| ⋮ | ⋮ | ⋮ | ⋮ | ⋮ |
| SID$_x$ - SID$_y$ | POS$_n$ | UNC$_n$ | | |

| | | | | |
|---|---|---|---|---|
| SID$_r$ - SID$_s$ | POS$_1$ | UNC$_1$ | | |
| ⋮ | ⋮ | ⋮ | ⋮ | ⋮ |
| SID$_x$ - SID$_y$ | POS$_n$ | UNC$_n$ | | |

| Parameter(s) | Overhead message(s) | System |
|---|---|---|
| SID | SYSTEM PARAMETERS MESSAGE<br>ANSI-41 SYSTEM PARAMETERS MESSAGE<br>IN-TRAFFIC SYSTEM PARAMETERS MESSAGE | CDMA 2000 |
| NID | SAME AS SID | CDMA 2000 |
| BASE_LAT<br>BASE_LON | SYSTEM PARAMETERS MESSAGE | CDMA 2000 |
| MCC | EXTENDED SYSTEM PARAMETERS MESSAGE<br>ANSI-41 SYSTEM PARAMETERS MESSAGE | CDMA 2000 |
| COUNTRY CODE | SECTOR PARAMETERS MESSAGE | 1xEVDO |
| SECTOR ID | SECTOR PARAMETERS MESSAGE | 1xEVDO |

FIGURE 23A

| Parameter(s) | Overhead message(s) | System |
|---|---|---|
| MCC | LOCATION AREA INFORMATION ELEMENT<br>ROUTING AREA INFORMATION ELEMENT | GSM/UMTS |
| MNC | LOCATION AREA INFORMATION ELEMENT<br>ROUTING AREA INFORMATION ELEMENT | GSM/UMTS |
| LAC | LOCATION AREA INFORMATION ELEMENT<br>ROUTING AREA INFORMATION ELEMENT | GSM/UMTS |
| PLMN | PLMN IDENTITY INFORMATION ELEMENT | GSM/UMTS |
| RAC | ROUTING AREA INFORMATION ELEMENT | GSM/UMTS |
| CELL IDENTITY | CELL IDENTITY INFORMATION ELEMENT | UMTS |
| TIME ZONE | TIME ZONE INFORMATION ELEMENT | GSM/UMTS |

FIGURE 23B

| Item | Unit | Type | Size [bytes] | Notes |
|---|---|---|---|---|
| **Latest GPS Fix** <br> This is updated in memory when <br> 1. power up <br> 2. a GPS fix is available <br> This is saved to the EFS file POS_DB at power down. | | | | |
| Lat_gps | degree | float | 4 | GPS fix latitude |
| Lon_gps | degree | float | 4 | GPS fix longitude |
| Position_Unc_gps | meter | float | 4 | Position standard deviation estimate |
| gpsWeek_gps | week no. | uint16 | 2 | GPS fix at this GPS week |
| gpsMs_gps | ms | uint32 | 4 | GPS fix at this GPS time of week |

| Item | Unit | Type | Size [bytes] | Notes |
|---|---|---|---|---|
| **SIDlatest**<br>This is updated in memory when<br>1. power up<br>2. detecting OOS<br>3. during handoff to a new SIDserving, keep the old SIDserving here<br><br>This is saved to the EFS file GPS_DB at power down. | | | | |
| SIDlatest | n/a | uint16 | 2 | Latest serving SID |
| gpsWeek | week no. | uint16 | 2 | GPS week |
| gpsMs | ms | uint32 | 4 | GPS ms of week |
| **Latest Base Station Info**<br>This is updated in memory when<br>1. power up<br>2. a non-zero base station lat/lon is found<br><br>This is saved to the EFS file GPS_DB at power down. | | | | |
| BSLat | radian | float | 4 | Base station latitude |
| BSLon | radian | float | 4 | Base station longitude |
| Dmar | km | uint8 | 1 | Dynamic MAR value used for this Base Station broadcasted Lat/Lon |
| gpsWeek_BsInfo | week no | uint16 | 2 | GPS week tagged for SID_BsInfo |
| gpsMS_BsInfo | ms | uint32 | 4 | GPS ms of week tagged for SID_BsInfo |

| Item | Unit | Type | Size [bytes] | Notes |
|---|---|---|---|---|
| sid | n/a | uint16 | 2 | SID that has a GPS position |
| mask | n/a | uint8 | 1 | bit 0 - 1: sid conflict found<br>- 0: no sid conflict |
| latitude | degree | float | 4 | Latitude - GPS position |
| longitude | degree | float | 4 | Longitude – GPS position |
| gpsWeek | week no. | uint16 | 2 | GPS week tagged to the GPS position |
| gpsMs | ms | uint32 | 4 | GPS Time tagged to the GPS position |

FIGURE 29

| Item | Unit | Type | Size [bytes] | Notes |
|---|---|---|---|---|
| SIDstart | n/a | uint16 | 2 | Starting SID used for this country |
| SIDend | n/a | uint16 | 2 | Ending SID used for this country |
| latitude | 0.001 radian | int16 | 2 | Latitude of the central position in the country |
| longitude | 0.001 radian | int16 | 2 | Longitude of the central position in the country |
| radius | km | uint16 | 2 | circular position uncertainty from the central position |

FIGURE 30 as of 4/15/2004 as noted in the www.ifast.org website http://www.beg.utexas.edu/GIS/tools/scale http://www.cia.gov/cia/pu http://www.infoplease.co

| SID RANGE | | Lo | Hi | Reserved | Country | Region | Geo Coordinates |
|---|---|---|---|---|---|---|---|
| 0 | | | | 1 | Unassigned | | |
| 1 | 2175 | 0x0001 | 0x087F | 2175 | USA | N.America | 38 00 N, 97 00 W |
| 2176 | 2303 | 0x0880 | 0x08FF | 128 | S. Korea | | 37 00 N, 127 30 E |
| 2304 | 4095 | 0x0900 | 0x0FFF | 1792 | USA | N.America | 38 00 N, 97 00 W |
| 4096 | 7679 | 0x1000 | 0x1DFF | 3584 | USA | N.America | 38 00 N, 97 00 W |
| 7680 | 7807 | 0x1E00 | 0x1E7F | 128 | Australia | Australia | 27 00 S, 133 00 E |
| | | | 0x1E8 | | Hawaii | N.America | 21 00 N, 157 30 W |
| 7808 | 7871 | 0x1E80 | F | 64 | Globalstar | | |
| 7872 | 7935 | 0x1EC0 | 0x1EF | 64 | ICO | | |
| 7936 | 7951 | 0x1F00 | 0x1F0F | 16 | Faroe Is. | N.Europe | 62 00 N, 7 00 W |
| 7952 | 7967 | 0x1F10 | 0x1F1F | 16 | Greenland | N.America | 72 00 N, 40 00 W |
| 7968 | 7983 | 0x1F20 | 0x1F2F | 16 | Falkland Is. | S.America | 51 45 S, 59 00 W |
| 7984 | 7999 | 0x1F30 | 0x1F3F | 16 | St. Pierre/Miquelon | N.America | 46 50 N, 56 20 W |
| 8000 | 8007 | 0x1F40 | 0x1F47 | 8 | Saint Vincent/Grenadines | Carribean | 13 15 N, 61 12 W |
| 8008 | 8015 | 0x1F48 | 0x1F4F | 8 | Unassigned | | |
| 8016 | 8031 | | | 16 | Saint Lucia | Carribean | 20 N, 70 W |
| 8032 | 8047 | | | 16 | Saint Kitts/Nevis | Carribean | 20 N, 70 W |
| 8048 | 8063 | | | 16 | Montserrat | Carribean | 20 N, 70 W |
| 8064 | 8079 | | | 16 | Grenada | Carribean | 20 N, 70 W |
| 8080 | 8095 | | | 16 | Bahamas | Carribean | 20 N, 70 W |
| 8096 | 8111 | | | 16 | Bermuda | Carribean | 20 N, 70 W |
| 8112 | 8127 | | | 16 | British Virgin Is | Carribean | 20 N, 70 W |
| 8128 | 8143 | | | 16 | Cayman Is | Carribean | 20 N, 70 W |
| 8144 | 8159 | | | 16 | Antigua/Barbuda | Carribean | 20 N, 70 W |
| 8160 | 8175 | | | 16 | Barbados | Carribean | 20 N, 70 W |
| 8176 | 8191 | | 0x1FFF | 16 | Jamaica | | 20 N, 70 W |
| 8192 | 8223 | | | 32 | Thailand | N.Africa | 15 00 N, 100 00 E |
| 8224 | 8255 | | | 32 | Egypt | N.Africa | 27 00 N, 30 00 E |
| 8256 | 8287 | | | 32 | Morocco | N.Africa | 32 00 N, 5 00 W |
| 8288 | 8319 | | | 32 | Algeria | Australia | 28 00 N, 3 00 E |
| 8320 | 8447 | | | 128 | Australia | MiddleEst | 27 00 S, 133 00 E |
| 8448 | 8479 | | | 32 | Israel | N.Africa | 31 30 N, 34 45 E |
| 8480 | 8511 | | | 32 | Tunisia | N.Africa | 34 00 N, 9 00 E |
| 8512 | 8543 | | | 32 | Libya | N.Africa | 25 00 N, 17 00 E |

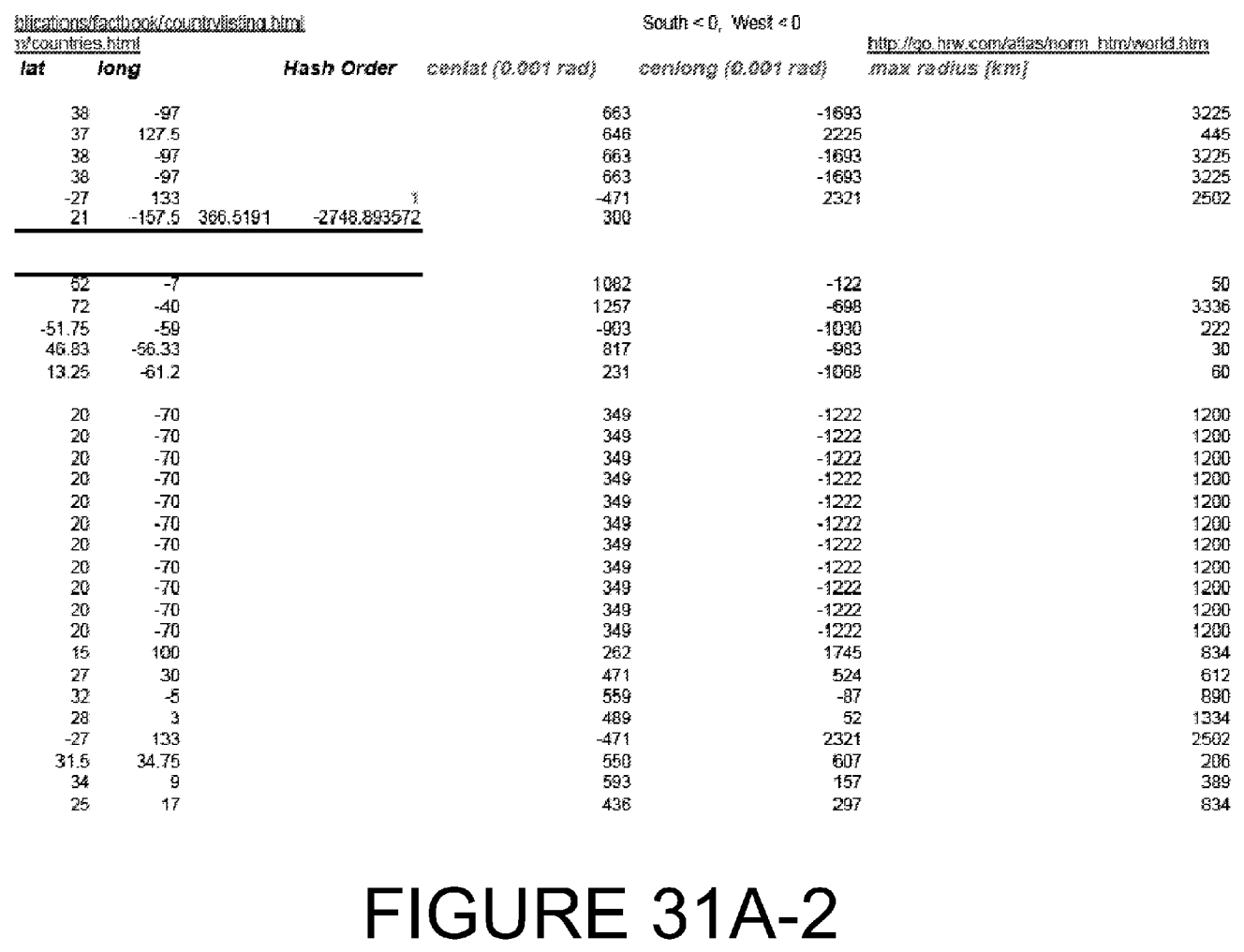

FIGURE 31A-1 blications/factbook/countrylisting.html
s/countries.html

South < 0, West < 0 http://go.hrw.com/atlas/norm_htm/world.htm

| lat | long | | Hash Order | cenlat (0.001 rad) | cenlong (0.001 rad) | max radius [km] |
|---|---|---|---|---|---|---|
| 38 | -97 | | | 663 | -1693 | 3225 |
| 37 | 127.5 | | | 646 | 2225 | 445 |
| 38 | -97 | | | 663 | -1693 | 3225 |
| 38 | -97 | | | 663 | -1693 | 3225 |
| -27 | 133 | | 1 | -471 | 2321 | 2502 |
| 21 | -157.5 | 366.5191 | -2748.893572 | 300 | | |
| 62 | -7 | | | 1082 | -122 | 50 |
| 72 | -40 | | | 1257 | -698 | 3336 |
| -51.75 | -59 | | | -903 | -1030 | 222 |
| 46.83 | -56.33 | | | 817 | -983 | 30 |
| 13.25 | -61.2 | | | 231 | -1068 | 60 |
| 20 | -70 | | | 349 | -1222 | 1200 |
| 20 | -70 | | | 349 | -1222 | 1200 |
| 20 | -70 | | | 349 | -1222 | 1200 |
| 20 | -70 | | | 349 | -1222 | 1200 |
| 20 | -70 | | | 349 | -1222 | 1200 |
| 20 | -70 | | | 349 | -1222 | 1200 |
| 20 | -70 | | | 349 | -1222 | 1200 |
| 20 | -70 | | | 349 | -1222 | 1200 |
| 20 | -70 | | | 349 | -1222 | 1200 |
| 20 | -70 | | | 349 | -1222 | 1200 |
| 20 | -70 | | | 349 | -1222 | 1200 |
| 15 | 100 | | | 262 | 1745 | 834 |
| 27 | 30 | | | 471 | 524 | 612 |
| 32 | -5 | | | 559 | -87 | 890 |
| 28 | 3 | | | 489 | 52 | 1334 |
| -27 | 133 | | | -471 | 2321 | 2502 |
| 31.5 | 34.75 | | | 550 | 607 | 206 |
| 34 | 9 | | | 593 | 157 | 389 |
| 25 | 17 | | | 436 | 297 | 834 |

FIGURE 31A-2

| | | | | | | |
|---|---|---|---|---|---|---|
| 8544 | 8575 | | 32 | Gambia | W.Africa | 13 28 N, 16 34 W |
| 8576 | 8703 | | 128 | New Zealand | Australia | 41 00 S, 174 00 E |
| 8704 | 8735 | | 32 | Senegal | W.Africa | 14 00 N, 14 00 W |
| 8736 | 8767 | 0x223F | 32 | Mauritania | N.Africa | 20 00 N, 12 00 W |
| 8768 | 8799 | | 32 | Mali | W.Africa | 17 00 N, 4 00 W |
| 8800 | 8831 | | 32 | Guinea | W.Africa | 11 00 N, 10 00 W |
| 8832 | 8847 | | 16 | Dominican Rep | Carribean | 19 00 N, 70 40 W |
| 8848 | 8863 | | 16 | Cape Verde | W.Africa | 16 00 N, 24 00 W |
| 8864 | 8879 | | 16 | Sao Tome/Principe | W.Africa | 1 00 N, 7 00 E |
| 8880 | 8895 | | 16 | Diego Garcia | Oceania | 6 00 S, 71 30 E |
| 8896 | 8911 | 0x22CF | 16 | Seychelles | E.Africa | 4 35 S, 55 40 E |
| 8912 | 8927 | | 16 | Djibouti | E.Africa | 11 30 N, 43 00 E |
| 8928 | 8943 | | 16 | Kazakhstan | | 48 00 N, 68 00 E |
| 8944 | 8959 | 0x22FF | 16 | Reunion | S.Africa | 21 06 S, 55 36 E |
| 8960 | 8991 | 0x231F | 32 | Côte d'Ivoire | W.Africa | 8 00 N, 5 00 W |
| 8992 | 9023 | 0x233F | 32 | Burkina Faso | W.Africa | 13 00 N, 2 00 W |
| 9024 | 9055 | | 32 | Niger | W.Africa | 16 00 N, 8 00 E |
| 9056 | 9087 | | 32 | Togo | W.Africa | 8 00 N, 1 10 E |
| 9088 | 9119 | | 32 | Benin | W.Africa | 9 30 N, 2 15 E |
| 9120 | 9151 | | 32 | Mauritius | S.Africa | 20 17 S, 57 33 E |
| 9152 | 9183 | | 32 | Liberia | W.Africa | 6 30 N, 9 30 W |
| 9184 | 9215 | | 32 | Sierra Leone | W.Africa | 8 30 N, 11 30 W |
| 9216 | 9247 | | 32 | Ghana | W.Africa | 8 00 N, 2 00 W |
| 9248 | 9279 | | 32 | Nigeria | Africa | 10 00 N, 8 00 E |
| 9280 | 9311 | | 32 | Chad | Africa | 15 00 N, 19 00 E |
| 9312 | 9343 | | 32 | Central African Rep | Africa | 7 00 N, 21 00 E |
| 9344 | 9375 | | 32 | Cameroon | Africa | 6 00 N, 12 00 E |
| 9376 | 9407 | | 32 | Equatorial Guinea | Africa | 2 00 N, 10 00 E |
| 9408 | 9439 | | 32 | Gabon | Africa | 1 00 S, 11 45 E |
| 9440 | 9471 | | 32 | Congo | Africa | 1 00 S, 15 00 E |
| 9472 | 9503 | | 32 | Dem. Rep. Of Congo (Zai | Africa | 0 00 N, 25 00 E |
| 9504 | 9535 | | 32 | Angola | Africa | 12 30 S, 18 30 E |
| 9536 | 9567 | | 32 | Guinea-Bissau | Africa | 12 00 N, 15 00 W |
| 9568 | 9599 | | 32 | Sudan | Africa | 15 00 N, 30 00 E |
| 9600 | 9615 | | 16 | Lesotho | Africa | 29 30 S, 28 30 E |
| 9616 | 9631 | | 16 | Dominica | Carribean | 15 25 N, 61 20 W |
| 9632 | 9647 | | 16 | Swaziland | S.Africa | 26 30 S, 31 30 E |

FIGURE 31B-1

| | | | | | |
|---|---|---|---|---|---|
| 13.47 | -16.57 | | 235 | -289 | 100 |
| -41 | 174 | | -716 | 3037 | 723 |
| 14 | -14 | | 244 | -244 | 334 |
| 20 | -12 | | 349 | -209 | 723 |
| 17 | -4 | | 297 | -70 | 890 |
| 11 | -10 | | 192 | -175 | 1279 |
| 19 | -70.67 | 15 | 332 | -1233 | 222 |
| 16 | -24 | | 279 | -419 | 170 |
| 1 | 7 | | 17 | 122 | 120 |
| -6 | 71.5 | | -105 | 1248 | 15 |
| -4.58 | 55.67 | | -80 | 972 | 600 |
| 11.5 | 43 | | 201 | 750 | 139 |
| 48 | 68 | | 838 | 1187 | 2502 |
| -21.1 | 55.6 | | -368 | 970 | 40 |
| 8 | -5 | | 140 | -87 | 334 |
| 13 | -2 | | 227 | -35 | 500 |
| 16 | 8 | | 279 | 140 | 834 |
| 8 | 1.17 | | 140 | 20 | 278 |
| 9.5 | 2.25 | | 166 | 39 | 361 |
| -20.28 | 57.55 | | -354 | 1004 | 16 |
| 6.5 | -9.5 | | 113 | -166 | 278 |
| 8.5 | -11.5 | | 148 | -201 | 222 |
| 8 | -2 | | 140 | -35 | 334 |
| 10 | 8 | | 175 | 140 | 667 |
| 15 | 19 | | 262 | 332 | 890 |
| 7 | 21 | | 122 | 367 | 723 |
| 6 | 12 | | 105 | 209 | 612 |
| 2 | 10 | | 35 | 175 | 167 |
| -1 | 11.75 | | -17 | 205 | 334 |
| -1 | 15 | | -17 | 262 | 500 |
| 0 | 25 | | 0 | 436 | 1056 |
| -12.5 | 18.5 | | -218 | 323 | 778 |
| 12 | -15 | | 209 | -262 | 195 |
| 15 | 30 | | 262 | 524 | 1056 |
| -29.5 | 28.5 | | -515 | 497 | 167 |
| 15.42 | -61.33 | | 269 | -1070 | 25 |
| -26.5 | 31.5 | | -463 | 550 | 111 |

FIGURE 31B-2

| | | | | | |
|---|---|---|---|---|---|
| 9648 | 9663 | 16 | Aruba | Carribean | 12 30 N, 69 58 W |
| 9664 | 9679 | 16 | Singapore | SE Asia | 1 22 N, 103 48 E |
| 9680 | 9695 | 16 | Northern Mariana Islands | Oceania | 15 12 N, 145 45 E |
| 9696 | 9711 | 16 | Guam | Oceania | 13 28 N, 144 47 E |
| 9712 | 9727 | 16 | Australian External Terri | ? | |
| 9728 | 9759 | 32 | Rwanda | Africa | 2 00 S, 30 00 E |
| 9760 | 9791 | 32 | Ethiopia | Africa | 8 00 N, 38 00 E |
| 9792 | 9823 | 32 | Somalia | Africa | 10 00 N, 49 00 E |
| 9824 | 9855 | 32 | Trinidad and Tobago | Carribean | 11 00 N, 61 00 W |
| 9856 | 9887 | 32 | Kenya | Africa | 1 00 N, 38 00 E |
| 9888 | 9919 | 32 | Tanzania | Africa | 6 00 S, 35 00 E |
| 9920 | 9951 | 32 | Uganda | Africa | 1 00 N, 32 00 E |
| 9952 | 9983 | 32 | Burundi | Africa | 3 30 S, 30 00 E |
| 9984 | 10015 | 32 | Mozambique | Africa | 18 15 S, 35 00 E |
| 10016 | 10047 | 32 | Zambia | Africa | 15 00 S, 30 00 E |
| 10048 | 10079 | 32 | Madagascar | Africa | 20 00 S, 47 00 E |
| 10080 | 10111 | 32 | Zimbabwe | Africa | 20 00 S, 30 00 E |
| 10112 | 10143 | 32 | Namibia | Africa | 22 00 S, 17 00 E |
| 10144 | 10175 | 32 | Malawi | Africa | 13 30 S, 34 00 E |
| 10176 | 10207 | 32 | Botswana | Africa | 22 00 S, 24 00 E |
| 10208 | 10239 | 32 | Comoros | Africa | 12 10 S, 44 15 E |
| 10240 | 10367 | 128 | South Africa | Africa | 29 00 S, 24 00 E |
| 10368 | 10495 | 128 | Malaysia | Asia | 2 30 N, 112 30 E |
| 10496 | 10623 | 128 | Indonesia | Asia | 5 00 S, 120 00 E |
| 10624 | 10639 | 16 | Philippines | Asia | 13 00 N, 122 00 E |
| 10640 | 10655 | 16 | Hong Kong | Asia | 22 15 N, 114 10 E |
| 10656 | 10751 | 96 | Philippines | Asia | 13 00 N, 122 00 E |
| 10752 | 10767 | 16 | Monaco | Europe | 43 44 N, 7 24 E |
| 10768 | 10783 | 16 | San Marino | Europe | 43 46 N, 12 25 E |
| 10784 | 10785 | 2 | Latvia | Europe | 57 00 N, 25 00 E |
| 10786 | 10799 | 14 | Unassigned | | |
| 10800 | 10815 | 16 | Turks and Caicos Islands | Carribean | 21 45 N, 71 35 W |
| 10816 | 10831 | 16 | St. Pierre and Miquelon | N.America | 46 50 N, 56 20 W |
| 10832 | 10855 | 24 | Uzbekistan | MiddleEst | 41 00 N, 64 00 E |
| 10856 | 10879 | 24 | Unassigned | | |
| 10880 | 10895 | 16 | Brunei Darussalam | SE Asia | 4 30 N, 114 40 E |
| 10896 | 10911 | 16 | Nauru | Oceania | 0 32 S, 166 55 E |

FIGURE 31C-1

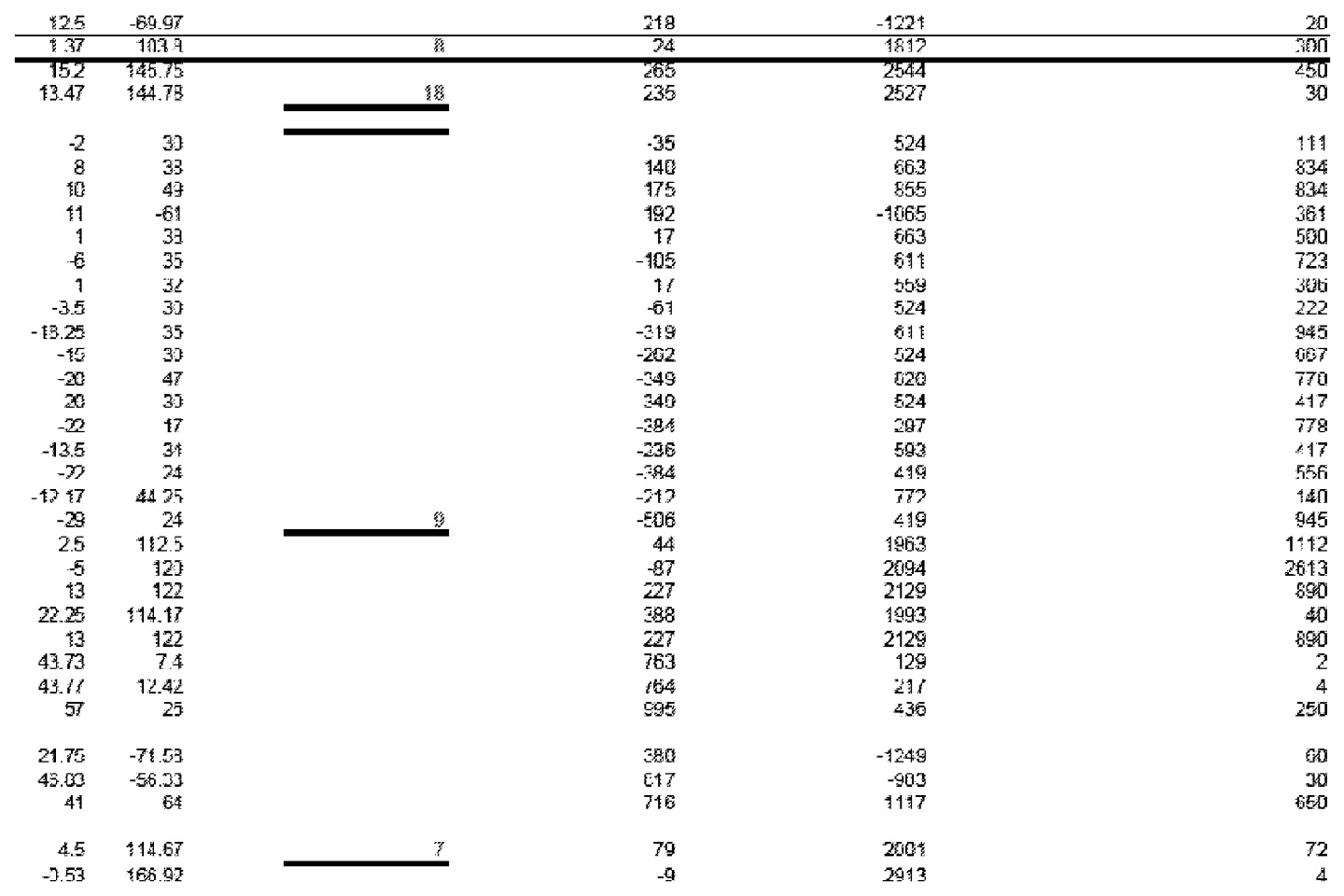

| | | | | | |
|---|---|---|---|---|---|
| 12.5 | -69.97 | | 218 | -1221 | 20 |
| 1.37 | 103.4 | 8 | 24 | 1812 | 300 |
| 15.2 | 145.75 | | 265 | 2544 | 450 |
| 13.47 | 144.78 | 18 | 235 | 2527 | 30 |
| -2 | 30 | | -35 | 524 | 111 |
| 8 | 33 | | 140 | 663 | 834 |
| 10 | 49 | | 175 | 855 | 834 |
| 11 | -61 | | 192 | -1065 | 361 |
| 1 | 33 | | 17 | 663 | 500 |
| -6 | 35 | | -105 | 611 | 723 |
| 1 | 32 | | 17 | 559 | 306 |
| -3.5 | 30 | | -61 | 524 | 222 |
| -18.25 | 35 | | -319 | 611 | 945 |
| -15 | 30 | | -202 | 524 | 667 |
| -20 | 47 | | -349 | 620 | 770 |
| 20 | 30 | | 340 | 524 | 417 |
| -22 | 17 | | -384 | 297 | 778 |
| -13.5 | 31 | | -236 | 593 | 417 |
| -22 | 24 | | -384 | 419 | 556 |
| -12.17 | 44.25 | | -212 | 772 | 140 |
| -29 | 24 | 9 | -506 | 419 | 945 |
| 2.5 | 112.5 | | 44 | 1963 | 1112 |
| -5 | 120 | | -87 | 2094 | 2613 |
| 13 | 122 | | 227 | 2129 | 890 |
| 22.25 | 114.17 | | 388 | 1993 | 40 |
| 13 | 122 | | 227 | 2129 | 890 |
| 43.73 | 7.4 | | 763 | 129 | 2 |
| 43.77 | 12.42 | | 764 | 217 | 4 |
| 57 | 25 | | 995 | 436 | 250 |
| 21.75 | -71.53 | | 380 | -1249 | 60 |
| 45.83 | -56.33 | | 817 | -903 | 30 |
| 41 | 64 | | 716 | 1117 | 650 |
| 4.5 | 114.67 | 7 | 79 | 2001 | 72 |
| -0.53 | 166.92 | | -9 | 2913 | 4 |

FIGURE 31C-2

| | | | | | |
|---|---|---|---|---|---|
| 10912 | 10927 | 16 | Tonga | Oceania | 20 00 S, 175 00 W |
| 10928 | 10943 | 16 | Solomon Islands | Oceania | 8 00 S, 159 00 E |
| 10944 | 10959 | 16 | Vanuatu | Oceania | 16 00 S, 167 00 E |
| 10960 | 10975 | 16 | Fiji | Oceania | 18 00 S, 175 00 E |
| 10976 | 10991 | 16 | Palau | Oceania | 7 30 N, 134 30 E |
| 10992 | 11007 | 16 | Wallis and Futuna | Oceania | 13 18 S, 176 12 W |
| 11008 | 11039 | 32 | Papua New Guinea | Oceania | 6 00 S, 147 00 E |
| 11040 | 11071 | 32 | Micronesia | Oceania | 6 55 N, 158 15 E |
| 11072 | 11103 | 32 | N. Korea | Asia | 40 00 N, 127 00 E |
| 11104 | 11135 | 32 | Cambodia | Asia | 13 00 N, 105 00 E |
| 11136 | 11151 | 16 | Cook Islands | Oceania | 21 14 S, 159 46 W |
| 11152 | 11167 | 16 | Niue Island | Oceania | 19 02 S, 169 52 W |
| 11168 | 11183 | 16 | American Samoa | US Tertry | 14 20 S, 170 00 W |
| 11184 | 11199 | 16 | Samoa | Oceania | 13 35 S, 172 20 W |
| 11200 | 11215 | 16 | Kiribati | Oceania | 1 25 N, 173 00 E |
| 11216 | 11231 | 16 | New Caledonia | Oceania | 21 30 S, 165 30 E |
| 11232 | 11247 | 16 | Tuvalu | Oceania | 8 00 S, 178 00 E |
| 11248 | 11263 | 16 | French Polynesia | Oceania | 15 00 S, 140 00 W |
| 11264 | 11279 | 16 | Tokelan | Oceania | 9 00 S, 172 00 W |
| 11280 | 11295 | 16 | Marshall Isl | Oceania | 9 00 N, 168 00 E |
| 11296 | 11311 | 16 | Macau | SE Asia | 22 10 N, 113 33 E |
| 11312 | 11327 | 16 | Kuwait | MiddleEst | 29 30 N, 45 45 E |
| 11328 | 11343 | 16 | Yemen | MiddleEst | 15 00 N, 48 00 E |
| 11344 | 11359 | 16 | Oman | MiddleEst | 21 00 N, 57 00 E |
| 11360 | 11375 | 16 | Yemen | MiddleEst | 15 00 N, 48 00 E |
| 11376 | 11391 | 16 | United Arab Emirates | MiddleEst | 24 00 N, 54 00 E |
| 11392 | 11554 | 163 | Russia | Asia | 60 00 N, 100 00 E |
| 11555 | | 1 | Uzbekistan | Asia | 41 00 N, 64 00 E |
| 11556 | 11599 | 44 | Russia | Asia | 60 00 N, 100 00 E |
| 11600 | | 1 | Uzbekistan | Asia | 41 00 N, 64 00 E |
| 11601 | 12287 | 687 | Russia | Asia | 60 00 N, 100 00 E |
| 12288 | 13311 | 1024 | Japan | Asia | 36 00 N, 138 00 E |
| 13312 | 13439 | 128 | Vietnam | Asia | 16 00 N, 106 00 E |
| 13440 | 13471 | 32 | Lao People's Dem. Rep | Asia | 18 00 N, 105 00 E |
| 13472 | 13503 | 32 | Bangladesh | Asia | 24 00 N, 90 00 E |
| 13504 | 13535 | 32 | Taiwan | Asia | 23 30 N, 121 00 E |
| 13536 | 13567 | 32 | Maldives | S.Asia | 3 15 N, 73 00 E |

FIGURE 31D-1

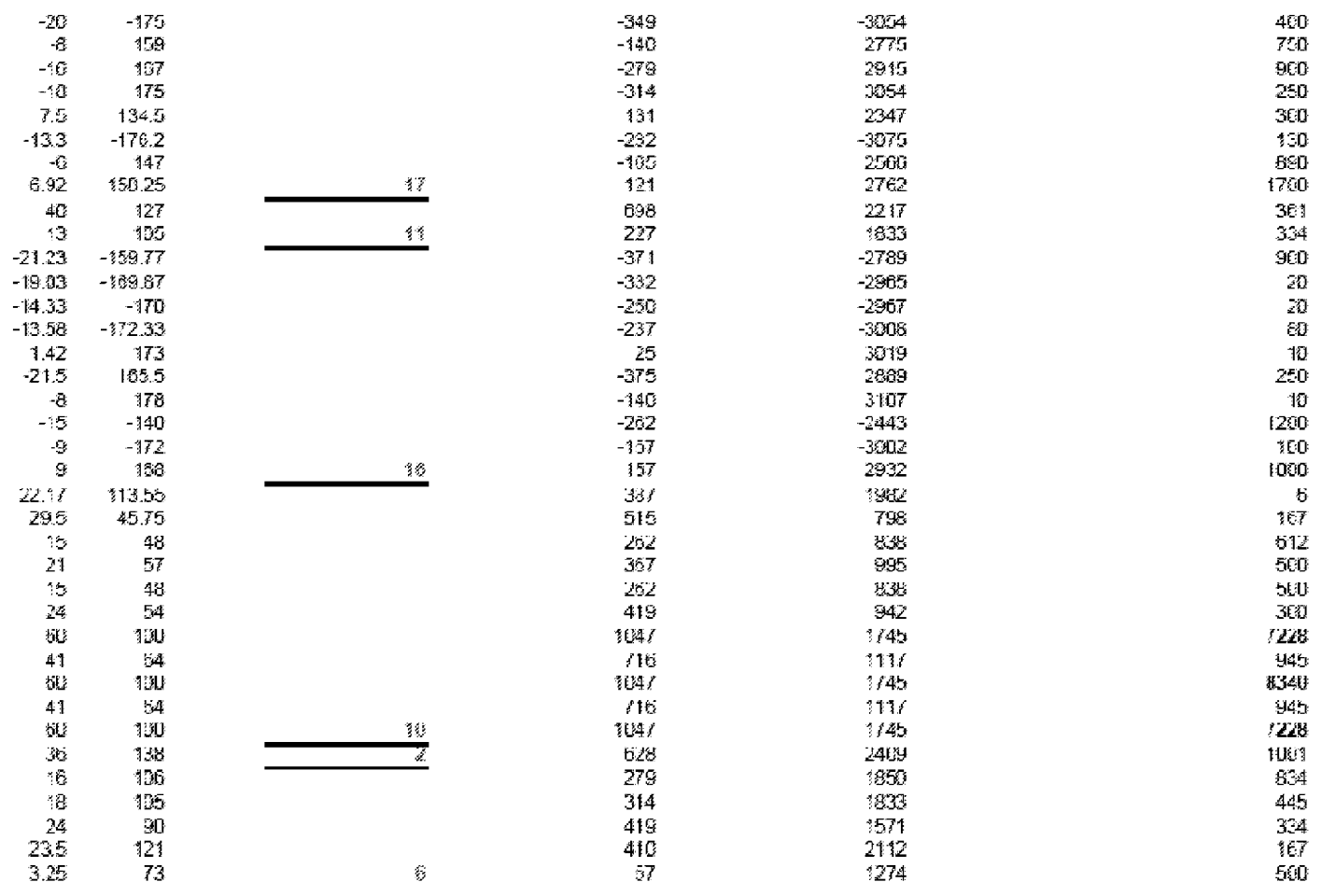

| | | | | | |
|---|---|---|---|---|---|
| -20 | -175 | | -349 | -3054 | 400 |
| -8 | 159 | | -140 | 2775 | 750 |
| -10 | 167 | | -279 | 2915 | 900 |
| -10 | 175 | | -314 | 3054 | 250 |
| 7.5 | 134.5 | | 131 | 2347 | 300 |
| -13.3 | -176.2 | | -232 | -3075 | 130 |
| -6 | 147 | | -105 | 2560 | 880 |
| 6.92 | 150.25 | 17 | 121 | 2762 | 1700 |
| 40 | 127 | | 698 | 2217 | 361 |
| 13 | 105 | 11 | 227 | 1833 | 334 |
| -21.23 | -159.77 | | -371 | -2789 | 900 |
| -19.83 | -169.87 | | -332 | -2965 | 20 |
| -14.33 | -170 | | -250 | -2967 | 20 |
| -13.58 | -172.33 | | -237 | -3008 | 60 |
| 1.42 | 173 | | 25 | 3019 | 10 |
| -21.5 | 165.5 | | -375 | 2889 | 250 |
| -8 | 178 | | -140 | 3107 | 10 |
| -15 | -140 | | -262 | -2443 | 1200 |
| -9 | -172 | | -157 | -3002 | 100 |
| 9 | 168 | 16 | 157 | 2932 | 1000 |
| 22.17 | 113.55 | | 387 | 1982 | 6 |
| 29.5 | 45.75 | | 515 | 798 | 167 |
| 15 | 48 | | 262 | 838 | 612 |
| 21 | 57 | | 367 | 995 | 500 |
| 15 | 48 | | 262 | 838 | 500 |
| 24 | 54 | | 419 | 942 | 300 |
| 60 | 100 | | 1047 | 1745 | 7228 |
| 41 | 64 | | 716 | 1117 | 945 |
| 60 | 100 | | 1047 | 1745 | 8340 |
| 41 | 64 | | 716 | 1117 | 945 |
| 60 | 100 | 10 | 1047 | 1745 | 7228 |
| 36 | 138 | 2 | 628 | 2409 | 1001 |
| 16 | 106 | | 279 | 1850 | 834 |
| 18 | 105 | | 314 | 1833 | 445 |
| 24 | 90 | | 419 | 1571 | 334 |
| 23.5 | 121 | | 410 | 2112 | 167 |
| 3.25 | 73 | 6 | 57 | 1274 | 500 |

FIGURE 31D-2

| | | | | | |
|---|---|---|---|---|---|
| 13568 | 14335 | | 768 China | Asia | 35 00 N, 105 00 E |
| 14336 | 14463 | | 128 Turkey | MiddleEst | 39 00 N, 35 00 E |
| 14464 | 14847 | | 384 India | Asia | 20 00 N, 77 00 E |
| 14848 | 14975 | | 128 Pakistan | Asia | 30 00 N, 70 00 E |
| 14976 | 15103 | | 128 Afghanistan | Asia | 33 00 N, 65 00 E |
| 15104 | 15231 | | 128 Sri Lanka | S Asia | 7 00 N, 81 00 E |
| 15232 | 15359 | | 128 Burma | SE Asia | 22 00 N, 98 00 E |
| 15360 | 15391 | | 32 Lebanon | MiddleEst | 33 50 N, 35 50 E |
| 15392 | 15423 | | 32 Jordan | MiddleEst | 31 00 N, 36 00 E |
| 15424 | 15455 | | 32 Syria | MiddleEst | 35 00 N, 38 00 E |
| 15456 | 15487 | | 32 Iraq | MiddleEst | 33 00 N, 44 00 E |
| 15488 | 15519 | | 32 Saudi Arabia | MiddleEst | 25 00 N, 45 00 E |
| 15520 | 15551 | | 32 Mongolia | Asia | 46 00 N, 105 00 E |
| 15552 | 15583 | | 32 Nepal | S Asia | 28 00 N, 84 00 E |
| 15584 | 15615 | | 32 Bulgaria | Europe | 43 00 N, 25 00 E |
| 15616 | 15743 | | 128 Iran | MiddleEst | 32 00 N, 53 00 E |
| 15744 | 15871 | | 120 Hungary | Europe | 47 00 N, 20 00 E |
| 15906 | 15999 | | 94 Unassigned | | |
| 16000 | 16127 | | 128 Romania | Europe | 46 00 N, 25 00 E |
| 16128 | 16255 | | 128 Czech Rep | Europe | 49 45 N, 15 30 E |
| 16256 | 16383 | | 128 Unassigned | | |
| 16384 | 18431 | | 2048 Canada | N.America | 60 00 N, 95 00 W |
| 18432 | 21549 | | 3118 Unassigned | | |
| 21550 | 21566 | | 17 Kyrgyz rep | Asia | 41 00 N, 75 00 E |
| 21567 | 22015 | | 449 Unassigned | | |
| 22016 | 22271 | | 256 Germany | Europe | 51 00 N, 9 00 E |
| 22272 | 22399 | | 128 Norway | Europe | 62 00 N, 10 00 E |
| 22400 | 22527 | | 128 Unassigned | | |
| 22528 | 22543 | | 16 Denmark | Europe | 56 00 N, 10 00 E |
| 22544 | 22655 | | 112 Unassigned | | |
| 22656 | 22911 | | 256 United Kingdom | Europe | 54 00 N, 2 00 W |
| 22912 | 23039 | | 128 Austria | Europe | 47 20 N, 13 20 E |
| 23040 | 23167 | | 128 Switzerland | Europe | 47 00 N, 8 00 E |
| 23168 | 23423 | | 256 Italy | Europe | 42 50 N, 12 50 E |
| 23424 | 23551 | | 128 Serbia and Montenegro (Y | Europe | 44 00 N, 21 00 E |
| 23552 | 23679 | | 128 Spain | Europe | 40 00 N, 4 00 W |
| 23680 | 23935 | 0x5D7F | 256 France | Europe | 46 00 N, 2 00 E |

FIGURE 31E-1

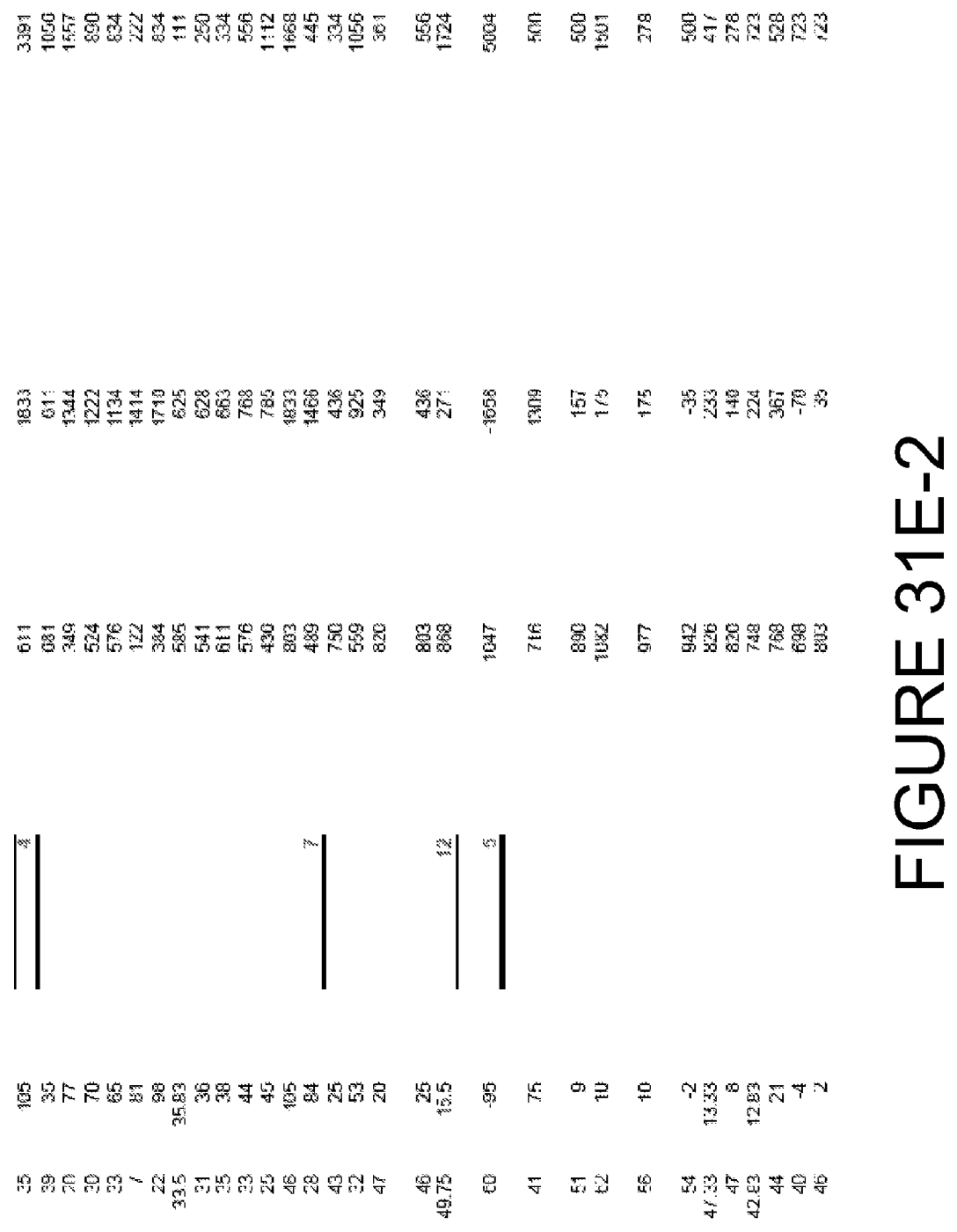

| | | | | | |
|---|---|---|---|---|---|
| 35 | 105 | 4 | 611 | 1833 | 3391 |
| 39 | 35 | | 081 | 611 | 1050 |
| 20 | 77 | | 349 | 1344 | 1557 |
| 30 | 70 | | 524 | 1222 | 890 |
| 33 | 65 | | 576 | 1134 | 834 |
| 7 | 81 | | 122 | 1414 | 222 |
| 22 | 98 | | 384 | 1710 | 834 |
| 33.5 | 35.83 | | 585 | 625 | 111 |
| 31 | 36 | | 541 | 628 | 250 |
| 35 | 38 | | 611 | 663 | 334 |
| 33 | 44 | | 576 | 768 | 556 |
| 25 | 45 | | 430 | 785 | 1112 |
| 46 | 105 | | 803 | 1833 | 1668 |
| 28 | 84 | 7 | 489 | 1466 | 445 |
| 43 | 25 | | 750 | 436 | 334 |
| 32 | 53 | | 559 | 925 | 1056 |
| 47 | 20 | | 820 | 349 | 361 |
| 46 | 25 | | 803 | 436 | 556 |
| 49.75 | 15.5 | 12 | 868 | 271 | 1724 |
| 60 | -95 | 5 | 1047 | -1658 | 5004 |
| 41 | 75 | | 716 | 1309 | 500 |
| 51 | 9 | | 890 | 157 | 500 |
| 62 | 10 | | 1082 | 175 | 1501 |
| 56 | 10 | | 977 | 175 | 278 |
| 54 | -2 | | 942 | -35 | 500 |
| 47.33 | 13.33 | | 826 | 233 | 417 |
| 47 | 8 | | 820 | 140 | 278 |
| 42.83 | 12.83 | | 748 | 224 | 723 |
| 44 | 21 | | 768 | 367 | 528 |
| 40 | -4 | | 698 | -70 | 723 |
| 46 | 2 | | 803 | 35 | 723 |

FIGURE 31E-2

| | | | | | | |
|---|---|---|---|---|---|---|
| 23036 | 24063 | 0x5D80 | | 128 | Belgium | Europe | 50 50 N, 4 00 E |
| 24064 | 24191 | | | 128 | Netherlands | Europe | 52 30 N, 5 45 E |
| 24192 | 24319 | | | 128 | Greece | Europe | 39 00 N, 22 00 E |
| 24320 | 24351 | | | 32 | Portugal | Europe | 39 30 N, 8 00 W |
| 24352 | 24383 | | | 32 | Luxembourg | Europe | 49 45 N, 6 10 E |
| 24384 | 24415 | | | 32 | Unassigned | | |
| 24416 | 24447 | | | 32 | Iceland | Europe | 65 00 N, 18 00 W |
| 24448 | 24575 | | | 128 | Unassigned | | |
| 24576 | 25075 | 0x6000 | | 500 | Mexico | S.America | 23 00 N, 102 00 W |
| 25076 | 25099 | | | 24 | Unassigned | | |
| 25100 | 25124 | | | 25 | Mexico | S.America | 23 00 N, 102 00 W |
| 25125 | 25599 | | | 475 | Unassigned | | |
| 25600 | 26111 | 0x6400 | 0x65FF | 512 | China | Asia | 35 00 N, 105 00 E |
| 31104 | 31135 | | | 32 | Paraguay | S.America | 23 00 S, 58 00 W |
| 31136 | 31167 | | | 32 | Surinam | S.America | 4 00 N, 56 00 W |
| 31168 | 31199 | | | 32 | Uruguay | S.America | 33 00 S, 56 00 W |
| 31200 | 31231 | | | 32 | Cyprus | Europe | 35 00 N, 33 00 E |
| 31232 | 31263 | | | 32 | Bolivia | S.America | 17 00 S, 65 00 W |
| 31264 | 31295 | | | 32 | Guyana | S.America | 5 00 N, 59 00 W |
| 31296 | 31327 | | | 32 | Ecuador | S.America | 2 00 S, 77 30 W |
| 31328 | 31359 | | | 32 | Guiana | S.America | 4 00 N, 53 00 W |
| 31360 | 31375 | | | 16 | Guadeloupe | Carribean | 16 15 N, 61 35 W |
| 31376 | 31391 | | | 16 | Martinique | Carribean | 14 40 N, 61 00 W |
| 31392 | 31407 | | | 16 | Netherlands Antilles | MiddleEst | 26 00 N, 50 33 E |
| 31408 | 31423 | | | 16 | Bahrain | MiddleEst | 26 00 N, 50 33 E |
| 31424 | 31439 | | | 16 | Qatar | MiddleEst | 25 30 N, 51 15 E |
| 31440 | 31455 | | | 16 | Gibraltar | Europe | 36 8 N, 5 21 W |
| 31456 | 31471 | | | 16 | Albania | Europe | 41 00 N, 20 00 E |
| 31472 | 31487 | | | 16 | Unassigned | | |
| 31488 | 31615 | 0x7B00 | | 128 | Venezuela | S.America | 8 00 N, 66 00 W |
| 31616 | 31743 | | | 128 | Colombia | S.America | 4 00 N, 72 00 W |
| 31744 | 31754 | 0x7C00 | | 11 | Chile | S.America | 30 00 S, 71 00 W |
| 31755 | 31808 | | | 54 | Unassigned | | |
| 31809 | 31820 | | | 12 | Chile | S.America | 30 00 S, 71 00 W |
| 31821 | 31840 | | | 20 | Unassigned | | |
| 31841 | 31854 | | | 14 | Chile | S.America | 30 00 S, 71 00 W |
| 31855 | 31871 | | | 17 | Unassigned | | |

FIGURE 31F-1

| | | | | | |
|---|---|---|---|---|---|
| 50.83 | 4 | | 887 | 70 | 222 |
| 62.5 | 5.75 | | 916 | 100 | 222 |
| 39 | 22 | | 681 | 384 | 1112 |
| 39.5 | -8 | | 689 | -140 | 306 |
| 49.75 | 6.17 | | 868 | 108 | 56 |
| 65 | 18 | 6 | 1134 | 314 | 556 |
| 23 | -102 | | 401 | -1780 | 1779 |
| 23 | -102 | | 401 | -1780 | 1779 |
| 35 | 105 | 3 | 611 | 1833 | 3391 |
| -23 | -58 | | -401 | -1012 | 6561 |
| 4 | -56 | | 70 | -977 | 222 |
| -33 | -56 | | -576 | -977 | 278 |
| 35 | 33 | | 611 | 576 | 167 |
| -17 | -65 | | -297 | -1134 | 778 |
| 5 | -59 | | 87 | -1030 | 417 |
| -2 | -77.5 | | -35 | -1353 | 334 |
| 4 | -53 | | 70 | -925 | 389 |
| 16.25 | -61.58 | | 284 | -1075 | 70 |
| 14.67 | -61 | | 256 | -1065 | 30 |
| 26 | 50.55 | | 454 | 882 | 60 |
| 26 | 50.55 | | 454 | 882 | 56 |
| 25.5 | 51.25 | | 445 | 894 | 89 |
| 30.13 | -5.35 | | 631 | -93 | 2 |
| 41 | 20 | 13 | 716 | 349 | 195 |
| 8 | -66 | | 140 | -1152 | 723 |
| 4 | -72 | | 70 | -1257 | 667 |
| -30 | -71 | | -524 | -1239 | 2057 |
| -30 | -71 | | -524 | -1239 | 2057 |
| -30 | -71 | | -524 | -1239 | 2057 |

FIGURE 31F-2

| | | | | | | | |
|---|---|---|---|---|---|---|---|
| 31872 | 32127 | 0x7C80 | | 256 | Brazil | ESAmerica | 10 00 S, 55 00 W |
| 32128 | 32255 | | | 128 | Argentina | SSAmerica | 34 00 S, 64 00 W |
| 32256 | 32383 | | | 128 | Cuba | Carribean | 21 30 N, 80 00 W |
| 32384 | 32511 | | 0x7EFF | 128 | Peru | WSAmerica | 10 00 S, 76 00 W |
| 32512 | 32543 | 0x7F00 | | 32 | Nicaragua | CenAmerca | 13 00 N, 85 00 W |
| 32544 | 32575 | | | 32 | Costa Rica | CenAmerca | 10 00 N, 84 00 W |
| 32576 | 32607 | | | 32 | Panama | CenAmerca | 9 00 N, 80 00 W |
| 32608 | 32639 | | | 32 | Haiti | Carribean | 19 00 N, 72 25 W |
| 32640 | 32649 | | | 10 | Belze | CenAmerca | 17 15 N, 88 45 W |
| 32650 | 32671 | | | 22 | Unassigned | | |
| 32672 | 32703 | | | 32 | Guatemala | CenAmerca | 15 30 N, 90 15 W |
| 32704 | 32735 | | | 32 | El Salvador | CenAmerca | 13 50 N, 88 55 W |
| 32736 | 32767 | | 0x7FFF | 32 | Honduras | CenAmerca | 15 00 N, 86 30 W |

FIGURE 31G-1

| | | | | | |
|---|---|---|---|---|---|
| -10 | -55 | | -175 | -960 | 2224 |
| 34 | 64 | | 593 | 1117 | 1835 |
| 21.5 | -80 | | 375 | -1396 | 612 |
| -10 | -76 | | -175 | -1326 | 945 |
| 13 | -85 | | 227 | -1484 | 278 |
| 10 | -84 | | 175 | -1466 | 195 |
| 9 | -80 | | 157 | -1396 | 139 |
| 19 | -72.42 | | 332 | -1264 | 222 |
| 17.25 | -88.75 | | 301 | -1549 | 139 |
| 15.5 | -90.25 | | 271 | -1575 | 222 |
| 13.83 | -88.92 | | 241 | -1552 | 128 |
| 15 | 86.5 | 14 | 262 | 1510 | 500 |

FIGURE 31G-2

```
void  seedpos_selflearn_update_seed (SIDserving, gpsFix, gpsFixTime)
{
        If SIDserving is not found in SID Self Learning Database then
                Get a new slot in the database.
                Assume the default RadiusSL is at 400km (this number is
                configurable by seedpos_default_sid_uncertainty).
        Endif

        If SIDserving is found in the SID Country Table Database then
                RadiusCountry =
                SID_Country_Table_Database_GetRadius(SIDserving)

                CentroidCountry =
                SID_Country_Table_Database_GetCentroid(SIDserving)

                DeltaRadius    = (gpsFix, CentroidCountry)
        Else
                // Found a new SID assignment that is not assigned to any country.
                RadiusCountry = RadiusSL
                DeltaRadius    = 0;

        Endif

        If (DeltaRadius > RadiusCountry) then
                Set "mask" for "SID in conflict" in Self Learning Database for
                SIDserving
        Else
                Clear "mask" for "SID no conflict" in Self Learning Database for
                SIDserving
        Endif

        Store the gpsFix and gpsFixTime in the Self Learning Database for
        SIDserving
}
```

FIGURE 32A

```
If (TimeDelta < 2 hrs)
    seedpos_MsSpeedMax = seedpos_MsSpeedMax_car
Else
    seedpos_MsSpeedMax = seedpos_MsSpeedMax_air;

SeedUncertainty = (current time - time tagged to GPS fix) * seedpos_MsSpeedMax +
                  GPS Fix Position Uncertainty
SeedPosition = Latest GPS Fix
```

FIGURE 33

```
SeedPosition = Base Station Lat/Lon

TimeDelta = current time - time tagged to SIDlatlon
If (TimeDelta < 2 hrs)
   seedpos_MsSpeedMax = seedpos_MsSpeedMax_Car
Else
   seedpos_MsSpeedMax = seedpos_MsSpeedMax_Air;
UncertaintySIDlatlon = TimeDelta * seedpos_MsSpeedMax + DMAR associated with base
                                        station lat/lon
SeedUncertainty = min(Whole Earth Uncertainty, UncertaintySIDlatlon)
```

FIGURE 34

```
If (TimeDelta < 2 hrs)
   seedpos_MsSpeedMax = seedpos_MsSpeedMax_Car
Else
   seedpos_MsSpeedMax = seedpos_MsSpeedMax_Air

If MS is in OOS
          Note: SIDlatest is used to find a match in the SID Self Learning Database
          If SIDlatest is not found in the SID Self Learning Database then
            Skip this option for seed generation
          End

          SeedPosition = Lat/Lon from Self Learning Database
          TimeDelta = current time - time tagged to SIDselflearn
          SeedUncertainty = Min(Whole Earth Uncertainty,
                              seedpos_MsSpeedMax * TimeDelta + seedpos_default_sid_uncertainty)

Else if MS is in service
          Note: SIDserving is used to find a match in the SID Self Learning Database
          If SIDserving is not found in the SID Self Learning Database then
            Skip this option for seed generation
          End

          SeedPosition = Lat/Lon from Self Learning Database
          SeedUncertainty = seedpos_default_sid_uncertainty
End
```

FIGURE 35

```
If (TimeDelta < 2 hrs)
   seedpos_MsSpeedMax = seedpos_MsSpeedMax_Car
Else
   seedpos_MsSpeedMax = seedpos_MsSpeedMax_Air

If MS is in OOS
         If  SIDlatest is not defined then return with no table lookup.

         TimeDelta = current time - time tagged to SIDlatest

         If SIDlatest is in SID Self Learning Database and is in conflict then
            SeedUncertainty =  Whole Earth
            SeedPosition  = lat at 0, long at 0
         Else
           If SIDlatest is not in the country table then
              SeedUncertainty = Whole Earth
              SeedPosition = lat at 0, long at 0
           Endif

           RadiusCountry = SID_Country_Table_Database_GetRadius( SIDlatest )
          SeedUncertainty = min(TimeDelta * seedpos_MsSpeedMax + RadiusCountry,
                                  Whole Earth Uncertainty)

           SeedPosition  = SID_Country_Table_Database_GetCentroid(SIDlatest)
         End
```

FIGURE 36A

```
Else if MS is in-service
        TimeDelta = curren time - time tagged to SIDserving

        //
        // If SIDlatest is in a different country than the SIDserving then we might have
        // the case for MS crosses SID boundaries between countries during a long
        // traffic call.  Age the SIDlatest country radius to current time using the
        // maximum MS speed.  Compare this radius with SIDserving country radius and
        // pick the smaller one.
        //
        // Note:  if the SID is found to reside in unassigned country SID ranges then
        // the default country uncertainty of 400km (configurable via
        // seedpos_default_country_uncertainty) will be used.
        //

        CountryServing = SID_Country_Table_DataBase_GetCountry( SIDserving )
        Countrylatest   = SID_Country_Table_DataBase_GetCountry( SIDlatest )

        If  CountryServing != Countrylatest

          RadiusCountryServing = SID_Country_Table_Database_GetRadius( SIDserving )
          RadiusCountryLatest  = SID_Country_Table_Database_GetRadius( SIDlatest )

          SeedUncertainty = min(  min(TimeDelta * seedpos_MsSpeedMax + RadiusCountryLatest,
                                      Whole Earth Uncertainty) ,  RadiusCountryServing)

          If  SIDlatest country is picked for SeedUncertainty then
            SeedPosition = SID_Country_Table_Database_GetCentroid(SIDlatest)
          Else
            SeedPosition = SID_Country_Table_Database_GetCentroid(SIdserving)
```

FIGURE 36B-1

```
   End

  Else /* Here if  CountryServing == Countrylatest */

      If SIDserving is in SID Self Learning Database and is in conflict then
         SeedUncertainty =  Whole Earth Uncertainty

         SeedPosition  = lat at 0, long at 0
      Else
         RadiusCountry = SID_Country_Table_Database_GetRadius( SIDserving )
         SeedUncertainty = min(TimeDelta * seedpos_MsSpeedMax + RadiusCountry,
                          Whole Earth Uncertainty)

         SeedPosition  = SID_Country_Table_Database_GetCentroid(SIDserving)
      End
  End /* Countryserving vs Countrylatest */
End /* in service or OOS */
```

FIGURE 36B-2

METHODS AND SYSTEMS FOR DERIVING SEED POSITION OF A SUBSCRIBER STATION IN SUPPORT OF UNASSISTED GPS-TYPE POSITION DETERMINATION IN A WIRELESS COMMUNICATION SYSTEM

RELATED APPLICATIONS

This application claims priority to U.S. Provisional Application No. 60/664,444, filed on Mar. 22, 2005.

FIELD

This invention relates to unassisted GPS-type position determination, in general, and, to improvements in such systems that reduce an initial time-to-fix, in particular.

BACKGROUND

In an unassisted GPS-type position determination system, subscriber stations determine their own positions from satellite transmissions originating from the GPS-type position determination system, without requesting significant acquisition or calculation assistance from other network entities, for example, dedicated servers. That places significant processing demands on the subscriber stations because of the uncertainty in the timing, position, and frequency of these transmissions, requiring the subscriber stations to expend significant processing resources in searching for and locating these transmissions by, for example, testing large numbers of hypotheses varying the assumed timing, position and frequency of the transmissions. Since the number of hypotheses that must be tested is often staggering, the time required to search for the transmissions can be inordinately long and consume an excessive amount of processing resources, even for subscriber stations with dedicated receiver chains.

The uncertainty experienced by the subscriber stations stems from several sources. Assuming GPS positioning, there is first the uncertainty in knowing which of the 32 GPS satellites are visible to the subscriber station. That uncertainty is present because a subscriber station, upon power up or before a position fix is available, has no basis for identifying which signals of these 32 satellites can be usefully received. The useful reception of satellite signals is referred to as an ability of the subscriber station to "see" the satellite emitting the signal, or, in other contexts, as the satellite being "visible" to the subscriber station.

This leads to inefficient searching because the subscriber station may waste considerable resources in searching for transmissions from satellites that are not visible to it, and which are therefore not useful for position determination purposes. For example, referring to FIG. 1, while satellites 54*a*, 54*b*, and 54*c* are visible to subscriber station 50 located at position 51 on the earth's surface 52, satellites 56*a*, 56*b*, and 56*c* are invisible to subscriber station 50, as they are located on the other side of the earth. Therefore, it would be wasteful for subscriber station 50 to search for the transmissions from satellites 56*a*, 56*b*, and 56*c* during a position fix attempt.

In addition, there is an uncertainty in knowing the timing or phase of the 32 chip PN "gold" codes that are embedded within the individual satellite transmissions. As these codes are circularly shifted versions of one another, the phase of a code uniquely identifies which of the satellites originated the transmission. The phase also reflects the propagation delay caused from transmission from the satellite to the subscriber station. To account for the possible variations in phase, the subscriber station must expend resources in searching over the full range of possible PN codes within a code phase searching window that is large enough to encompass the possible variations.

Moreover, there is an uncertainty in knowing the relative movement between the subscriber station and the GPS satellites, which typically introduces a Doppler shift of approximately ±4 kHz in the frequency of transmission. To account for the possible variation of frequency introduced by the Doppler shift, the subscriber station must expend resources is searching over the full range of possible transmission frequencies within a frequency searching window that is large enough to encompass the possible variations caused by the Doppler shift.

Finally, there is the uncertainty in knowing the degree to which the local oscillator (LO) of the subscriber station is out of tune with the GPS carrier frequency. Upon power-up, for example, it is not uncommon for the LO frequency to differ from the GPS carrier frequency by as much as ±5 ppm. Until synchronization between the LO frequency and GPS carrier frequency is achieved, the subscriber station must account for this uncertainty by increasing the size of the frequency search window that is employed.

Even if the host wireless communications system or GPS-type position determination system eliminating some of this uncertainty by providing timing, positional information, or synchronization to the subscriber station, the processing demands on the subscriber station are often still substantial. For example, a synchronous system, such as a CDMA system, provides the subscriber station with time, and also synchronizes the LO frequency of the subscriber station to the GPS carrier frequency. Although the synchronization substantially reduces the LO frequency uncertainty, for example, from ±5 ppm to ±0.2 ppm, and the timing information allows the subscriber station to determine the position of the GPS satellites (using the GPS almanac or ephemeris data provided by the satellites), the subscriber station is still unable to determine which of the GPS satellites are visible to it, and it is still subject to the frequency uncertainty caused by Doppler shift.

SUMMARY

Disclosed is a method of deriving a seed position of a subscriber station that may be used in support of unassisted GPS-type position determination. In this method, the subscriber station receives an overhead message from a wireless communications system, and derives its seed position from values of a parameter in the overhead message.

For example, the seed position of the subscriber station may be set to base station positioning information identifying a base station or sector in communication with the subscriber station. In another example, the subscriber station may map an identifier of the host wireless communications system (such as the System Identifier (SID) of that system) into the seed position of the subscriber station using a data structure, such as a lookup table.

This method often results in greater efficiencies as the subscriber station may use the seed position to identify those satellites that are visible to it, thus reducing searching time. Or it may use the seed position to estimate the code phase shift caused by propagation delay or the Doppler shift caused by relative movement with a satellite, thus allowing for a reduction in the size of the code phase or frequency search windows.

A method is also provided for updating a data structure, either by adding new entries or updating existing entries, as new information becomes available, consistent with a "self-learning" mode of operation. For example, assuming GPS positioning, if a GPS fix indicates that a seed position derived from the data structure and used to initiate the fix is inaccurate, the data structure may be updated to correct the inaccuracy. As another example, if the GPS fix indicates the presence of a SID conflict, the data structure may be updated to reflect this. As another example, if IFAST (International Forum on ANSI-41 Standards Technology, the organization responsible for allocating SIDs) changes its SID allocations, the data structure might be updated to reflect that.

A system is also provided for deriving a seed position of a subscriber station from parameter values of an overhead message. A memory stores the data structure, associating possible parameter values with corresponding positional information. One or more processor in the system is configured to access the data structure stored in the memory to map the values of the parameter value to a corresponding position that serves as the seed position.

BRIEF DESCRIPTION OF THE DRAWINGS

The components in the figures are not to scale, emphasis instead being placed upon illustrating the principles of the invention. In the figures, like reference numerals designate like or corresponding parts.

FIGS. 3A-3B illustrate the format of a CDMA 2000 System Parameters Message.

FIGS. 4A-4E illustrate the format of a CDMA 2000 Extended System Parameters Message.

FIGS. 5A-5B illustrate the format of a CDMA 2000 ANSI-41 System Parameters Message.

FIGS. 6A-6B illustrate the format of a CDMA 2000 In-Traffic System Parameters Message.

FIGS. 7A-7B illustrate the format of a 1xEVDO Sector Parameters Message.

FIGS. 8A-8G illustrate the IFAST SID allocation (sorted by SID) (as of Dec. 6, 2004).

FIGS. 9A-1, 9A-2 and 9B illustrate the SID conflicts identified by IFAST (as of Dec. 6, 2004).

FIG. 11 illustrates the format of a GSM/UMTS Location Area information element.

FIG. 12 illustrates the format of a GSM/UMTS Routing Area information element.

FIG. 13 illustrates the format of a GSM/UMTS PLMN information element.

FIG. 14 illustrates the format of a GSM/UMTS Cell Identity information element.

FIGS. 23A-23B present a table illustrating examples of overhead messages in various wireless communications systems, for example, CDMA 2000, 1xEVDO, GSM, UMTS, containing information that may be useful in deriving the seed position of a subscriber station.

FIG. 27 illustrates an example format of the Latest GPS Fix data structure.

FIG. 28 illustrates an example format of the SID Latest data structure and the Latest Base Station Information data structure.

FIG. 29 illustrates an example format of an entry in the SID Self Learning Database.

FIG. 30 illustrates an example format of an entry in the SID Country Table Database.

FIGS. 31A-31G (shown as 31A-1 (right), 31A-2 (left), 31B-1 (right), 31B-2 (left), etc.) illustrate an augmented IFAST SID allocation table that may serve as the progenitor of the SID Country Table Database.

FIG. 32A illustrates an example of pseudo code for allocating, populating, and/or updating entries in the SID Self Learning Database.

FIG. 33 illustrates an example of pseudo code for aging the position uncertainty of the latest GPS fix forward to the current time.

FIG. 34 illustrates an example of pseudo code for aging the position uncertainty of the latest base station lat/lon position forward to the current time.

FIG. 35 illustrates an example of pseudo code for aging or otherwise deriving the position uncertainty for a GPS lat/lon position from a matching entry in the SID Self Learning Database.

FIGS. 36A-1, 36A-2 and 36B illustrates an example of pseudo code for aging the position uncertainty for a centroid position obtained from a matching entry in the SID Country Table Database.

DETAILED DESCRIPTION

Figure 1:
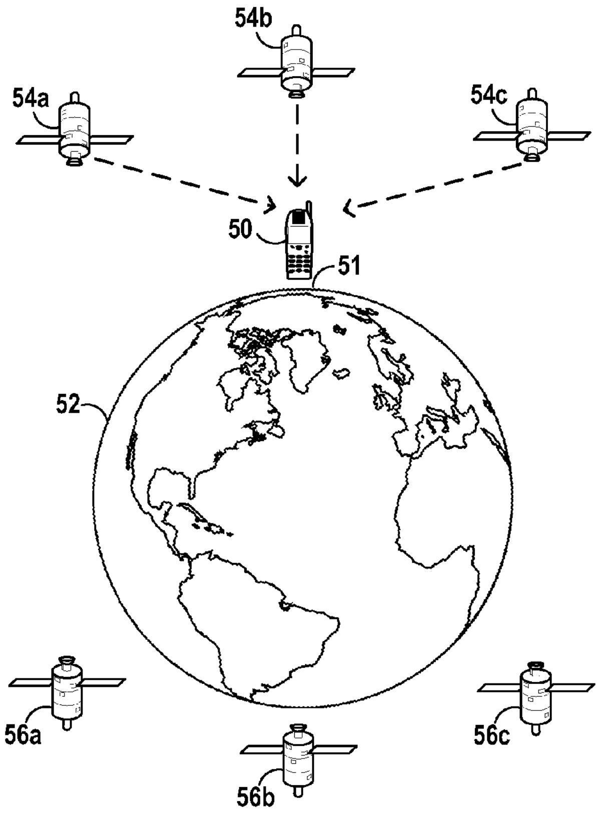
FIG. 1 is a diagram illustrating both GPS satellites that are visible and invisible to a particular subscriber station.

As utilized herein, terms such as "approximately" and "substantially" are intended to allow some leeway in mathematical exactness to account for tolerances that are acceptable in the trade.

The term "fix" refers to an estimate of the position of a subscriber station derived using a GPS-type position determination system that is more precise than the seed position.

The phrase "GPS-type position determination system" means a system for determining a position of a subscriber station in a wireless communications system from satellite transmissions, including standalone systems and systems overlaid onto or integrated into a wireless communications system, and including systems where transmissions from the individual satellites are distinguished from one another through pseudorandom noise (PN) codes, different carrier frequencies and the like. Examples include the United States Global Positioning Satellite (GPS) system, where 1032 chip PN codes distinguish the individual satellite transmissions, the Russian GLONASS system, where individual satellites have different carrier frequencies, and the European GALILEO system. Additional examples include mobile based, unassisted, network based enhanced observed time difference of arrival (EOTA), and uplink time of arrival (TOA) position determination systems.

The phrase "GPS-type fix" means a position determination using a GPS-type position determination system.

The term "logic" refers to implementations of functionality in hardware, software, or combination thereof.

The term "memory" refers to any physical medium capable of storing information in electronic form, including but not limited to RAM, ROM, EPROM, PROM, EEPROM, disk, floppy disk, hard disk, CD-ROM, DVD, non-volatile memory, or the like, or a combination thereof.

The term "overhead message" refers to a message communicated between a wireless communications system and a subscriber station over any type of channel, including common and dedicated traffic channels, whose content is substantially other than subscriber station-to-subscriber station traffic. It will be understood that the singular term "overhead message," "an overhead message," or "the overhead message" is used herein to include one or more message, unless expressly indicated to the contrary.

A "parameter" is a value contained in an overhead message. It will be understood that the singular term "parameter," "a parameter," or "the parameter" is used herein to include one or more values, unless expressly indicated to the contrary.

The term "processor" refers to any logic, logic device, circuit, application specific integrated circuit (ASIC), chip, or any combination thereof, capable of executing a series of commands, instructions or state transitions, and includes, without limitation, a general- or special-purpose microprocessor, finite state machine, controller, computer, digital signal processor (DSP), or the like. It will be understood that the singular term "processor," is used herein to include one or more processors, unless expressly indicated to the contrary.

The term "processor readable medium" refers to any memory capable of being accessed by a processor.

The term "satellite" includes space vehicles (SVs).

The term "seed position" refers to an approximate estimate of the position of a subscriber station in a wireless communication system that facilitates searching for one or more satellite transmissions originating from a GPS-type position determination system in an effort to more precisely fix the position of the subscriber station.

The term "software" includes source code, assembly language code, binary code, firmware, macro-instructions, micro-instructions, or the like, or any combination thereof.

The term "subscriber station" includes mobile stations (MS) and user equipment (UE).

The term "user equipment", or "UE", is used herein to designate cellular, cordless, Personal Communication System (PCS), or other types of wireless telephone devices, pagers, wireless personal digital assistants, notebook computers with wireless access, or any other wireless mobile device, two-way radios, walkie-talkies, or other type of communications transceiver, or mobile stations (MS), regardless of whether they have valid SIM or USIM identifiers.

The term "wireless communications system" includes wireless communication systems employing any multiple access mode or protocol, including synchronous and asynchronous systems. Examples include, but are not limited to, systems conforming to the IS-95 (CDMA), CDMA 2000 (1x), 1xEVDO, GSM, UMTS (WCDMA), or the like, standards or protocols.

Figure 2A:
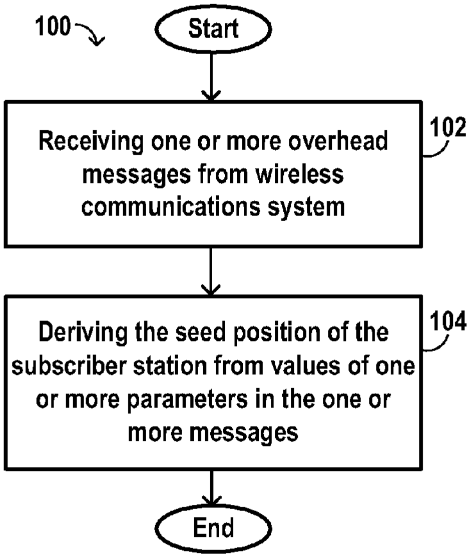
FIG. 2A is a flowchart illustrating an embodiment of a method of deriving a seed position of a subscriber station from parameter values from an overhead message received from a wireless communications system.

With reference first to FIG. 2A, a flowchart of an embodiment 100 of a method of deriving a seed position of a subscriber station in a wireless communications system is shown. In this embodiment, the method is performed within the subscriber station in support of unassisted GPS-type position determination, and comprises two boxes, identified respectively with numerals 102 and 104. Box 102 comprises receiving an overhead message from a wireless communication system, and box 104 comprises deriving the seed position of the subscriber station from or responsive to values of a parameter in the overhead message.

Figure 2B:
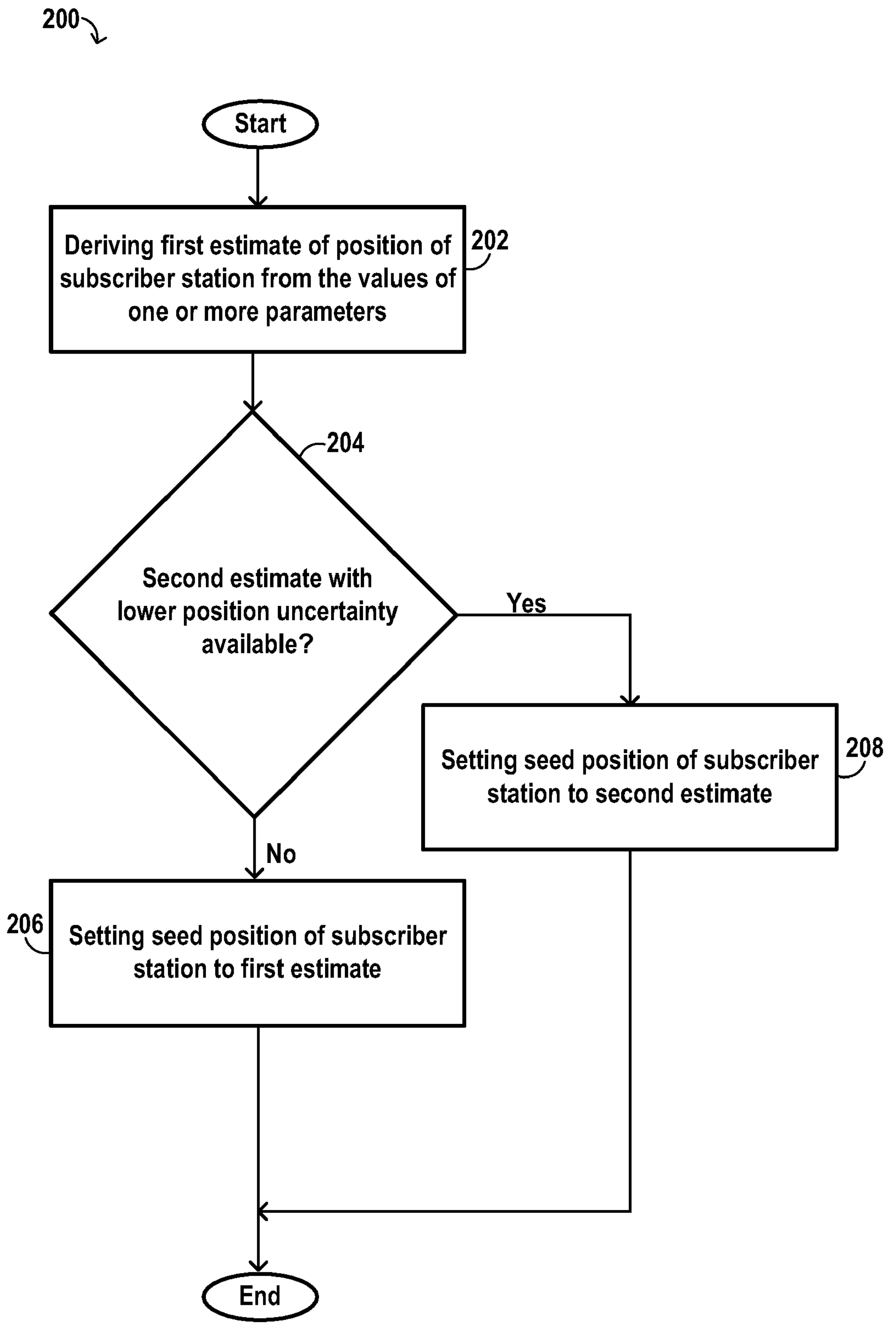
FIG. 2B is a flowchart illustrating a particular implementation for deriving a seed position for a subscriber station that may be used in the method of FIG. 2A.

FIG. 2B is a flowchart 200 of an implementation for deriving a seed position of the subscriber station from values of a parameter in the overhead message, box 104 of FIG. 2A. Box 202 comprises deriving a first estimate of the position of the subscriber station from the values of the parameter in the overhead message. Query 204 comprises querying whether a second estimate of the subscriber station's position with lower position uncertainty is available. If not, box 206 is performed. If so, box 208 is performed. In box 206, the seed position of the subscriber station is set to the first estimate of the position of the subscriber station. In box 208, the seed position of the subscriber station is set to the second estimate of the position of the subscriber station.

This implementation contemplates that a second estimate of the position of the subscriber station, such as a previous GPS-type fix of the subscriber station's position or a default position, for example, the subscriber's country of registration, is available for comparison with a first estimate derived from the values of the parameter from the overhead message, and that both estimates have corresponding position uncertainties. The seed position of the subscriber station in this implementation is set to whichever estimate has the lower position uncertainty.

The first estimate in this implementation may be derived from at least one of the values of an overhead message parameter indicating the position of a base station or base station sector in communication with the subscriber station. For example, the first estimate may be set to the position indicated by the BASE_LAT and BASE_LONG values from a System Parameters Message, an overhead message that is routinely communicated to the subscriber station by a CDMA 2000 wireless communications system and is defined by the applicable IS-2000 standard. The format of this message is illustrated in FIGS. 3A-3B, taken from Section 3.7.2.3.2.1, pages 3-107 to 3-115, of TIA-2000.5-D, March 2004. The BASE_LAT and BASE_LONG values from this message are, respectively, the latitude and longitude of a base station in a CDMA 2000 system serving the subscriber station.

More specifically, BASE_LAT is a 2's complement signed number indicating the latitude of the base station expressed in units of 0.25 second, with positive numbers indicating North latitudes and negative numbers indicating South latitudes. It ranges between −1296000 and +1296000, corresponding to the range −90° to +90°. Similarly, BASE_LONG is a 2's complement signed number indicating the longitude of the base station expressed in units of 0.25 second, with positive numbers indicating East longitudes and negative numbers indicating West longitudes. It also ranges between −1296000 and +1296000, corresponding to the range −90° to +90°. In practice, carriers that do not use these parameters set these values to 0, so a good rule of thumb to follow is that the values of these parameters are valid if non-zero.

As another example, the first estimate may be set to Latitude and Longitude values from a Sector Parameters message, an overhead message that is routinely communicated to the subscriber station by a 1xEVDO wireless communications system and this is defined by the applicable IS-856 standard. The format of this message is illustrated in FIGS. 7A-7B, taken from Section 9.9.6.2.2, pages 9-134 to 9-141, of TIA-856-A, April 2004.

The Latitude and Longitude values from this message are, respectively, the latitude and longitude of a base station sector in a 1xEVDO system serving the subscriber station. More specifically, Latitude is a 2's complement signed number indicating the latitude of the base station sector expressed in units of 0.25 second, with positive numbers indicating North latitudes and negative numbers indicating South latitudes. It ranges between −1296000 and +1296000, corresponding to the range −90° to +90°. Similarly, Longitude is a 2's complement signed number indicating the longitude of the base station expressed in units of 0.25 second, with positive numbers indicating East longitudes and negative numbers indicating West longitudes. It also ranges between −1296000 and +1296000, corresponding to the range −90° to +90°.

The position uncertainty corresponding to this first estimate may be set to the maximum antenna range (MAR) of that base station or sector since the subscriber station may be anywhere within this range. The MAR for a particular base station or sector may be set dynamically based on information specific to that base station or sector, such as a list of neighboring base stations or sectors visible to the base station or sector in question, or the size of the search window used to search for such neighboring base stations or sectors. That information may be also be derived from at least one overhead message sent to the subscriber station, such as a Neighbors List Message, described in Section 3.7.1.3.2.3, pages 3-125 to 3-127, of TIA-2000.5-D, March 2004. Alternatively, the MAR may be set to a static default value, such as an average MAR applicable to all the base stations or sectors in the system.

The first estimate may, for example, be derived from at least one value of a parameter of the overhead message identifying a wireless communications system in communication with the subscriber station, a network within that system, an area within or encompassing that system or network, the subscriber station's country, or any combination of two or more of the foregoing. If the parameter does not directly indicate a position that can serve as the first estimate, its values may be mapped to a corresponding position that can serve as the first estimate, using a data structure associating possible values of the parameter with corresponding positions. For example, the data structure may comprise a lookup table having a plurality of entries associating possible values of the parameter with corresponding positions. The lookup table may be stored within a memory at least partially located within the subscriber station.

In one implementation, the first estimate is derived from a SID value, NID value, BASE_ID value, MCC value, value of any combination of any two or more of the foregoing, or value of any combination of the foregoing with one or more additional parameters, from overhead messages communicated to the subscriber station by a CDMA 2000 wireless communications system. The SID is an identifier of a CDMA 2000 system serving the subscriber station, the Network Identifier (NID) is an identifier of a network serving the subscriber station within that system, and BASE_ID is an identifier of a base station in that system or network serving the subscriber station. The MCC is a code identifying the subscriber station's country. The SID, NID and BASE_HD parameters are each a field in the System Parameters Message (FIGS. 3A-3B), and the ANSI-41 System Parameters Message, illustrated in FIGS. 5A-5B, taken from Section 3.7.2.3.2.30, pages 3-335 to 3-344 of TIA-2000.5-D, March 2004. The MCC is field in the Extended System Parameters Message, illustrated in FIGS. 4A-4E, taken from Section 3.7.2.3.2.13, pages 3-149 to 3-178 of TIA-2000.5-D, March 2004, and the ANSI-41 System Parameters Message (FIGS. 5A-5B). Accordingly, the SID, NID and BASE_ID values may be derived from selected ones of the foregoing messages as received by the subscriber station, and the MCC value may also be derived from certain of these messages.

In addition, the SID and NID values may also be derived from an In-Traffic System Parameters Message received by the subscriber station over a traffic channel while in active mode. The In-Traffic System Parameters Message is an overhead message defined by the IS-2000 standard. It is illustrated in FIGS. 6A-6B, taken from Section 3.7.3.3.2.7, pages 3-463 to 3-472 of TIA-2000.5-D, March 2004. Unlike the other messages, which are received over a pilot channel while the subscriber station is in idle mode, this message is received by the subscriber station over a traffic channel while the subscriber station is in active mode. Therefore, if the subscriber station has been in active mode for a sustained period of time, for example, because of a long voice/data call while the subscriber station is traveling on a freeway, the SID and NID values from this message may be the most accurate.

In one example, the first estimate is derived from a SID value communicated to the subscriber station by a CDMA 2000 wireless communications system through one of the foregoing messages. The subscriber station obtains the SID value from the message and maps it to a corresponding position using data structures such as lookup tables. That is possible because, with only a few exceptions, IFAST (International Forum on ANSI-41 Standards Technology), the organization responsible for allocating SID values to individual countries, uniquely allocates ranges of SID values by country. FIGS. 8A-8G illustrate the current (as of Dec. 6, 2004) allocation of SID ranges to countries, sorted in order of SID value. Using this allocation, a SID value may be mapped into a country and then the country mapped into a country position, for example, the centroid location of that country, that may serve as the seed position of the subscriber station. The exceptions, referred to by IFAST as “conflicts,” occur when the same SID value is utilized by carriers in more than one country. FIGS. 9A-9B illustrate the current (as of Dec. 6, 2004) conflicts identified by IFAST. An approach for dealing with these conflicts will be discussed subsequently.

Because of the relatively large granularity of a country-based SID allocation, an approach in which SID values are mapped into corresponding positions can be performed with a lookup table having relatively few entries that may be readily stored within a subscriber station and rapidly accessed.

Figure 10A:
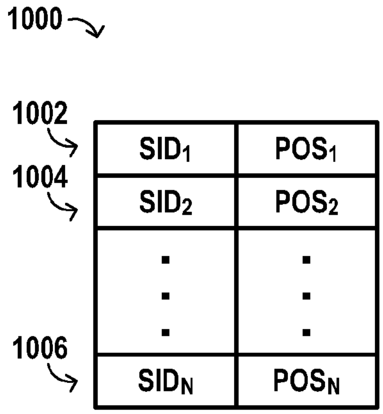
FIG. 10A illustrates an example of a lookup table associating SID values with corresponding positions.

FIG. 10A illustrates an embodiment 1000 of a lookup table that may be constructed from the IFAST SID allocations and stored in a memory of the subscriber station for use in mapping SID values into corresponding positions. The lookup table may, for example, comprises a plurality of entries 1002, 1004, 1006, associating possible SID values, $SID_1$, $SID_2$, $SID_N$, with corresponding positions, $POS_1$, $POS_2$, $POS_N$. In one example, the position corresponding to a particular SID value is the approximate centroid location of the country to which the SID value is allocated by IFAST. To perform the mapping, the subscriber station accesses the lookup table to locate the table entry that corresponds to the SID value in question, and returns the associated position as the seed position of the subscriber station.

Figure 10B:
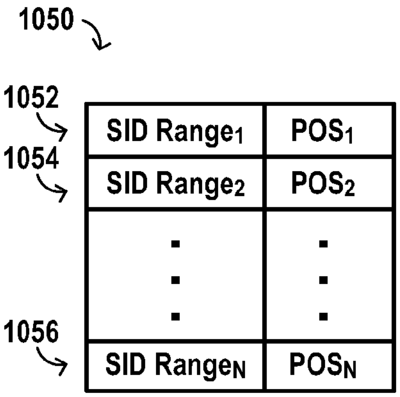
FIG. 10B illustrates an example of a lookup table associating SID ranges with corresponding positions.

FIG. 10B illustrates still another embodiment 1050 of a lookup table that may be constructed from the IFAST allocations and stored in memory of the subscriber station for use in mapping SID values into corresponding positions. Here, the lookup table may comprise a plurality of entries 1052, 1054, 1056, associating ranges of possible SID values, SID $RANGE_1$, SID $RANGE_2$, SID $RANGE_N$, with corresponding positions, $POS_1$, $POS_2$. $POS_N$. Since IFAST allocates ranges of SID values to a particular country, the lookup table in this embodiment likewise maps ranges of SID values into a corresponding position.

Figure 10C:
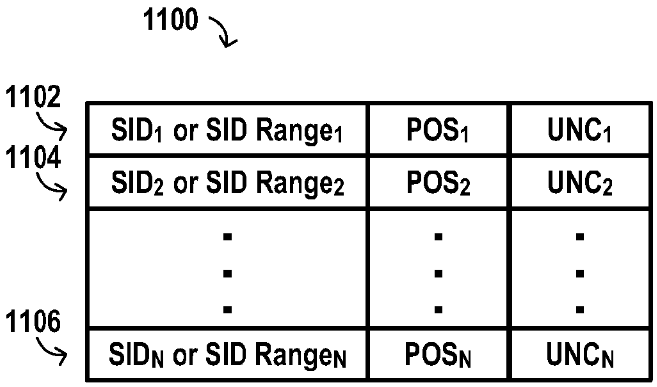
FIG. 10C illustrates an example of a lookup table associating SID values or ranges with corresponding positions and position uncertainties.

FIG. 10C illustrates yet another embodiment 1100 of the lookup table that may comprise a plurality of entries 1102, 1104 1106, associating ranges of possible SID values, SID $RANGE_1$, SID $RANGE_2$, SID $RANGE_N$, individual SID values $SID_1$, $SID_2$, $SID_N$, or combinations of SID ranges and individual SID values, with corresponding positions, $POS_1$, $POS_2$, $POS_N$, and corresponding position uncertainty values, $UNC_1$, $UNC_2$, $UNC_N$. As an example, where the corresponding positions are set to the centroid locations of the respective countries, the uncertainty values represent the radius of coverage from the centroid location or some other value indicating the range or area of coverage of the identified system. In some cases, the range or area of coverage can be measured by the geographical limits of the country involved. For example, the uncertainty value may simply be taken as the radius of a circle extending from the centroid location that narrowly circumscribes the full extent of the geographical area of the country involved. The area or range of coverage of the identified system serves as an accurate measure of the position uncertainty of the subscriber station because the subscriber station may be located anywhere within this area or range. This position uncertainty is a useful metric for selecting amongst multiple possible estimates of the subscriber station’s position.

To facilitate searching through the lookup table, its entries may be ordered by priority, with higher priority entries appearing first. For example, the entries could be statically ordered, when the subscriber station is first activated in order of those countries most likely to be visited. Alternatively, the entries could be dynamically ordered. For instance, whenever the subscriber station is powered up, the entries are placed in order of those countries actually visited by the subscriber station over a previous time frame, for example, 6 months.

Another way by which retrieval may be facilitated is to store the entries in a content addressable memory, where the SID range or value for an entry forms the tag portion of the entry, and the corresponding position and the position uncertainty form the content portion of the entry. A SID value can be mapped to a corresponding position and/or position uncertainty in a single access with such a memory.

The entries of the table may also be assigned hash values to facilitate searching through the table. For example, groupings of entries may be assigned the same hash value, and the entries in the table then ordered by hash value. A hash function maps values of the at least one overhead message parameter to a hash value, which identifies the portion of the table at which searching should commence.

Entries in the table representing individual countries may also be aggregated to form a single entry representing an entire region. For example, the individual entries representing the Caribbean countries may be aggregated to form a single entry representing the Caribbean region.

In another implementation, the first estimate may be derived from a Country Code value, Sector ID value, a value of a combination of the two, or a value of any combination of the foregoing with one or more additional parameters, from an overhead message, such as the Sector Parameters message (FIGS. 7A-7B), communicated to the subscriber station by a 1xEVDO wireless communications system. The Country Code is a code identifying the subscriber station’s country, and is identical to the MCC discussed previously. The Sector ID is an identifier of the base station sector serving the subscriber station. The values of either or a combination of these two parameters may be mapped into a corresponding position or position uncertainty through suitable lookup tables associating values of these parameters with corresponding positions and position uncertainties.

For example, if the finer degree of granularity that is possible through joint use with the Sector ID results in a lookup table that either cannot fit within the available storage within the subscriber station, or takes too much time to access, the mapping may be performed using the Country Code alone. Thus, a Country Code value from a Sector Parameters message communicated to the subscriber station by a 1xEVDO wireless communications system may be mapped into a corresponding position and position uncertainty using a lookup table of the type described previously. It should be noted that the term “position and position uncertainty” is used herein to designate either the position or the position uncertainty alternatively, or both the position and position uncertainty in combination, as any combination thereof is contemplated herein.

In a further implementation, the first estimate may be derived from an MCC value, MNC value, LAC value, RAC value, Cell Identity value, Time Zone value, value of any combination of two or more thereof, or value of any combination of the foregoing in combination with additional parameters, from overhead messages communicated to the subscriber station by a GSM or UMTS wireless communications system.

The values of the MCC, MNC, and LAC parameters may be obtained from the Location Area message (or "information element" in 3GPP parlance), illustrated in FIG. 11, and described in the applicable 3GPP GSM specification, Section 10.5.1.3, pages 288-290, 3GPP TS 24.008 v.3.19.0 (2004-06), R99, September 2004. This information element is an overhead message routinely broadcast by the system over the Broadcast Control Channel (BCCH) to aid the location update procedure performed while the subscriber station is in idle mode. The MCC (Mobile Country Code) is a code of the country of GSM or UMTS system serving the subscriber station. The MCN (Mobile Network Code) is a code of the GSM or UMTS network within that country serving the subscriber station. The LAC (Location Area Code) is a code of a specific area within the country or network of the GSM or UMTS system serving the subscriber station. The values of these parameters may be mapped into a corresponding position and position uncertainty using a suitable lookup table of the type described previously.

If a coarser granularity than that available from the Location Area information element is acceptable, then the value of the PLMN (Public Land Mobile Network) may be utilized, and mapped into a corresponding position and position uncertainty using a lookup table. The PLMN is the sole parameter of a PLMN Identity information element routinely broadcast over the BCCH to aid subscriber stations while in idle mode. It unambiguously identifies the carrier serving the subscriber station. The format is illustrated in FIG. 13, and is further described in the applicable 3GPP GSM specification, Section 10.3.1.11, page 398, 3GPP TS 25.331 v.3.20.0 (2004-09), R99, September 2004, RRC protocol specifications.

If a finer granularity than that available from the Location Area identification element is desired, assuming packet services are deployed by the carrier, then the parameters from the Routing Area information element may be utilized, and mapped into a corresponding position and position uncertainty using the lookup table. This information element as well is an overhead message routinely broadcast by the system over the BCCH to assist subscriber stations in idle mode. The format of this information element is illustrated in FIG. 12, and is described in the applicable 3GPP specification, Section 10.5.5.15, pages 380-381, 3GPP TS 24.008 v.3.19.0 (2004-06), R99, September 2004. In combination with values of the MCC, MNC, and LAC parameters described earlier, the RAC (Routing Area Code) provides an unambiguous identification of a routing area within a GPRS coverage area. Once again, the values of these parameters may be mapped into a corresponding position and position uncertainty using a suitable lookup table of the type described previously.

Figure 14:
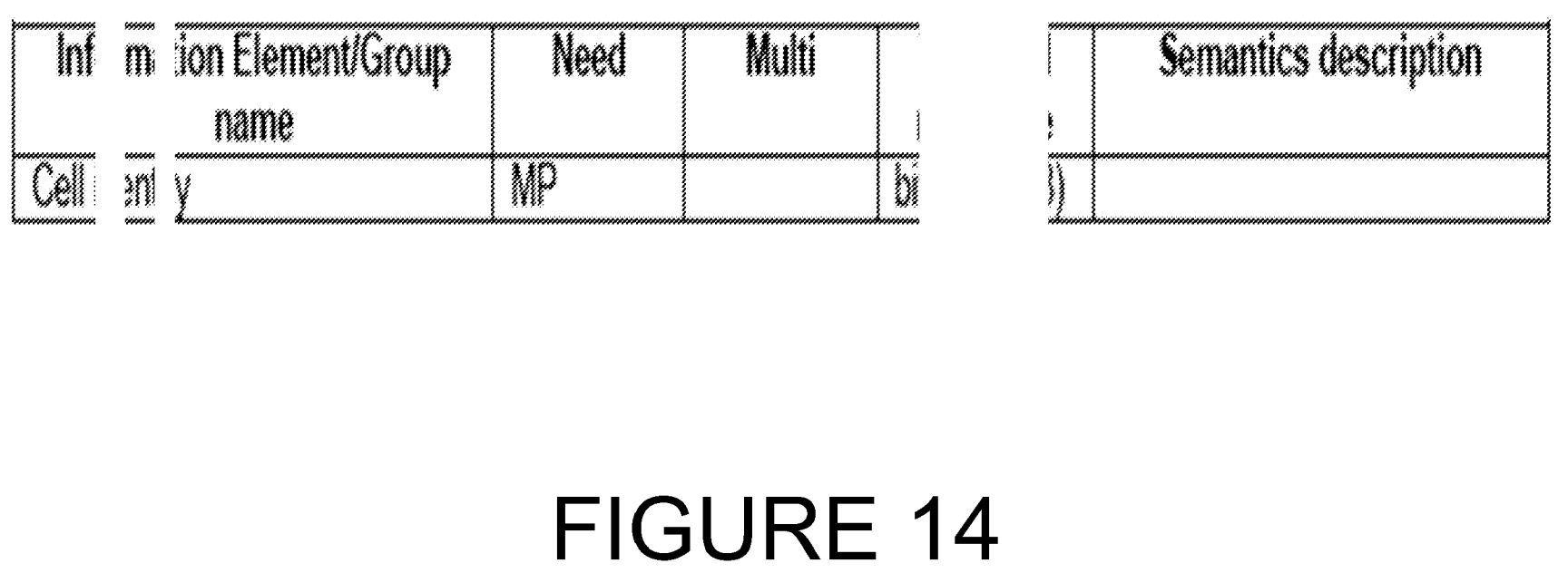

If even a finer granularity than that available from the Routing Area information element is desired, then the combination of the PLMN, available from the PLMN Identity information element described above, and Cell Identity, the sole parameter of a Cell Identity information element that is available in a UMTS system and that unambiguously identifies a cell within a PLMN, may be utilized. In this approach, the PLMN and Cell Identity combination is mapped into a corresponding position and/or position uncertainty using the lookup table. Again, the Cell Identity Information is routinely broadcast over the BCCH to aid subscriber stations while in idle mode. The format is illustrated in FIG. 14, and is further described in the applicable 3GPP GSM specification, Section 10.3.2.2, pages 400-01, 3GPP TS 25.331 v.3.20.0 (2004-09), R99, September 2004, RRC protocol specification.

Figure 15:
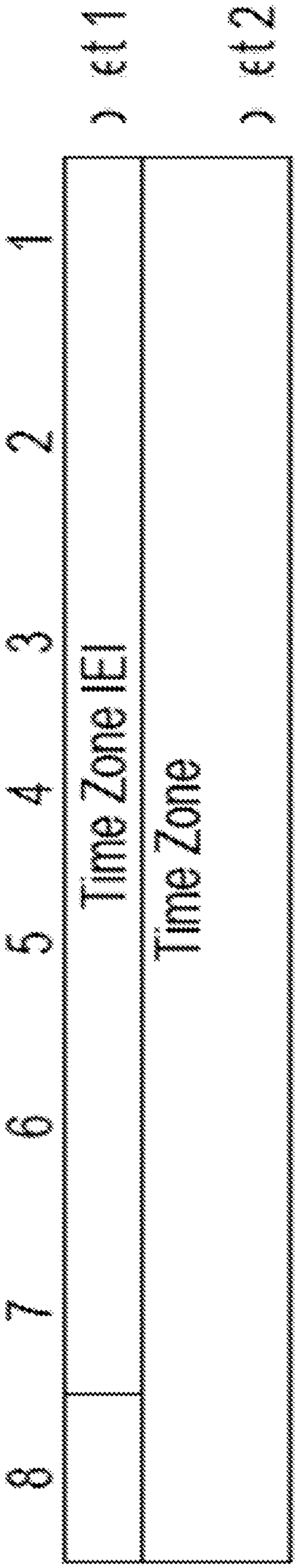
FIG. 15 illustrates the format of a GSM/UMTS Time Zone information element.

Another approach involves mapping the Time Zone parameter, an indicator of the time zone of the subscriber station's current location and the sole parameter of the Time Zone information element, into a corresponding position and position uncertainty using at least one lookup table. The Time Zone information element is not always available, but for those carriers that provide it, the message is routinely broadcast over the BCCH in aid of subscriber stations in idle mode. The format is illustrated in FIG. 15, and is further described in Section 10.5.3.8, page 317, 3GPP TS 24.008 v.3.19.0 (2004-06), R99, September 2004.

In selecting among these various approaches, it should be appreciated that a finer granularity will lead to a more accurate estimate of the position of the subscriber station, and, hence, a better seed position of the subscriber station, but at the expense of a larger data structure or lookup table required to map the parameter values into a corresponding position and position uncertainty. Thus, one possible rule of thumb to follow is to select the approach that yields the highest granularity possible given the available subscriber station memory.

For example, since a lookup table mapping possible MCC values to corresponding positions and position uncertainties can readily be accommodated by most subscriber stations, the first estimate may be derived from the MCC alone. In this example, the MCC value, obtained from a Location Area information element or other overhead message communicated to the subscriber station by a GSM or UMTS wireless communications system, is mapped into a corresponding position, such as the centroid location of the country involved, and corresponding position uncertainty, such as the average radius of coverage, for example, 400 km, of a GSM or UMTS wireless network or the radius of a circle centered at the centroid and narrowly circumscribing the geographical extent of the country involved.

Referring back to FIG. 2B, the second estimate may be retrieved from a memory within the subscriber station, and represent a previous GPS-type fix of the subscriber station's position, such as the most recent such fix, or a default estimate of the subscriber station's position, such as an estimate based on the country of the subscriber's nationality or registration.

As another example, the second estimate may be a previous fix of the subscriber station's position as determined from a GPS-type positioning system, with a position uncertainty that depends on the age of the fix. For instance, the fix may be time-stamped, so the age of the fix is derivable from the difference in time between current time and the time-stamp. Here, the position uncertainty of the second estimate may be determined or calculated using the age, such as by multiplying the age of the second estimate by an assumed velocity of the subscriber station. If the age of the fix is greater than two hours, for instance, it may be assumed that the subscriber traveled by air during the intervening time period; whereas, if the age of the previous fix is less than two hours, it may be presumed that the subscriber traveled by automobile. Alternatively, the position uncertainty may be set to an empirically derived default value that depends on the age of the fix.

In FIG. 2B, the at least one parameter from which the first estimate is derived may also be time-stamped, allowing the age of these parameters to be derived from the difference in time between current time and the time from the time-stamp.

Once the age of these parameters are determined, the position uncertainty of the first estimate may be determined or updated responsive to this age. Alternatively, the first estimate itself may be time-stamped, allowing the age of this estimate to be derived from the difference in time between current time and the time from the time-stamp. In this example, the position uncertainty of the first estimate is then determined or updated responsive to the age of the first estimate.

Figure 16:
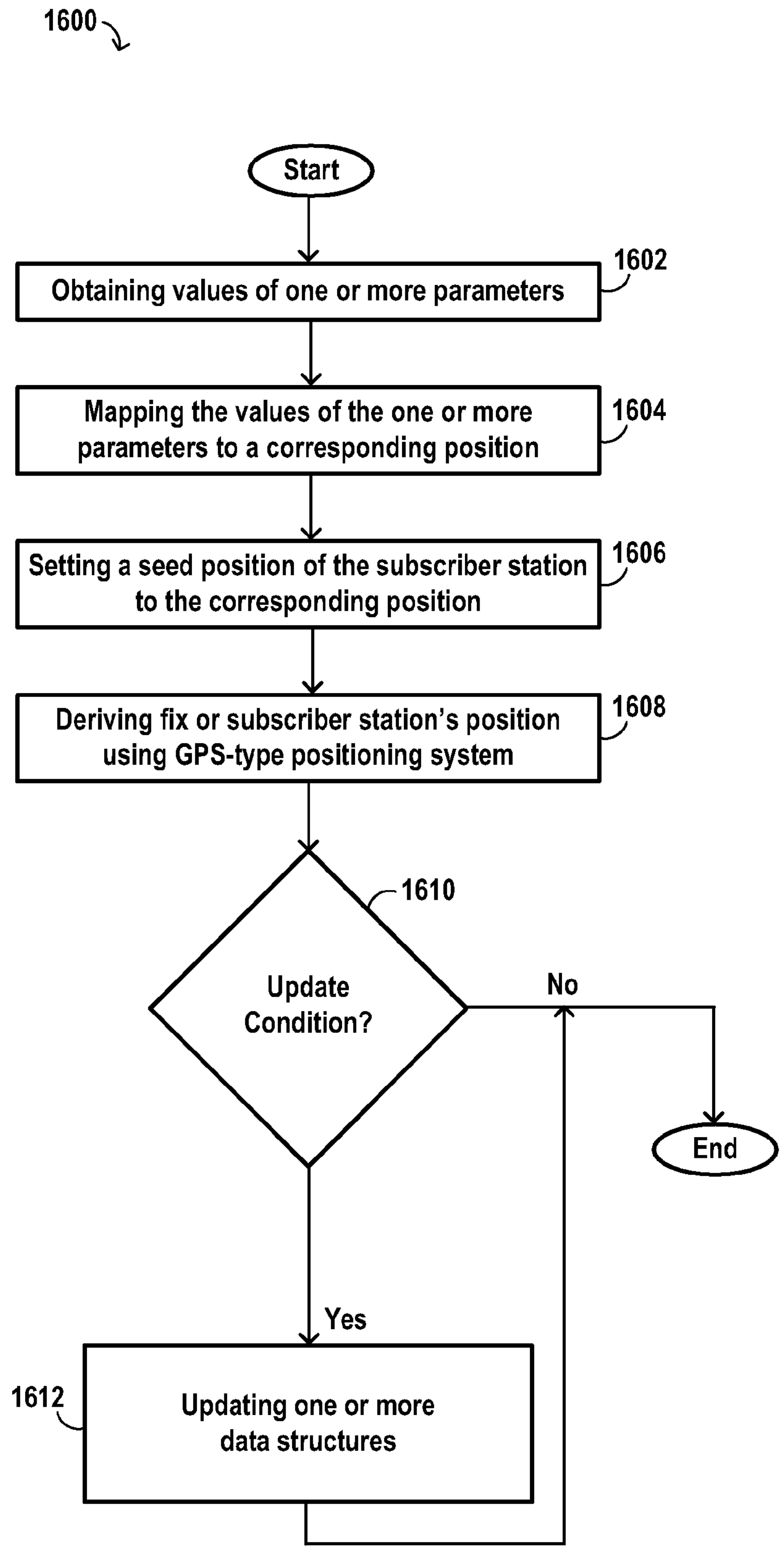
FIG. 16 is a flowchart of an embodiment of a method of mapping values of a parameter to a corresponding seed position of the subscriber station using data structure, and then updating the data structure responsive to the resulting GPS-type position fix.

FIG. 16 is a flowchart of an embodiment 1600 of a method of updating data structure associating possible values of at least one overhead message parameter received by a subscriber station with corresponding positions. The method performed by the subscriber station is shown in boxes 1602, 1604, 1606, 1608, 1610 and 1612. Box 1602 comprises obtaining values of the parameter from the overhead message received by the subscriber station from a wireless communications system. Box 1604 comprises mapping the values to a corresponding position by accessing the data structure. Box 1606 comprises setting a seed position of the subscriber station to the corresponding position. Box 1608 comprises deriving a fix of the position of the subscriber station from satellite transmissions originating from a GPS-type position determination system, including searching for such transmissions responsive to the seed position. If an update condition is present, query 1610, the data structure is updated as represented by box 1612.

Here, a "self-learning" feature, the data structure, which may be any of the at least one lookup table previously described, may be updated as new information becomes available. For example, the lookup table may be updated over time, based on the position fix ultimately obtained from the GPS-type position determination system.

In another implementation, the data structure maps the values of the parameter to corresponding positions and position uncertainty values, where the position uncertainty values are coverage values indicating an area of coverage of a wireless system or network or entity. An update condition may be determined to be present if the GPS-type fix of the subscriber station's position is outside the area of coverage indicated by the mapped coverage value, indicating that area of coverage is not entirely accurate.

In another example, the data structure may comprise a lookup table having a plurality of entries associating possible values of the parameter with corresponding positions and coverage values. In one configuration, the lookup table may be of the form illustrated in FIG. 10C, and map SID values or ranges of SID values into corresponding positions and position uncertainties, wherein the position uncertainties are the coverage areas of the wireless systems identified by the respective SID values. In this configuration, referring to FIG. 17, a SID value is mapped to a centroid position 1706 and a radius of coverage R, which together define an area 1708 of coverage of the system identified by the SID value. An update condition is determined to be present if the fix 1702 of the subscriber station's position, as determined by a GPS-type position determination system using the centroid position 1706 as the seed position of the subscriber station, is outside the coverage area 1708. This indicates that either or both the centroid location 1706 or the coverage radius R are inaccurate. (Were the fix to be within the coverage area 1708, then no update would be necessary as the fix is consistent with the centroid position 1706 and coverage radius R.) In response to the update condition, one of three possible options may be undertaken.

Figure 17:
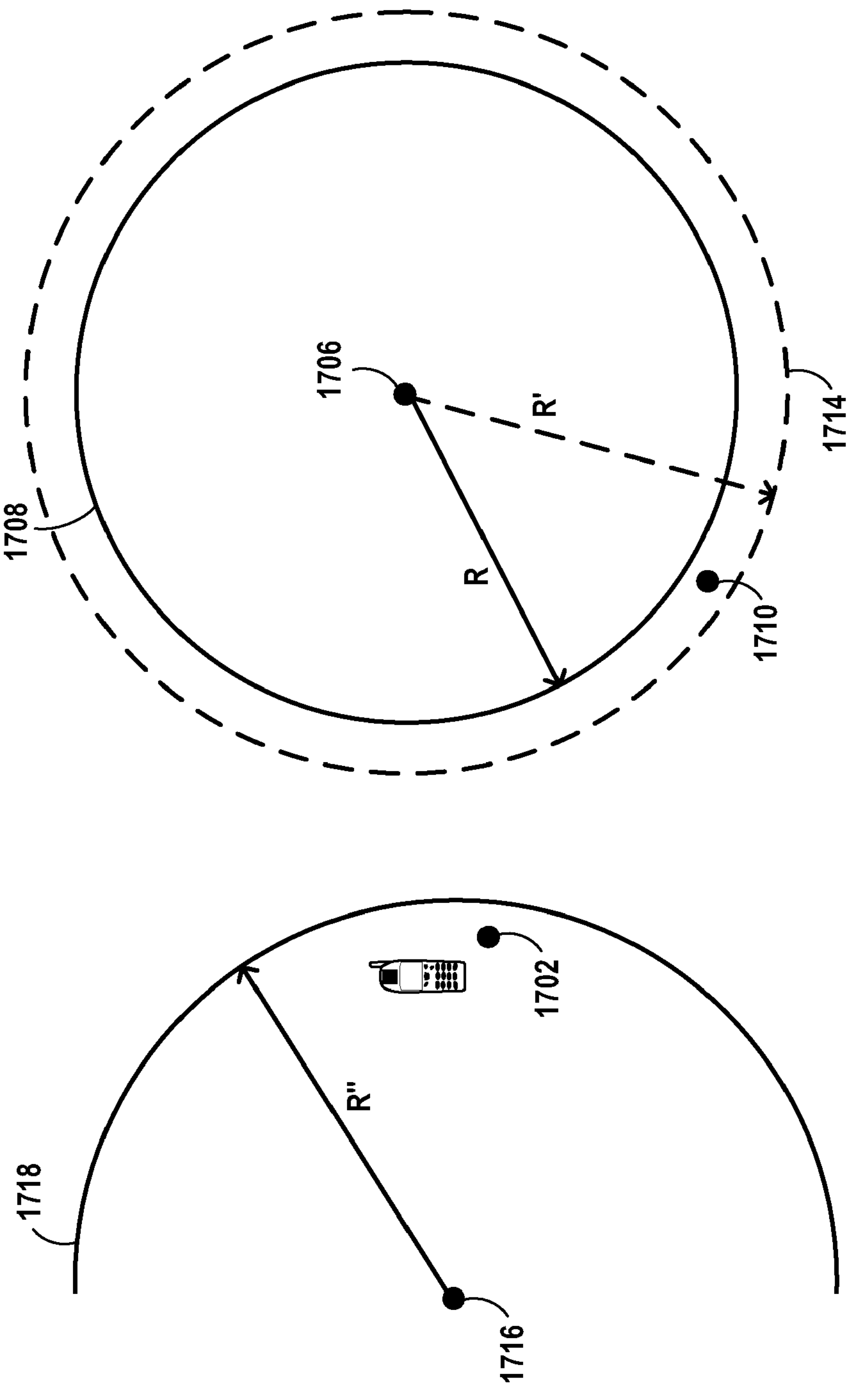
FIG. 17 is a diagram illustrating various update scenarios to the data structure used in the mapping step of FIG. 16.

In the first option, upon or after determining that an update condition is present, the mapped coverage radius as stored in the lookup table is simply extended so that the coverage area defined by the radius encompasses the fix of the subscriber station's position. Referring to FIG. 17, this approach might be appropriate in the case where the GPS-type position fix is at location 1710, just outside the coverage area 1708 represented by the centroid location 1706 and coverage radius R. In that case, the coverage radius R stored in the at least one lookup table is extended from R to R', so that the new coverage area 1714 associated with the SID value encompasses the fix 1710.

In the second option, upon or after determining that an update condition is present, the entry associating the parameter value with a corresponding position and coverage value are replaced so that the parameter value maps into a new position or coverage value. Referring to FIG. 17, this approach might be appropriate in the case where the GPS-type position fix is at location 1702, far from the coverage area 1708 represented by the centroid location 1706 and coverage radius R. In that case, the entries in the lookup table for the SID value are replaced, so they associate the SID value with new centroid location 1716 and coverage radius R", which together define a coverage area 1718 that encompasses the fix 1702.

In the third option, upon or after determining that the update condition is present, at least one new entry associating the parameter value with a position and coverage value are added to the lookup table, thus intentionally creating ambiguity in the form of a conflict situation. Referring again to FIG. 17, if the resultant GPS-type position fix is at location 1702, the existing entry mapping the SID value to centroid location 1706 and coverage radius R are unchanged, and at least one new entry is added mapping the SID value as well to centroid location 1716 and coverage radius R". To resolve the conflict for future position fix attempts, depending on the distance between the position fix 1702 and the coverage area 1708 called for by the original entry, either the original or the new entry could be flagged to indicate which is most probable. During future position fix attempts, the most probable entry, which could change over time, would be used to determine the seed position of the subscriber station.

If, for example, the resultant position fix were to be at location 1710, which is close to the coverage area 1708 called for by the original at least one entry, the original entry could be flagged as most probable in relation to the other. Alternatively, were the resultant position fix to be located at position 1702, which is closer to or within the coverage area 1718 of another system, network or entity, the new entry could be flagged as more probable in relation to the other.

Figure 18A:
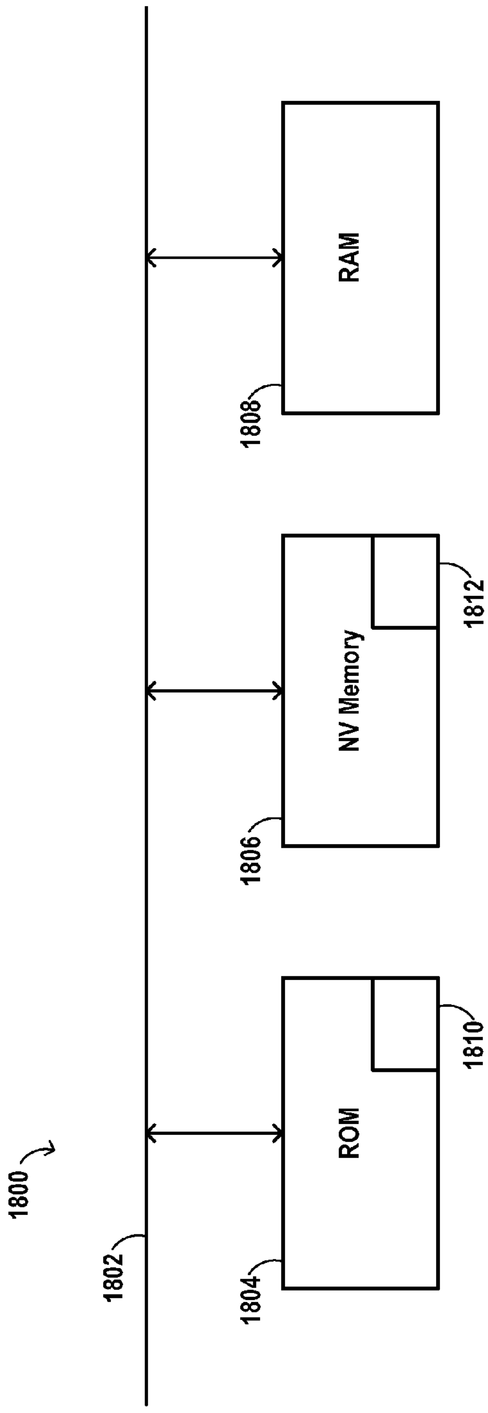
FIGS. 18A-18D show a time sequence of the flow of information through a particular memory configuration having at least one ROM, at least one non-volatile memory, and at least one RAM at various points in time, including at power-up and power-down.
Figure 18B:
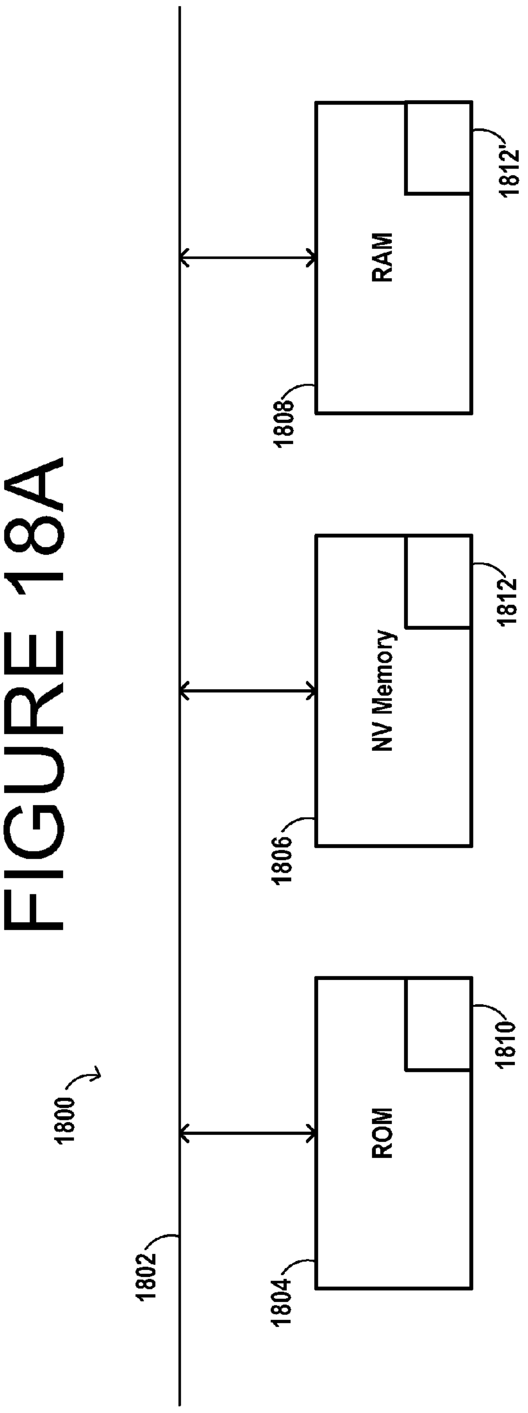
Figure 18C:
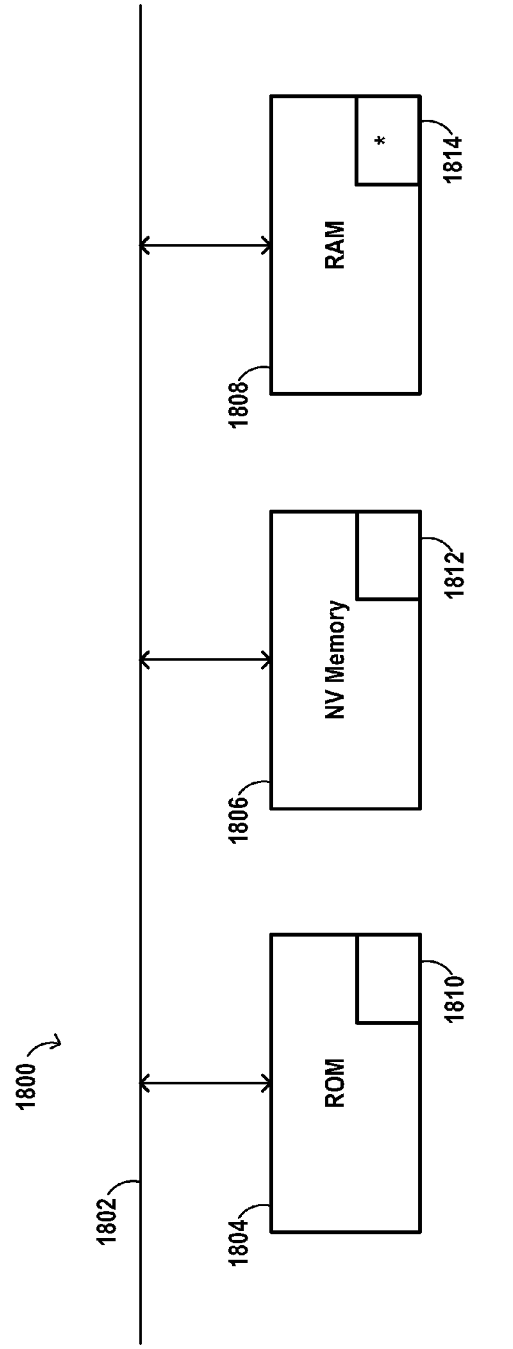
Figure 18D:
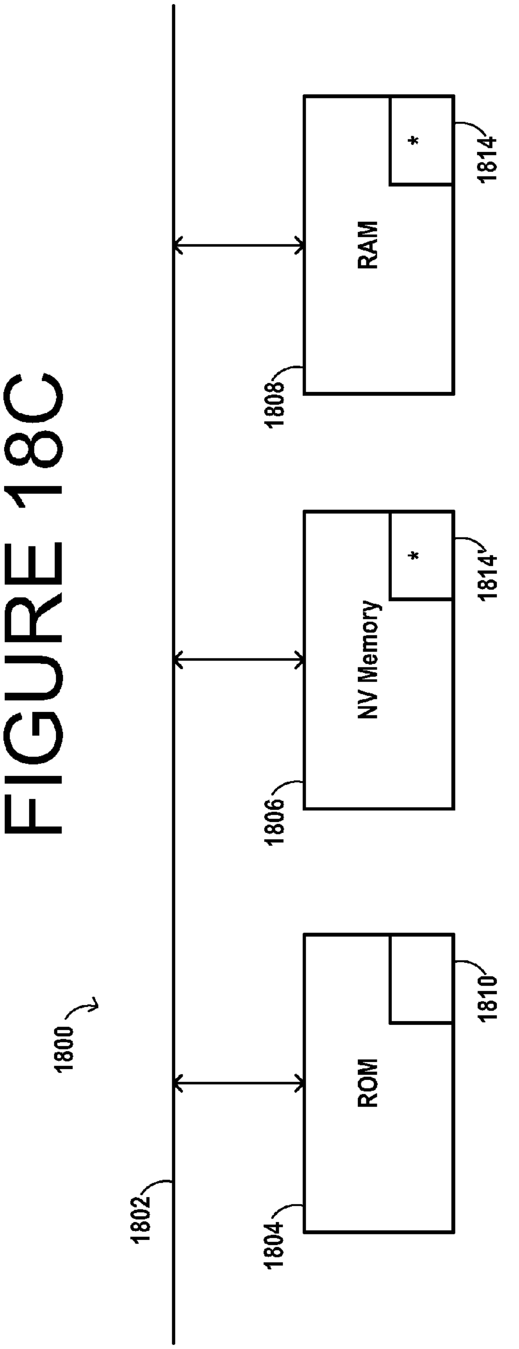

The lookup table may be stored in a memory within the subscriber station. FIG. 18A illustrates a particular configuration 1800 in which ROM 1804, non-volatile memory 1806, and RAM 1808 are present within the subscriber station. Each of these memories is accessible by at least one processor (not shown) through at least one bus 1802. In this configuration, the lookup table is divided between a fixed portion 1810 that is permanently stored in ROM 1804, and a variable portion 1812 that is stored in non-volatile memory 1806, while the subscriber station is powered down. As illustrated in FIG. 18B, when the subscriber station is powered up, the variable portion of the lookup table is copied into RAM 1808, which is the copy identified with numeral 1812'. As the subscriber station attempts a GPS-type position fix attempt, at least one update may be made to the copy 1812' of the variable portion of the lookup table stored in RAM 1808. This updated copy is identified with numeral 1814 in FIG. 18C. During the process of powering down the subscriber station, the updated copy 1814 is stored as 1814' in non-volatile memory 1806, as shown in FIG. 18D, thus preserving all the changes than have been made.

Referring again to FIG. 16, the mapping step 1604 may comprises mapping a SID value, NID value, BASE_ID value, value of any combination of two or more of the foregoing, or value of any combination of the foregoing with at least one additional parameter, from an overhead message communicated to the subscriber station by a CDMA 2000 wireless communications system, to a corresponding position. The mapping 1604 may comprises mapping a SID value from a System Parameters Messages communicated to the subscriber station by a CDMA 2000 wireless communications system to a corresponding position.

In another embodiment, the mapping 1604 may comprises mapping a Country Code value, Sector ID value, value of a combination of the two, or value of any combination of at least one of the foregoing with additional parameters, from overhead messages communicated to the subscriber station by a 1xEVDO wireless communications system, to a corresponding position. Thus, the mapping 1604 may comprise mapping a Country Code value from a Sector Parameters message communicated to the subscriber station by a 1xEVDO wireless communications system to a corresponding position.

In yet another embodiment, the mapping 1604 may comprise mapping an MCC value, MNC value, LAC value, RAC value, Cell Identity value, Time Zone value, value of any combination of any two or more of the foregoing, or value of any combination of the foregoing with at least one additional parameter, from at least one overhead message communicated to the subscriber station by a GSM or UMTS wireless communications system, to a corresponding position. Thus, the mapping 1604 may comprise mapping an MCC value from a Location Area information element communicated to the subscriber station by a GSM or UMTS wireless communications system to a corresponding position.

Figure 19:
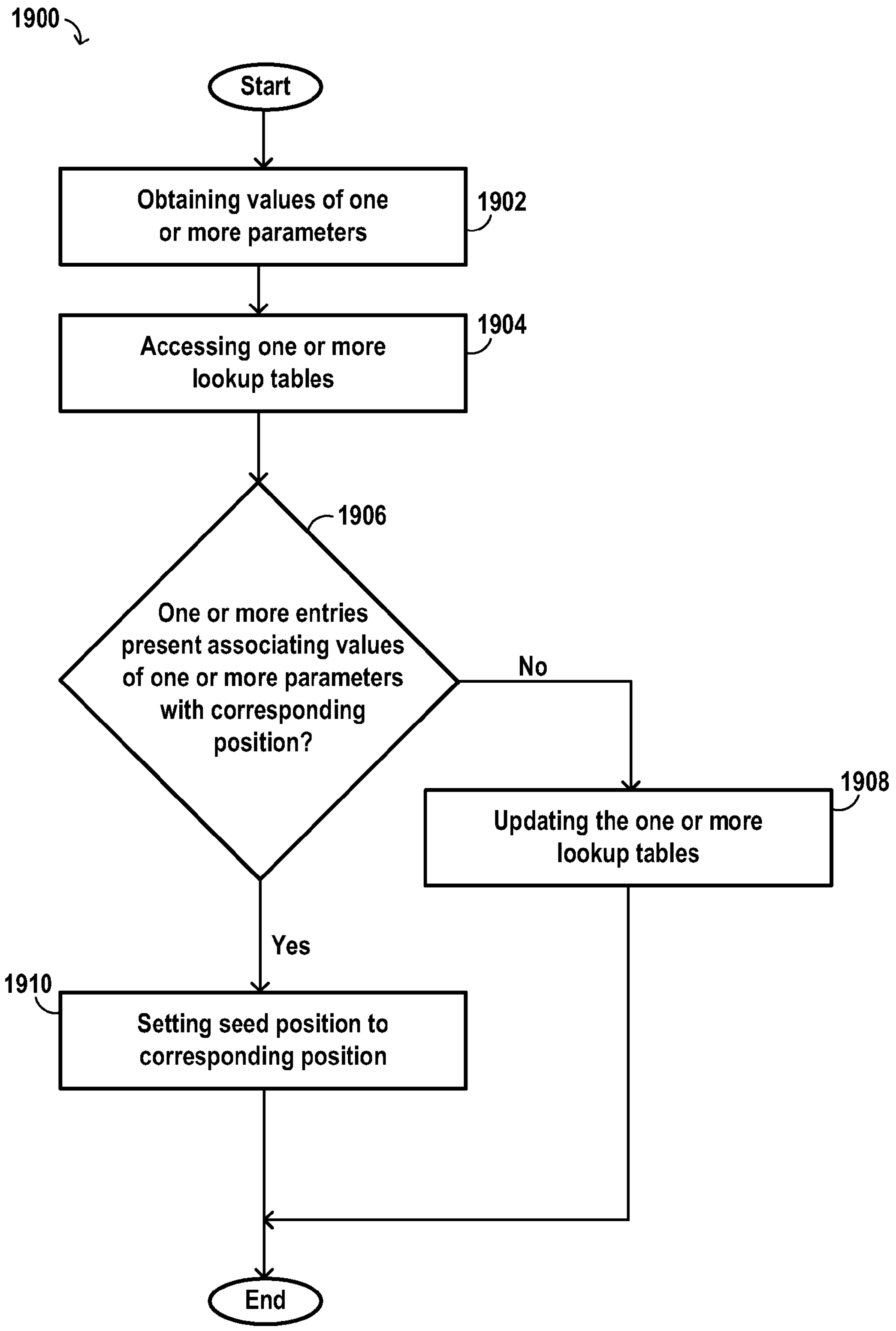
FIG. 19 is a flowchart of an embodiment of a method of attempting to map values of a parameter to a corresponding seed position of the subscriber station using at least one lookup table, and updating the at least one lookup table if at least one entry associating the values of the parameter to a corresponding seed position are absent from the lookup table.

FIG. 19 illustrates a method of updating a lookup table having a plurality of entries associating possible values of the parameter, obtainable from an overhead message communicated by a wireless communications system, with corresponding positions. As illustrated, this embodiment includes boxes 1902, 1904, 1906, 1908, and 1910.

Box 1902 comprises obtaining values of a parameter from an overhead message received by the subscriber station from a wireless communications system.

Box 1904 comprises accessing the table to determine if at least one entry is present associating the parameter value with a corresponding position.

Query 1906 comprises querying whether the entry associating the parameter value to a corresponding position is present in the lookup table.

Box 1908 comprises updating the lookup table to add a new entry if the query 1906 indicates the entry is not present in the lookup table. The new entry associates the values of the parameter with a corresponding position.

Box 1910 comprises setting the seed position of the subscriber station to the corresponding position if the entry is present in the lookup table.

The lookup table may be any of the lookup tables previously described. In this variant of the previously-described "self-learning" feature. In this variant, the lookup table is updated if the entry is absent associating particular values of the parameter with a corresponding position and position uncertainty. According to this update procedure, a new entry associating these particular values with a corresponding position and position uncertainty (one or both of which are derived from the GPS-type position fix) are added to the lookup table.

Figure 20:
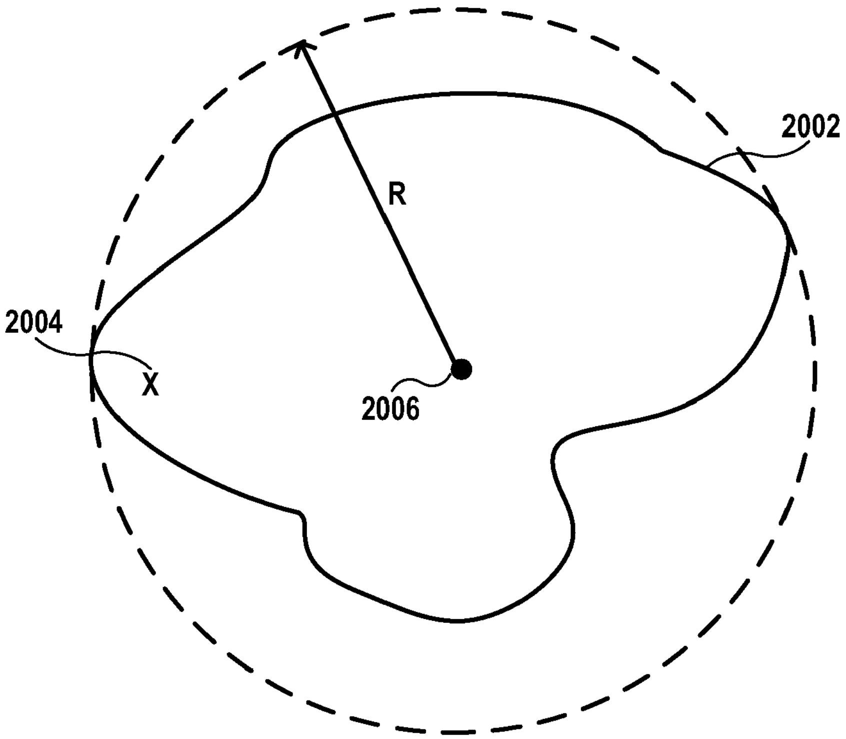
FIG. 20 is a diagram illustrating a circular coverage area defined by a centroid position and coverage radius for a particular country, and the relationship between this coverage area and the geographical limits of that country.

Box 1908 comprises updating the lookup table by adding a new entry associating the values of the parameter with a corresponding position. In addition, the added entry may also associate the parameter value with a corresponding position uncertainty, such as a presumed coverage radius. Thus, for example, where a lookup table associates SID values or ranges with corresponding country centroid locations and radii of coverage, the lookup table may be updated based on the position fix from the GPS-type position determination system. Referring to FIG. 20, the country 2002 encompassing the position fix 2004 is identified, and an entry is then added to the table associating the most recent SID value received by the subscriber station with the centroid position 2006 of the country 2002 and a presumed radius of coverage, R, for example, 400 kM, or an actual radius of coverage based on the geographical limits of the country.

Figure 21:
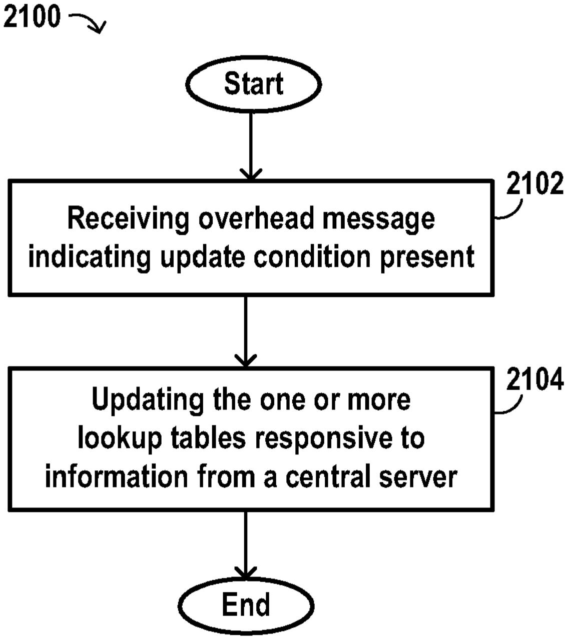
FIG. 21 is a flowchart of an embodiment of a method of updating at least one lookup table, the table associating a parameter value with corresponding positions and/or position uncertainties, responsive to information from a central server (such as the IFAST server at www.ifast.org).

FIG. 21 is a flowchart of another embodiment of a method of updating a lookup table having a plurality of entries associating possible values of the overhead message parameter with corresponding positions. This embodiment is illustrated by boxes 2102 and 2104.

Box 2102 comprises receiving an overhead message from a wireless communications system indicating that an update condition is present.

Box 2104 comprises updating the lookup table responsive to information from a central server accessible by the subscriber station.

The lookup table in this embodiment can be any of the lookup tables previously discussed or described. This embodiment is directed to a variant of the previously described "self-learning" feature, where the lookup table is updated based on information from a central server, and is updated in response to an overhead message from the wireless system indicating that the information on the server has changed.

The lookup table may associate possible SID values or ranges with corresponding country centroid positions, coverage ranges, or both, based on information including the IFAST allocation of possible SID values or ranges to countries as maintained by IFAST on a server accessible over the Internet at www.ifast.org. Here, the wireless system monitors the contents of the server, and periodically broadcasts an overhead message to subscriber stations, instructing them to update their lookup tables based on changes in the SID allocations or identified SID conflicts that are maintained on the IFAST server.

As an example, the wireless system may broadcast the update message on a relatively infrequent basis, for example, every six months, tied to the frequency with which updates are made to the information stored on the IFAST server. As another example, the wireless system broadcasts the message whenever the volume of updates to the IFAST information has exceeded a threshold level since the last update procedure.

In another embodiment, any of the previously discussed methods (FIGS. 1, 2A, 2B, 16, 19, 21) are tangibly embodied as a series of software instructions stored on a processor readable medium.

In yet another embodiment, at least one article of manufacture is provided that comprises a memory in a subscriber station in a wireless communications system. The memory stores a data structure, and the data structure associates a plurality of possible values of a parameter, obtainable from an overhead message communicated by a wireless communications system, with corresponding positions. The data structure may also associate the possible values of the parameter with corresponding position uncertainties. And the data structure may also comprise a lookup table having a plurality of entries associating the possible values of the parameter with corresponding positions. The lookup table may comprise any of the lookup tables previously described or illustrated. Examples of this embodiment are illustrated in FIGS. 18A-18D.

In the case where the data structure is implemented as a lookup table, the plurality of entries in the lookup table may be stored in order of priority. Or, the plurality of entries may each be associated with a hash value, and stored in ascending or descending order of the hash value, with a hash function available to map values of the overhead message parameters to a hash value. And, as illustrated in FIGS. 18A-18D, the memory may be ROM memories, RAM memories, non-volatile memories, or combinations of the foregoing.

Figure 22A:
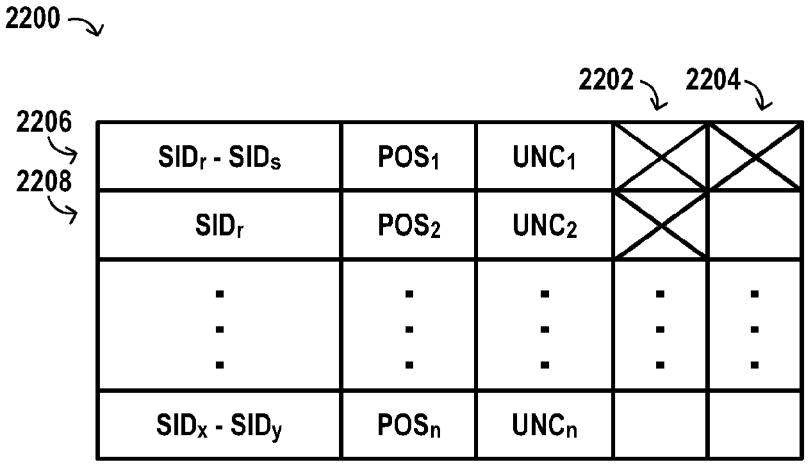
FIGS. 22A-22C are a time sequence illustrating changes to a lookup table, having entries associating possible SID values or ranges with corresponding positions and position uncertainties, as SID conflicts are identified and/or resolved.

Examples are also possible wherein at least some of the entries conflict. FIG. 22A illustrates an example of a lookup table 2200 having two conflicting entries, identified with numerals 2206 and 2208. Entry 2206 associates the SID range $SID_r$-$SID_s$ with a first position, $POS_1$, and first position uncertainty, $UNC_1$, while entry 2208 associates the SID value $SID_r$ with a second position, $POS_2$, and second position uncertainty, $UNC_2$. The entry 2206 might represent, for example, an authorized SID allocation by IFAST, while entry 2208 might represent unauthorized use of the SID value $SID_r$ by a carrier in another country. The conflict may either be identified by IFAST (FIGS. 9A-9B) or discovered through invocation of the method of FIG. 16.

As another example, all the entries in the table have a C bit, identified with numeral 2202, for indicating whether the entry is in conflict with another entry. Thus, the C bits for entries 2206 and 2208 are both set (represented by the X in the figure), indicating that these two entries conflict with one another for the SID value $SID_r$. All the entries in the table also have an M bit, identified with numeral 2204, for indicating which of the two or more conflicting entries for a SID value or range is most probable. In FIG. 22A, the M bit for entry 2206 is set, indicating that entry is more probable than entry 2208 because it represents an authorized IFAST SID allocation, whereas entry 2208 represents an unauthorized SID use by a carrier.

Figure 22B:
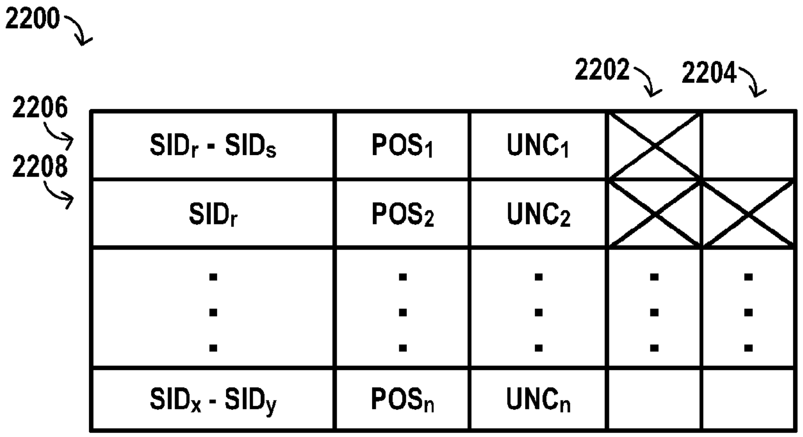

Over time, these bits can change. For example, entry 2208 could later be deemed to be more probable than entry 2206. In that case, through invocation of the method of FIG. 16, as illustrated in FIG. 22B, the M bit for entry 2208 is set, reflecting the changed status of entry 2208 in relation to entry 2206.

Figure 22C:
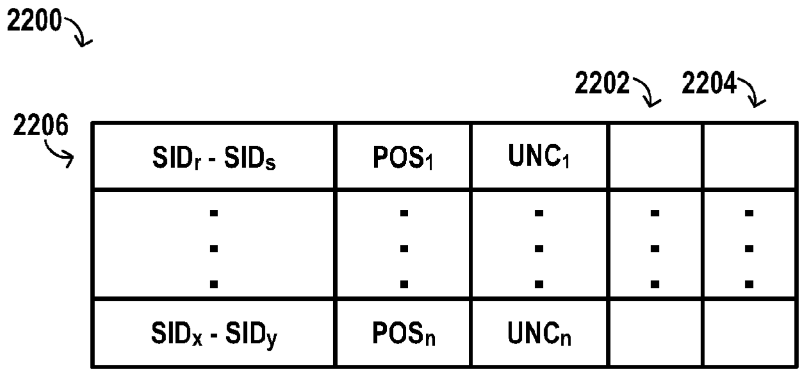

Over time, the entries may also change. For example, in FIG. 22A, entry 2208 could be an entry newly added through invocation of the method of FIG. 16. Or, as illustrated in FIG. 22C, if the conflict is resolved because, for example, the carrier ceases unauthorized use of $SID_r$ and/or this SID value is taken off the list of identified conflicts maintained on the IFAST server (FIGS. 9A-9B), through invocation of the method of FIG. 21, entry 2208 would be deleted.

In another embodiment, the data structure associates possible SID values, NID values, BASE_ID values, values of any combination of two or more of the foregoing, or values of any combination of the foregoing with at least one additional parameter, obtainable by the subscriber station from an overhead message communicated by a CDMA 2000 wireless communications system, with corresponding positions. The data structure may associate possible SID values, obtainable by the subscriber station from a System Parameters Message communicated by a CDMA 2000 wireless communications system, with corresponding positions. In this implementation, the data structure may also associate the possible SID values with corresponding position uncertainties.

In yet another embodiment, the data structure associates possible Country Code values, Sector ID values, values of the combination of the two, or values of any combination of the foregoing with one or more additional parameters, obtainable by the subscriber station from overhead messages communicated by a 1xEVDO wireless communications system, with corresponding positions. In one implementation, the data structure associates possible Country Code values, obtainable from a Sector Parameters message communicated to the subscriber station by a 1xEVDO wireless communications system, with corresponding positions. In this implementation, the data structure may also associate the possible Country Code values with corresponding position uncertainties.

In still another embodiment, the data structure associates possible MCC values, MNC values, LAC values, RAC values, Cell Identity values, Time Zone values, values of any combination of any of the foregoing, or values of any combination of the foregoing with one or more additional parameters, obtainable from overhead messages communicated to the subscriber station by a GSM or UMTS wireless communications system, with corresponding positions. In one implementation, the data structure associates possible MCC values, obtainable from a Location Area information element communicated by a GSM or UMTS wireless communications system, to corresponding positions. As an example, the data structure may associates the possible MCC values with corresponding position uncertainties.

FIG. 23A summarizes in table form examples of some of the parameters that may be used in the lookup table for a CDMA 2000 or 1xEVDO system, while FIG. 23B summarizes in table form examples of some of the parameters that may be used in the lookup table for a GSM or UMTS system. Other examples are possible so nothing in these tables should be taken as limiting.

Figure 24:
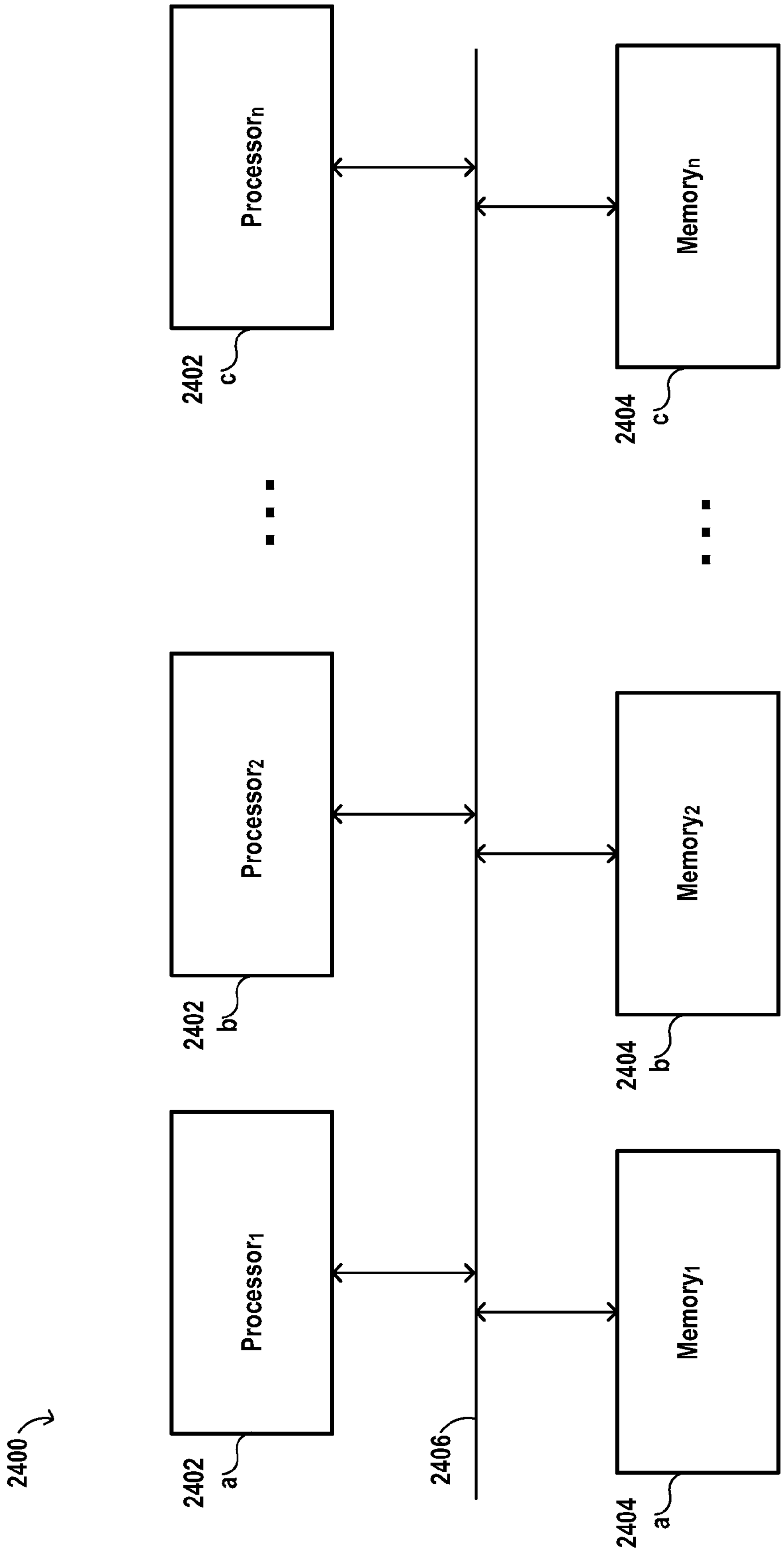
FIG. 24 is a block diagram of an embodiment of a system for deriving a seed position of the subscriber station and then initiating a GPS-type position fix of the subscriber station based on acquisition assistance information derived from the seed position, the system having at least one processor in communication with a memory.

FIG. 24 is a block diagram of embodiment 2400 of a system for deriving a seed position for a subscriber station. In this embodiment, one or more memories 2404*a*, 2404*b*, 2404*c* are configured to store a data structure associating possible values of a parameter, obtainable by the subscriber station from an overhead message communicated by a wireless communications system, with corresponding positions. In addition, processors 2402*a*, 2402*b*, 2402*c* are configured to (1) obtain values of the parameter from the overhead message communicated by a wireless communications system; (2) access the data structure stored in one or more of the memories in order to map the values of the parameter to a corresponding position; and (3) derive a seed position of the subscriber station responsive to the access. The memories 2404*a*, 2404*b*, 2404*c* are accessible to the processors 2402*a*, 2402*b*, 2402*c* through busses 2406.

The processors 2402*a*, 2402*b*, 2402*c* may be further configured to: (1) search for satellite transmissions originating from a GPS-type position determination system responsive to the seed position of the subscriber station; and (2) derive a fix of the position of the subscriber station from such transmissions. As an example, the processors 2402*a*, 2402*b*, 2402*c* may be configured to set the seed position of the subscriber station to the corresponding position mapped using the data structure provided another estimate of the subscriber station's position having lower position uncertainty is unavailable.

The data structure may comprise at least one lookup table having a plurality of entries associating possible values of the parameters with corresponding positions. The plurality of entries of the lookup table may also associate the possible values of the parameters with corresponding position uncertainties.

Figure 25:
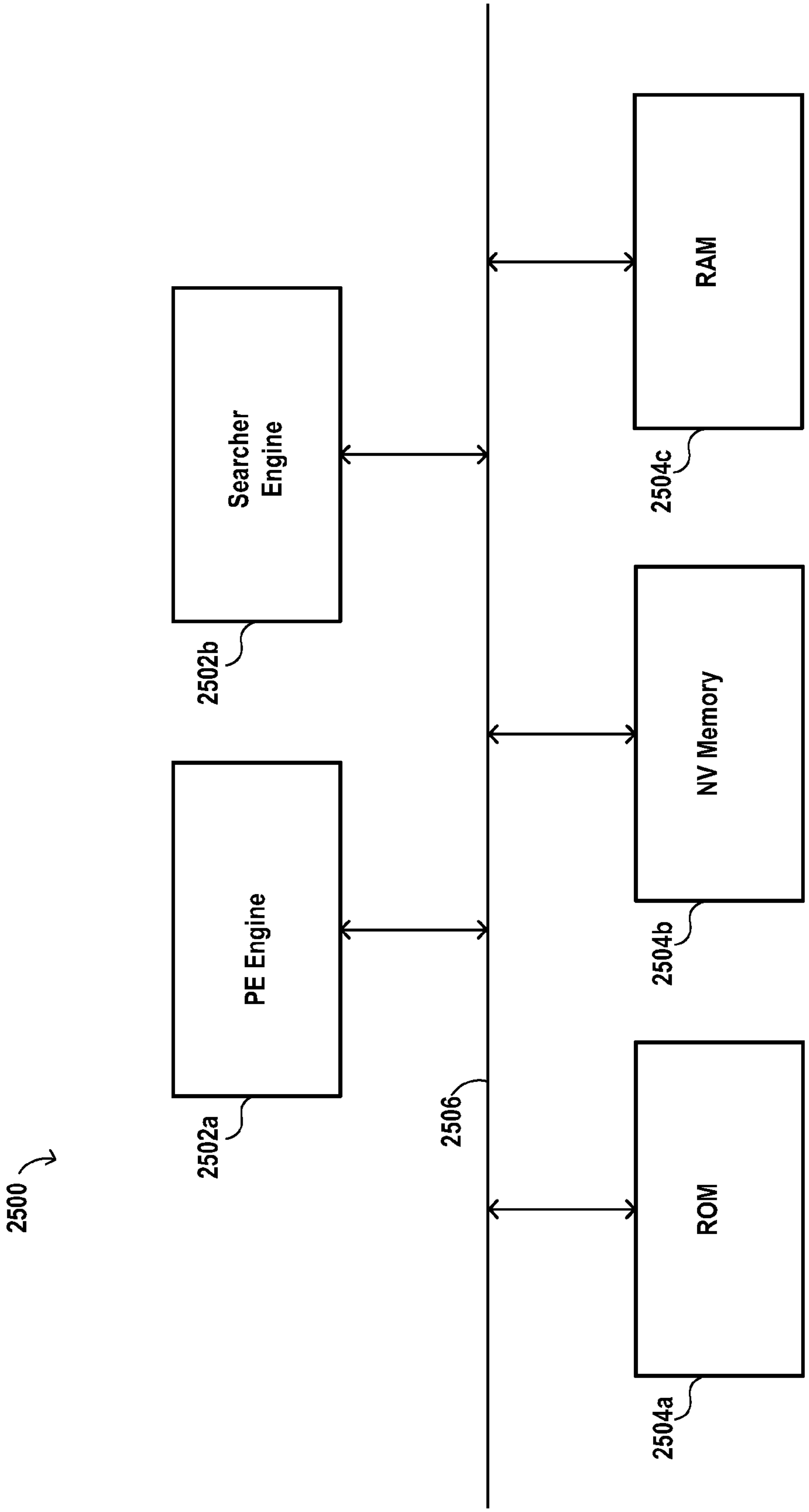
FIG. 25 is a block diagram of a particular implementation of the system of FIG. 24, with the at least one processor comprising a Position Engine (PE) ASIC processor for deriving the seed position of the subscriber station and then deriving acquisition assistance information from this seed position, and a Searcher Engine ASIC processor for initiating a GPS-type position fix responsive to the acquisition assistance information.

FIG. 25 is a block diagram of an implementation 2500 of the system. In this particular implementation, the processors comprise a position engine 2502*a* for deriving the seed position of the subscriber station, and a searching engine 2502*b* for fixing the position of the subscriber station responsive to the seed position. In this implementation, the memory comprises ROM 2504*a*, non-volatile memory 2504*b*, and RAM 2504*c*, each accessible to the processors through busses 2506.

The data structure in this implementation has a fixed portion and a variable portion. The fixed portion is stored in ROM 2504*a*, and a master copy of the variable portion is stored in non-volatile memory 2504*b* while the subscriber station is powered down. Upon power up, a copy of the variable portion is stored in RAM 2504*c*. Any updates to the variable portion while the subscriber station is powered up are made to this variable portion. When the subscriber station is powered down, the updated copy in RAM 2504*c* is stored in the non-volatile memory 2504*b*, overwriting the previous master copy and serving as the new master copy.

As an example, as represented by the table of FIG. 23A, the data structure associates possible SID values, NID values, BASE_ID values, values of any combination of two or more of the foregoing, or values of any combination of the foregoing with at least one additional parameters, obtainable by the subscriber station from overhead messages communicated by a CDMA 2000 wireless communications system, with corresponding positions. In one configuration, the data structure may associate possible SID values, obtainable by the subscriber station from a System Parameters Message communicated by a CDMA 2000 wireless communications system, with corresponding positions. In this configuration, the data structure may also associate the possible SID values with corresponding position uncertainties.

In another example, also represented by the table of FIG. 23A, the data structure may associate possible Country Code values, Sector ID values, values of the combination of the two, or values of any combination of the foregoing with at least one additional parameter, obtainable by the subscriber station from overhead messages communicated by a 1xEVDO wireless communications system, with corresponding positions. In one configuration, the data structure may associate possible Country Code values obtainable from a Sector Parameters message communicated by a 1xEVDO wireless communications system with corresponding positions. In this configuration, the data structure may also associate the possible Country Code values with corresponding position uncertainties.

In still another example, represented by the table of FIG. 23B, the data structure associates possible MCC values, MNC values, LAC values, RAC values, Cell Identity values, Time Zone values, values of any combination of any two or more of the foregoing, or values of any combination of the foregoing with at least one additional parameter, obtainable from overhead messages communicated by a GSM or UMTS wireless communications system, with corresponding positions. In one configuration, the data structure may associate possible MCC values, obtainable from a Location Area information element communicated by a GSM or UMTS wireless communications system, to corresponding positions. In this configuration, the data structure may also associate the possible MCC values with corresponding position uncertainties.

Figure 26:
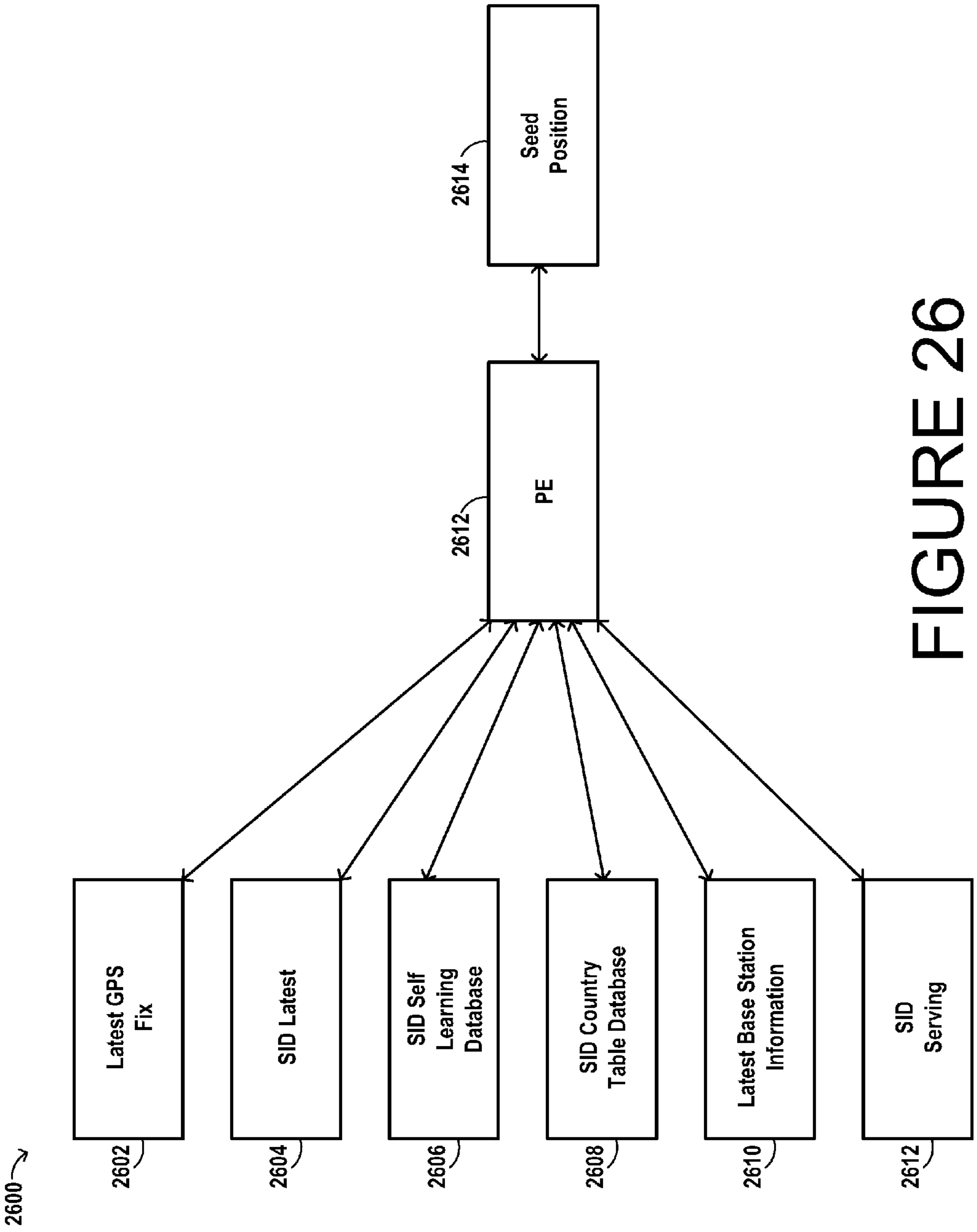
FIG. 26 is a block diagram of a detailed implementation example of the system of FIG. 25, in which the PE ASIC processor derives a seed position of the subscriber station responsive to information contained in six data structures, comprising a Latest GPS Fix data structure, a SID Latest data structure, a SID Self Learning Database, a SID Country Table Database, a Latest Base Station Information data structure, and a SID Serving data structure.

In yet another example, referring to FIG. 26, six data structures may be maintained, comprising the Latest GPS Fix data structure 2602, the SID Latest data structure 2604, the SID Self Learning Database 2606, the SID Country Table Database 2608, the Latest Base Station Information data structure 2610, and the SID Serving data structure 2612. An ASIC processor, position engine 2616, accesses these six data structures and, responsive thereto, outputs a seed position of the subscriber station, identified with numeral 2614.

An example format of the Latest GPS Fix data structure 2602 is illustrated in FIG. 27. As illustrated, the Lat_gps and Lon_gps fields represent the latest GPS fix of the subscriber station's position (in degrees), and the gpsWeek_gps and gpsMs_gps fields comprise a time-stamp of the time at which the latest GPS fix was taken, with the gpsWeek_gps field indicating the week in which that fix was taken, and gpsMs_gps indicating the time (in milliseconds) during that week the GPS fix was taken. The Position_Unc_gps field represents the inherent position uncertainty (in meters) of the latest GPS fix.

These values are all updated (in RAM) (1) when the subscriber station is powered up, or (2) when a GPS fix is available, either by the PE or some other processor within the subscriber station. When the subscriber station is powered down, the contents of this data structure are written into non-volatile memory.

An example format of the SID Latest and Latest Base Station Information data structures 2604, 2610 are illustrated in FIG. 28. Within the SID Latest data structure 2604, the SIDlatest field holds the latest serving SID for the subscriber station, and the gpsWeek and gpsMs fields hold a time-stamp of this latest serving SID. Again, gpsWeek holds the week SIDlatest was last updated, and gpsMs holds the time (in milliseconds) within that week the update occurred.

Within the Latest Base Station Information data structure 2610, the BSLat and BSLon fields hold, respectively, the latitude and longitude (in radians) of the base station serving the subscriber station. The Dmar field holds the MAR for this base station, as derived from the size of the search window used by the base station to search for pilots of neighboring base stations. The gpsWeek_BsInfo and gpsMs_BsInfo fields hold a time-stamp of the time the BSLat and BSLon fields were last updated, expressed in terms of the week and the time within that week the update occurred.

The values of the SID Latest data structure 2604 are updated (in RAM) (1) when the subscriber station is powered up, (2) when an out of service (OOS) condition is detected, or (3) when a handoff to a new serving system occurs, as each of these occurrences should trigger the host wireless system to communicate overhead messages (such as a CDMA 2000 System Parameters Message) to the subscriber station including a SID identifying the last serving system. More specifically, when an OOS condition occurs, the SID of the serving system just prior to onset of the OOS condition is stored in SIDlatest, and when a handoff condition occurs, the SID of the serving system just prior to the handoff is stored in SIDlatest. Again, these updates may be performed by the PE or some other processor within the subscriber station. And the contents of this data structure are written into non-volatile memory when the subscriber station is powered down.

The values of the Latest Base Station Information data structure 2610 are updated (in RAM) (1) when a power up condition occurs, or (2) non-zero values of BSLat and BSLon are found in overhead messages (such as a CDMA 2000 System Parameters Message) received from the host wireless system, it being assumed that non-zero values of these fields are valid, while zero values indicate the fields are not used. Again, these updates may be performed by the PE or some other processor within the subscriber station. And, as before, the contents of this data structure are written into non-volatile memory when the subscriber station is powered down. These values are updated when the subscriber station is in service during IDLE or ACCESS modes.

The SID Serving data structure 2612 contains a field, SIDserving, that holds the SID of the current serving wireless system, and fields holding a time stamp of the time the SIDserving field was last updated. If the subscriber station is OOS, the value of SIDserving is 0. If the subscriber station is in service, then SIDserving is a number in the range of 1 to 32767. Normally, SIDserving and SIDlatest hold the same value, but there are circumstances where the two will differ. For example, when the subscriber station is OOS, SIDserving will be 0, while SIDlatest will hold the SID of the serving system just prior to the OOS condition. Similarly, when the subscriber station has undergone a handoff from one system to another, SIDlatest will hold the SID of the serving system just prior to the onset of the handoff condition, while SIDserving will hold the SID of the serving system after the handoff.

The SID Self Learning Database 2606 is a circular fixed size array with entries sorted by GPS time, with each having the format illustrated in FIG. 29. The size of the array is chosen based on typical travel assumptions. Assuming a typical subscriber travels between Korea, Japan, and the United States, a fixed size array of 55 entries may be appropriate. Each entry is initially set to a default null value. The entries are then populated as GPS fixes are obtained while the subscriber station is in service. When the subscriber station is out of service, updating or populating of the entries is not performed, even as GPS fixes are obtained.

When a GPS fix is obtained while the subscriber station is in service, the SID Self Learning Database 2606 is consulted to determine if an entry is present keyed to the current value of SIDserving. If such an entry is not present, an entry is allocated to this SID. If an unpopulated entry is not available, the oldest populated entry is allocated. (This is the only method by which a populated entry expires.) The newly allocated entry is then populated in accordance with the pseudo-code of FIG. 32A. If an entry keyed to SIDserving is already present, selected fields of that entry may be updated, again through the pseudo-code of FIG. 32A. Since that pseudo-code governs both updates to existing entries, and the population of newly allocated entries, an explanation of its operation will now be provided.

Referring to FIG. 32A, a default coverage radius, RadiusSL, is set to 400 km, a value which is configurable. A check is then made to determine if an entry keyed to SIDserving is present in the SID Country Table Database 2608, which associates the value of SIDserving with a centroid location and a coverage radius. If so, the variables CentroidCountry and RadiusCountry are respectively set to these values. A variable DeltaRadius is also set to the difference in position between the GPS fix and the centroid location of the country. If the value SIDserving cannot be associated with a centroid location and coverage radius because an entry keyed to SIDserving is not found in the SID Country Table Database 2608, the variable RadiusCountry is set to RadiusSL, the default coverage value, and the variable DeltaRadius is set to 0 (thus guaranteeing that a conflict condition will not be detected, consistent with the lack of an entry in the SID Country Table Database 2608).

If DeltaRadius is greater than RadiusCountry, indicating that the GPS fix is outside the coverage area for the country as indicated by the SID Country Table Database 2608, a conflict condition is detected. Accordingly, the value of the mask field, in either the newly allocated entry or existing entry, whichever situation is present, is set to a logical "1" to indicate the presence of a conflict for SIDserving. Otherwise, the value of the mask field is cleared to a logical "0" to indicate the absence of a conflict condition.

Figure 32B:
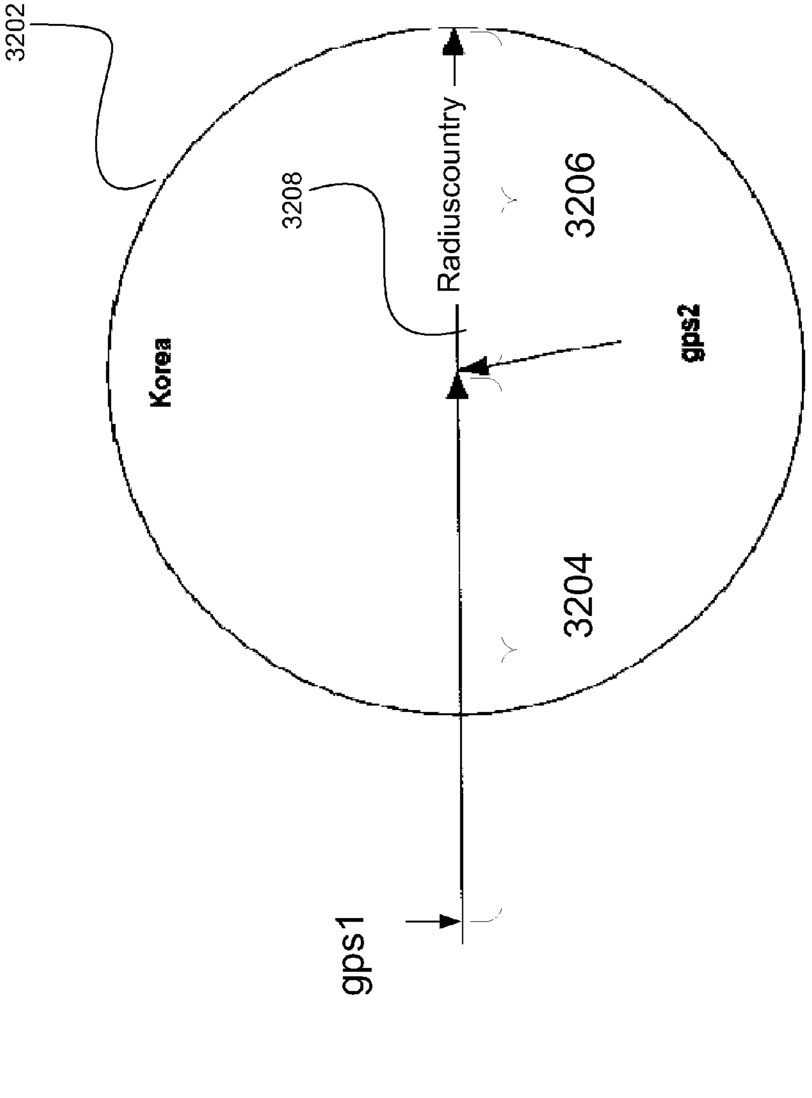
FIG. 32B illustrates two scenarios for updating an entry in the SID Self Learning Database, the first involving the detection of a SID conflict, and the second involving the lack of a SID conflict.

An example of these two situations is illustrated in FIG. 32B. There, it is assumed that an entry the SID Country Table Database 2608 associates SIDserving with centroid location 3208 and coverage radius 3206, which together define coverage area 3202 (the area within the circle). The variable CentroidCountry is set to the value 3208, and the variable RadiusCountry is set to the value 3206. If the GPS fix is gps1, then the variable DeltaRadius is set to the value identified with numeral 3204, the difference between the position represented by gps1 and the centroid location 3208. A conflict is then detected because the value of DeltaRadius exceeds that of RadiusCountry, indicating that gps1 is outside the designated coverage area of SIDserving (the area represented by the circle). According, the mask value, in either the existing entry or newly allocated entry of SID Self Learning Database 2606, is set to a logical "1." By contrast, if the GPS fix is gps2 (the same as the centroid location 3208), then the variable DeltaRadius is set to 0, indicating that gps2 is coincident with centroid location 3208. A conflict is not detected in this case because the value of DeltaRadius does not exceed that of RadiusCountry, thus indicating that gps2 is within the designated coverage area of SIDserving.

Once the value of the mask field of the entry is set or cleared as appropriate, the latitude and longitude of the GPS fix are then stored respectively in the latitude and longitude fields of the entry, and the time stamp of the GPS fix, represented by the week and time (in mS) during the week the GPS fix occurred, are stored respectively in the gpsWeek and gpsMs fields. The pseudo-code then completes execution.

Note that, through execution of the pseudo-code, if no entry keyed to SIDserving is present in either SID Self Learning Database 2606 or SID Country Table Database 2608, indicating SIDserving has not been previously encountered and is also not associated with any country represented in the SID Country Table Database 2608, an entry keyed to SIDserving is added to the SID Self Learning Database 2606 that contains the position and time-stamp of the GPS fix that occurred while the subscriber station is being serviced by SIDserving. That is useful because, when SIDserving is encountered in the future, the GPS fix position (with a position uncertainty reflecting the age of the GPS fix) may then serve as the seed position of the subscriber station.

The updating and populating of entries in the SID Self Learning Database 2606 occur in RAM and are performed by the PE or some other processor when a GPS fix is obtained and the subscriber station is currently in service. When the subscriber station is powered down, the contents of this data structure as stored in RAM are stored in non-volatile memory, thus ensuring that the updates and newly populated entries are preserved.

The SID Country Table Database 2608 is a lookup table having entries each associating a consecutive range of SIDs with a country centroid location and coverage range. An example format of an entry in this database is illustrated in FIG. 30. The SIDstart field holds the starting SID in the range, the SIDend field holds the ending SID in the range, the latitude and longitude fields hold, respectively, the centroid latitude and longitude of the associated country (each in units of 0.0001 radian), and the radius field holds the coverage radius (in km) of the associated country.

In this example, the SID Country Table Database 2608 is a fixed table stored in ROM that is not changed after the subscriber station is activated and put in service. Rather, during manufacture, the table is populated using a current table of SID ranges as obtained from www.ifast.org (see FIGS. 8A-8G for an example), and then fixed in ROM. If a SID is newly assigned to a country after the SID Country Table Database 2608 is fixed, the situation is handled through an entry in the SID Self Learning Database 2606.

To populate the table, the current table of SID ranges from www.ifast.org is downloaded and sorted by SID range. Each entry is augmented with a hash field holding a hash value inversely related to the priority of the entry, centroid location fields (latitude and longitude) holding the centroid location of the associated country, and a coverage radius field holding the radius of coverage. The hash value assigned to an entry is inversely related to the degree to which the subscriber is expected to travel to that country. For example, for a subscriber expected to travel extensively between the United States, Japan, and South Korea, the United States-associated entries might be assigned a hash value of 1, indicating highest priority, the Japan-associated entries might be assigned a hash value of 2, indicating the next highest priority, and the South Korean-associated entries might be assigned a hash value of 3, indicating the next highest priority. As fixed in ROM, the table will be ordered by hash value in ascending order, with the highest priority entries at or towards the top. The centroid location for an entry is the midpoint between the maximum and minimum positions for the country, and the coverage radius for an entry is the coverage radius of the circular area centered at the centroid location that encompasses the entirety of the country.

Once the table has been augmented, multiple entries in the table may then be consolidated as appropriate. For example, multiple entries for the Caribbean countries may be consolidated into a single entry for the entire Caribbean region. To consolidate multiple entries, the SID ranges of the individual entries, when combined, should form a single consecutive range of SIDs. The centroid position field is then loaded with the centroid position of the entire region, and the coverage radius field is filled with a radius value that defines a circle centered at the centroid location that encompasses the entire region. The entries in the table are then ordered by priority based on the hash value assigned to each entry.

FIGS. 31A-31G illustrate a SID range table that has been downloaded from www.ifast.org and augmented in part in the manner described to form a precursor of SID Country Table Database 2608. The entries in the table are divided into 19 groups, and the entries in each group are assigned a hash value in the range 1-18 inversely proportional to the priority of the entries in the group. For example, the largely U.S.-associated entries within the SID range 1 to 7807 are assigned a hash value of 1, representing the highest priority entries, the Japan-associated entries within the SID range 12288 to 13311 are assigned a hash value of 2, representing the next highest priority level, etc. Notably, all the Caribbean associated entries are consolidated into a single entry representing the entire Caribbean region that is assigned a hash value of 15.

A high level algorithm for determining the seed position of the subscriber station will now be discussed. Whether the subscriber station is in service (IS) or out of service (OOS), the algorithm involves evaluating all the possible sources of the seed position, and selecting the source that has the lowest position uncertainty. The algorithm proceeds in five stages, determining a possible seed position and corresponding position uncertainty at each stage, and populating two vectors, SeedPosition(i), $1 \leqq i \leqq 5$, and SeedUncetainty(i), $1 \leqq i \leqq 5$, at each stage.

In the first stage, the position uncertainty associated with the latest GPS fix is aged to current time using the pseudocode of FIG. 33. According to this pseudo code, TimeDelta, equal to the difference in time between the current time and the time tagged to the GPS fix, is calculated. If this TimeDelta value is less than 2 hours, the assumed velocity of the subscriber station, seedpos_MsSpeedMax, is set to an assumed automobile velocity, seedpos_MsSpeedMax_car, for example, 33.975 m/s (76 mph), and is otherwise set to an assumed airplane velocity, seedpos_MsSpeedMax_air, for example, 178.816 m/s (400 mph), reflecting an assumption that the subscriber station traveled by air if the time since the latest GPS fix equals or exceeds 2 hours. The assumed velocity, seedpos_MsSpeedMax, is then multiplied by the TimeDelta value to arrive at the incremental position uncertainty due to the aging of the GPS fix. This value is then added to the inherent position uncertainty of the GPS fix, GPS Fix Position Uncertainty (Position_Unc_gps in FIG. 27), to arrive at the aggregate position uncertainty of the latest GPS fix, which is stored in SeedUncertainty(1). The first potential seed position, SeedPosition(1), is set to the latest GPS fix.

Perscribed "early exit" criteria may then be evaluated to determine whether it is necessary to proceed with the remaining stages. In one embodiment, if SeedUncertainty(1), the aged position uncertainty associated with the latest GPS fix, is within a typical GPS accuracy fix requirement, for example, 8 GPS chips or equivalently 2400 meters, then the seed position of the subscriber station is taken to be the latest valid GPS fix, and algorithm terminates without proceeding to the next stages. By the same token, if SeedUncertainty(1) is outside the range of this typical requirement, then the algorithm proceeds with the next stages.

In the second stage, if the Latest Base Station Information data structure 2610 holds non-zero values of the latitude and longitude of the serving base station, the position uncertainty of these values is aged to current time by executing the pseudo code of FIG. 34 if data structure 2610 holds non-zero values of base station lat/lon.

Similar to the code of FIG. 33, in the code of FIG. 34, TimeDelta, equal to the difference in time between the current time and the time tagged to the base station lat/lon values, is calculated. If this TimeDelta value is less than 2 hours, the assumed velocity of the subscriber station, seedpos_MsSpeedMax, is set to an assumed automobile velocity, seedpos_MsSpeedMax_car, for example, 33.975 m/s (76 mph), and is otherwise set to an assumed airplane velocity, seedpos_MsSpeedMax_air, for example, 178.816 m/s (400 mph). The assumed velocity, seedpos_MsSpeedMax, is then multiplied by the TimeDelta value to arrive at the incremental position uncertainty due to the aging of the base station lat/lon values. This value is then added to the inherent position uncertainty of the base station position (Dmar in FIG. 28) to arrive at the aggregate position uncertainty of the base station lat/lon position, UncertaintyBSlatlon. This value is then compared with a default position uncertainty, associated with the assumption that the subscriber station is located somewhere on the face of the earth, with a position uncertainty that encompasses the entirety of the earth. If less than the default position uncertainty, the second instantiation of the position uncertainty, PositionUncertainty(2), is set to UncertaintyBSlatlon. If greater than the default position uncertainty, PositionUncertainty(2) is set to the default position uncertainty. In either case, the second possible seed position, SeedPosition (2), is set to the base station lat/lon position.

In the third stage, pseudo code of FIG. 35 is executed to determine if a seed position is possible from a matching entry in the SID Self Learning Database 2606. If the subscriber station is out of service, and the SID Self Learning Database 2606 holds a matching entry for SIDlatest, the position uncertainty associated with this matching entry is aged to current time. Similar to the code of FIG. 34, in the code of FIG. 35, TimeDelta, equal to the difference in time between the current time and the time tagged to the GPS stored in the matching entry, is calculated. If this TimeDelta value is less than 2 hours, the assumed velocity of the subscriber station, seedpos_MsSpeedMax, is set to an assumed automobile velocity, seedpos_MsSpeedMax_car, for example, 33.975 m/s (76 mph), and is otherwise set to an assumed airplane velocity, seedpos_MsSpeedMax_air, for example, 178.816 m/s (400 mph).

The assumed velocity, seedpos_MsSpeedMax, is then multiplied by the TimeDelta value to arrive at the incremental position uncertainty due to the aging of the GPS lat/lon values from the matching entry. This value is then added to the inherent position uncertainty of the GPS lat/lon position, seedpos_default_sid_uncertainty, to arrive at the aggregate position uncertainty of the GPS lat/lon position from the matching entry. This value is then compared with a default position uncertainty, associated with the assumption that the subscriber station is located somewhere on the face of the earth, with a position uncertainty that encompasses the entirety of the earth. If less than the default position uncertainty, the third instantiation of the position uncertainty, SeedUncertainty(3), is set to the aggregate position uncertainty of the GPS lat/lon position from the matching entry. If greater than the default position uncertainty, SeedUncertainty(3) is set to the default value. In either case, the third possible seed position, SeedPosition(3), is set to the GPS lat/lon position from the matching entry.

If the subscriber station is in service, and a matching entry is present in database 2606 that matches SIDserving, aging of the GPS lat/lon position from the matching entry is deemed unnecessary. In this case, SeedUncertainty(3) is set to the inherent position uncertainty of the GPS lat/lon position, seedpos_default_sid_uncertainty, and SeedPosition(3) is set to the GPS lat/lon position from the matching entry.

If the subscriber station is out of service and an entry in database 2606 is absent that matches SIDlatest, or the subscriber station is in service and an entry in database 2606 is absent that matches SIDserving, the pseudo code of FIG. 35 is skipped.

In the fourth stage, the pseudo code of FIGS. 36A-36B is executed to determine if a seed position is possible based on a matching entry in the SID Country Table Database 2608. The first portion of the code, illustrated in FIG. 36A, governs in the case when the subscriber station is out of service. In this portion of the code, if SIDlatest is not defined in data structure 2604, execution of this pseudo code is aborted, and program control is returned without calculating a fourth instantiation of SeedPosition and SeedUncertainty. If a matching entry for SIDlatest in SID Self Learning Database 2606 indicates the presence of a conflict, or a matching entry for SIDlatest is absent from the SID Country Table Database 2608, then SeedUncertainty(4) is set to the default value of the whole earth, and SeedPosition(4) is set to a default value of 0 lat and 0 lon. If a matching entry is present in SID Country Table Database 2608, and a conflict condition is not indicated for SIDserving, then RadiusCountry is set to the coverage radius from the matching entry in the SID Country Table Database 2608, and the position uncertainty for SIDserving, also equal to RadiusCountry, is then aged to the current time. To accomplish this, TimeDelta, equal to the difference in time between the current time and the time tagged to the SIDlatest, is calculated. If this TimeDelta value is less than 2 hours, as before, the assumed velocity of the subscriber station, seedpos_MsSpeedMax, is set to an assumed automobile velocity, seedpos_MsSpeedMax_car, for example, 33.975 m/s (76 mph), and is otherwise set to an assumed airplane velocity, seedpos_MsSpeedMax_air, for example, 178.816 m/s (400 mph).

The assumed velocity, seedpos_MsSpeedMax, is then multiplied by the TimeDelta value to arrive at the incremental position uncertainty due to the aging of SIDlatest. This value is then added to the inherent position uncertainty of the centroid location corresponding to SIDlatest, RadiusCountry, to arrive at the aggregate position uncertainty of this centroid location. This value is then compared with a default position uncertainty, associated with the assumption that the subscriber station is located somewhere on the face of the earth, with a position uncertainty that encompasses the entirety of the earth. If less than the default position uncertainty, the fourth instantiation of the position uncertainty, SeedUncertainty(4), is set to the aggregate position uncertainty of the centroid position from the matching entry. If greater than the default position uncertainty, SeedUncertainty(4) is set to the default value. In either case, the fourth possible seed position, SeedPosition(4), is set to the centroid position from the matching entry.

The second portion of the pseudo code, illustrated in FIG. 36B, governs in the case where the subscriber station is in service. A check is first made to determine in the country associated with SIDserving is different from the country associated with SIDlatest, indicating that the subscriber station crossed a SID boundary during a long traffic call. In this case, the position uncertainty for the centroid location associated with SIDlatest, which is the coverage radius for SIDlatest, is aged to current time. TimeDelta, the difference in time between current time and the time tagged to SIDlatest, is multiplied by seedpos_MsSpeedMax, the assumed velocity of the subscriber station (discussed earlier), and the result added to the coverage radius for the latest SID, RadiusCountryLatest. The result is then compared with the SIDServing country radius. SeedUncertainty(4) is set to whichever of these two values is less. SeedPosition(4) is then set to either the centroid location associated with SIDlatest or that associated with SIDserving. If the aged SIDlatest country radius is less than the SIDserving country radius, then SeedPosition(4) is set to the centroid location for SIDlatest; otherwise, it is set the centroid location for SIDserving.

To explain this further, consider an example where a subscriber station located in Korea crosses the border into China during a call, and the elapsed time is such that the aged country radius of Korea (SIDlatest) is less than the country radius of China (SIDserving). In this example, SeedUncertainty(4) would be set to the aged country radius of Korea, and SeedPosition(4) would be set to the centroid location of Korea.

If the countries associated with SIDserving and SIDlatest are the same, but a matching entry in SID Self Learning Database 2608 associated with SIDserving indicates a conflict, SeedUncertainty(4) is set to the default whole earth uncertainty value, and SeedPosition(4) is set to the default 0 lat/0 lon position. If the counties are the same, but no conflict associated with SIDserving is indicated, then the position uncertainty for the centroid location associated with SIDserving is aged to current time. To accomplish that, TimeDelta, the difference in time between current time and the time tagged to SIDserving, is multiplied by seedpos_MsSpeedMax, the assumed velocity of the subscriber station (discussed earlier), and the result added to the coverage radius for the serving SID. The result is then compared with the default whole earth position uncertainty value. SeedUncertainty(4) is set to whichever of these two values is less. SeedPosition(5) is set to either the centroid location associated with SIDserving.

Fifth, SeedUncertainty(5) is set to the default whole earth value, and SeedPosition(5) is set to the default 0 lat/0 lon value.

At the conclusion of these five stages, the seed position of the subscriber station is then set to whichever of the five possible values, SeedPosition(i), $1 \leqq i \leqq 5$, has the lowest corresponding SeedUncetainty(i), $1 \leqq i \leqq 5$.

The PE then derives acquisition assistance information for the selected seed position and position uncertainty, and passes this information on to the GPS Searcher. If the GPS Searcher fails to produce a valid GPS fix, and the seed position that was obtained previously was generated from the SID Self Learning Database 2606 or SID Country Table Database 2608 options, the PE regenerates the acquisition assistance information using the seed position as the default 0 lat/0 lon value and the position uncertainty as the default whole earth value. It then provides this information to the GPS Searcher, thus initiating another GPS fix attempt.

While various embodiments, implementations and examples have been described, it will be apparent to those of ordinary skill in the art that many more embodiments, implementations and examples are possible that are within the scope of this invention. Consequently, the invention is not to be limited except in relation to the appended claims.

The invention claimed is:

1. A method of deriving a seed position of a subscriber station in a wireless communication system, comprising:

receiving an overhead message from the wireless communication system; and deriving the seed position of the subscriber station from a parameter in the overhead message comprising deriving a first position estimate of the subscriber station from the parameter;

attempting to derive a second position estimate of the subscriber station;

setting the seed position of the subscriber station to the first position estimate if the second position estimate is unavailable;

setting the seed position of the subscriber station to the first position estimate if the second position estimate has a higher position uncertainty then the first position estimate; and setting the seed position of the subscriber station to the second position estimate if the second position estimate has a lower position uncertainty than the first position estimate.

2. The method of claim 1 wherein:

the parameter indicates a position of a base station in communication with the subscriber station; and the first position estimate is set to the base station position indicated by the parameter.

3. The method of claim 2 wherein the seed position is set to BASE_LAT and BASE_LON values from a System Parameters Message communicated to the subscriber station by a CDMA 2000 wireless communications system.

4. The method of claim 1 wherein the second estimate is a previous position fix of the subscriber station.

5. The method of claim 4 wherein the previous position fix is time-stamped and has an age derivable from the time-stamp, and the position uncertainty of the second estimate is determined responsive to the age.

6. The method of claim 1 wherein the second estimate is set to a default estimate of the position of the subscriber station.

7. The method of claim 6 wherein the position uncertainty of the second estimate is set to a default value.

8. The method of claim 1 wherein the deriving the seed position further comprises mapping a SID value from one of: a System Parameters Message, an ANSI-41 System Parameters Message, and an In-Traffic System Parameters Message, communicated to the subscriber station by a CDMA 2000 wireless communications system.

9. The method of claim 1 the deriving the seed position further comprises:

mapping the parameter to a position using a data structure associating possible values of the parameter with corresponding positions; and setting the seed position to the mapped position.

10. The method of claim 9 wherein the data structure is configured to map possible values of the parameter into corresponding position uncertainties.

11. In a subscriber station having a position in a wireless communications system, a method of updating one or more data structures associating possible values of one or more overhead message parameters with corresponding positions, the method comprising:

obtaining values of one or more parameters from one or more overhead messages received by the subscriber station from a wireless communications system;

mapping the one or more parameter values to a corresponding position by accessing the one or more data structures;

setting a seed position of the subscriber station to the corresponding position, wherein the act of setting the seed position comprises:

deriving a first position estimate of the subscriber station from the one or more parameter values;

attempting to derive a second position estimate of the subscriber station;

setting the seed position of the subscriber station to the first position estimate if the second position estimate is unavailable;

setting the seed position of the subscriber station to the first position estimate if the second position estimate has a higher position uncertainty then the first position estimate; and setting the seed position of the subscriber station to the second position estimate if the second position estimate has a lower position uncertainty than the first position estimate;

deriving a fix of the position of the subscriber station from one or more satellite transmissions originating from a GPS-type position determination system, including searching for one or more of such transmissions responsive to the seed position;

determining whether an update condition is present responsive to the fix of the subscriber station's position; and updating the one or more data structures if an update condition is present.

12. The method of claim 11 wherein the one or more data structures also associate possible values of the one or more parameters with corresponding position uncertainty values, and the mapping maps the one or more parameter values from the one or more overhead messages to a corresponding position uncertainty value.

13. The method of claim 12 wherein the position uncertainty values are coverage values indicating an area of coverage, and an update condition is determined to be present if the fix of the subscriber station's position is outside the area of coverage indicated by the mapped coverage value.

14. The method of claim 13 wherein, upon or after determining that an update condition is present, the mapped coverage value as stored in the one or more data structures is extended, whereby the coverage area indicated by the value encompasses the position fix of the subscriber station.

15. The method of claim 13 wherein, upon or after determining that an update condition is present, the one or more entries associating the one or more parameter values with a corresponding position and coverage value are replaced so that the one or more parameter values map into a new position or coverage value.

16. The method of claim 13 wherein, upon or after determining that an update condition is present, one or more new entries associating the one or more parameters values with a position and coverage value are added to the one or more lookup tables.

17. The method of claim 11 wherein the mapping comprises mapping a SID value from an overhead message communicated to the subscriber station by a CDMA 2000 wireless communications system to a corresponding position.

18. In a subscriber station having a position in a wireless communications system, a method of updating one or more data structures having a plurality of entries associating possible values of one or more parameters, obtainable from one or more overhead messages communicated by a wireless communications system, with corresponding positions, the method comprising:

obtaining values of one or more parameter values from one or more overhead messages received by the subscriber station from a wireless communications system;

accessing the one or more data structures to determine if one or more entries are present associating the one or more parameter values with a corresponding position;

setting a seed position comprising:

deriving a first position estimate of the subscriber station from the one or more parameter values;

attempting to derive a second position estimate of the subscriber station;

setting the seed position of the subscriber station to the first position estimate if the second position estimate is unavailable;

setting the seed position of the subscriber station to the first position estimate if the second position estimate has a higher position uncertainty then the first position estimate; and setting the seed position of the subscriber station to the second position estimate if the second position estimate has a lower position uncertainty than the first position estimate; and updating the one or more data structures if said one or more entries are not present in the one or more data structures.

19. The method of claim 18 wherein, if said one or more entries are not present in the one or more data structures, the one or more data structures are updated by adding one or more entries associating the values of the one or more parameters with a corresponding position.

20. The method of claim 19 wherein the added one or more entries also associate the one or more parameter values with a corresponding position uncertainty.

21. A subscriber station having a position in a wireless communications system, the subscriber station comprising:

a memory storing a data structure associating possible parameter values obtainable by the subscriber station from at least one overhead messages communicated by the wireless communications system, with corresponding positions and position uncertainty values; and at least one processor configured to:

(1) obtain parameter values from the at least one overhead message;

(2) access the data structure to map the parameter values to a corresponding position; and (3) derive a seed position of the subscriber station responsive to the access thereby to (3a) derive a first position estimate of the subscriber station from the parameter values;

(3b) attempt to derive a second position estimate of the subscriber station;

(3c) set the seed position of the subscriber station to the first position estimate if the second position estimate is unavailable;

(3d) set the seed position of the subscriber station to the first position estimate if the second position estimate has a higher position uncertainty then the first position estimate; and (3e) set the seed position of the subscriber station to the second position estimate if the second position estimate has a lower position uncertainty than the first position estimate.

22. The system of claim 21 wherein the at least one processor is further configured to:

(1) search for satellite transmissions from a GPS-type position determination system responsive to the seed position; and (2) derive a fix of the position of the subscriber station from such transmissions.

23. The system of claim 21 wherein the at least one processor is further configured to set the seed position of the subscriber station to a corresponding position mapped using the data structure, provided another estimate of the position of the subscriber station having lower position uncertainty is unavailable.

24. The system of claim 21 wherein the one or more data structures comprise a lookup table having a plurality of entries associating possible values of the one or more parameters with corresponding positions.

25. The system of claim 24 wherein the plurality of entries of the lookup table associate the possible values of the parameter values with corresponding position uncertainties.

26. The system of claim 21 wherein the at least one processor further comprises a position engine for deriving a seed position of the subscriber station and a searching engine for fixing a position of the subscriber station responsive to the seed position.

27. The system of claim 21 wherein the data structure associates possible SID values, obtainable by the subscriber station from one or more overhead messages communicated by a CDMA 2000 wireless communications system, with corresponding positions.

28. The system of claim 27 wherein the data structure associates the possible SID values with corresponding position uncertainties.

* * * * *

UNITED STATES PATENT AND TRADEMARK OFFICE

CERTIFICATE OF CORRECTION

PATENT NO. : 7,450,064 B2
APPLICATION NO. : 11/244529
DATED : November 11, 2008
INVENTOR(S) : Douglas N. Rowitch et al.

It is certified that error appears in the above-identified patent and that said Letters Patent is hereby corrected as shown below:

Title page in Abstract, (57), please delete the words delineated below in quotation marks:
In a method and system for deriving a seed position of a subscriber station in a wireless communications system in supporting unassisted GPS-type position determination "is provided", the subscriber station receives overhead messages from the wireless communications system, and derives the seed position from the parameter values. The subscriber station may use a data structure in its memory and map possible parameter values to corresponding positions that may serve as the seed positions.
Should read:
In a method and system for deriving a seed position of a subscriber station in a wireless communications system in supporting unassisted GPS-type position determination, the subscriber station receives overhead messages from the wireless communications system, and derives the seed position from the parameter values. The subscriber station may use a data structure in its memory and map possible parameter values to corresponding positions that may serve as the seed positions.

Signed and Sealed this

Eighth Day of December, 2009

David J. Kappos

David J. Kappos
*Director of the United States Patent and Trademark Office*